United States Patent [19]
Coulter et al.
[11] 3,891,974
[45] June 24, 1975

[54] DATA PROCESSING SYSTEM HAVING EMULATION CAPABILITY FOR PROVIDING WAIT STATE SIMULATION FUNCTION

[75] Inventors: Brent W. Coulter, Bellingham, Mass.; Laurence F. Migdalek, Bethesda, Md.

[73] Assignee: Honeywell Information Systems Inc., Waltham, Mass.

[22] Filed: Dec. 17, 1973

[21] Appl. No.: 425,661

[52] U.S. Cl. .......... 340/172.5
[51] Int. Cl.[2] .......... G06F 9/18
[58] Field of Search .......... 340/172.5

[56] References Cited

UNITED STATES PATENTS

| | | | |
|---|---|---|---|
| 3,297,999 | 1/1967 | Shimabukuro | 340/172.5 |
| 3,374,466 | 3/1968 | Hanf et al. | 340/172.5 |
| 3,440,612 | 4/1969 | Womack | 340/172.5 |

*Primary Examiner*—Joseph M. Thesz, Jr.
*Attorney, Agent, or Firm*—John S. Solakian; Ronald T. Reiling

[57] ABSTRACT

An emulator for use in a data processing system for providing simulation of the machine wait state of the emulated central processor. A combination of hardware, firmware and software is provided to allow processing in the native mode of the data processing system while the emulated processor is in the wait state. Means are also provided for rapidly returning from the wait state to the emulation process in response to an emulator specific pending allowable interrupt. Means are further provided for indicating to the operator whether the emulated processor can in fact exit from the wait state and further means are provided for indicating to the operator the length of time the emulated processor has been in the wait state.

17 Claims, 62 Drawing Figures

PATENTED JUN 24 1975

3,891,974

SHEET 2

FIG. 2

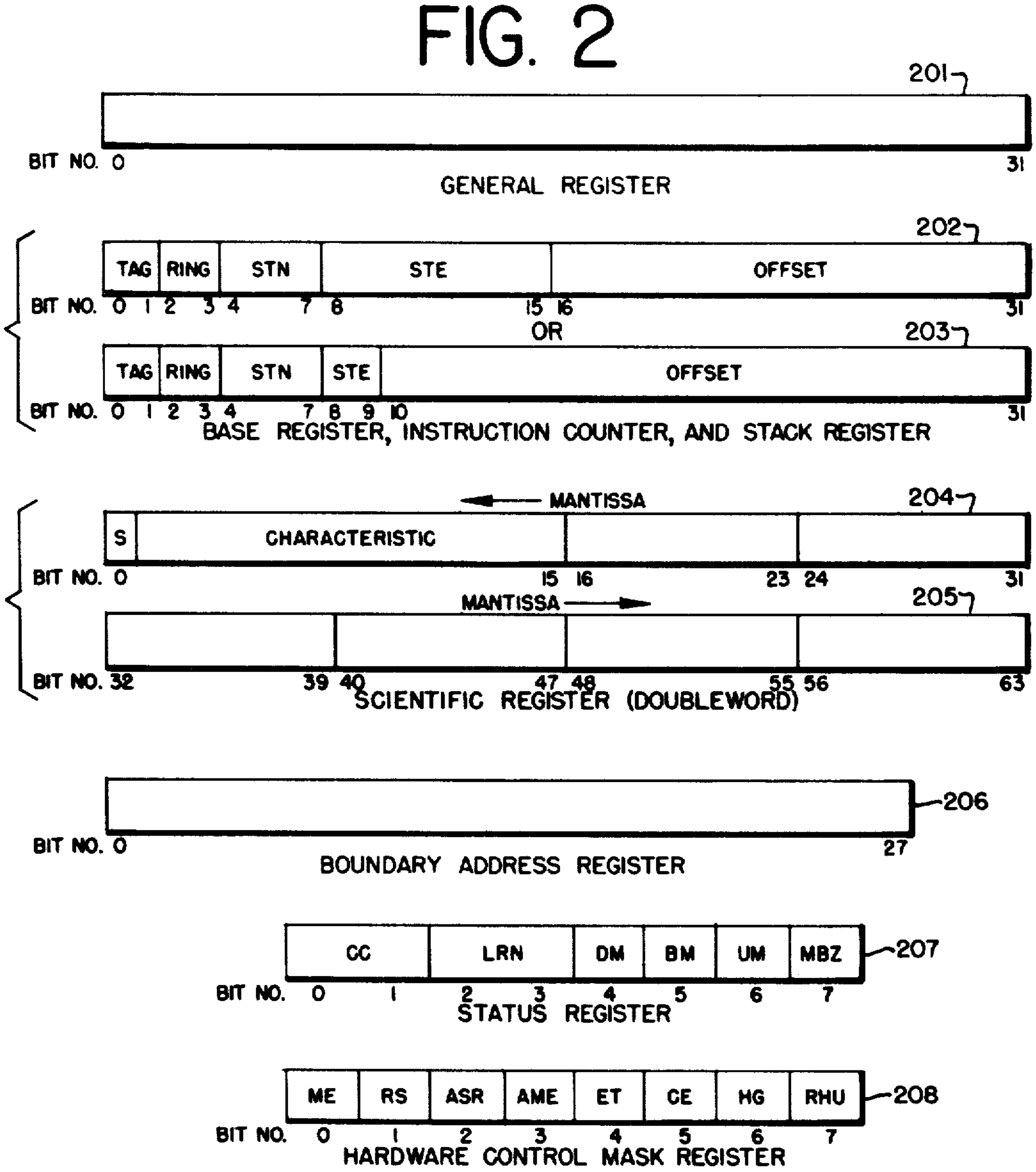

FIG. 3

LEGEND FOR RESERVED AREAS OF STORAGE IN REGISTERS

AME = ACCOUNTING MECHANISM

ASR = AUTO STORAGE RECONFIGURATION

BM = BINARY MASK

CC = CONDITION CODE

CE = CORRECTED ERROR

DM = DECIMAL MASK

ET = ENVIRONMENT TOLERANCE

HG = HARDWARE GATE

LRN = LAST RING NUMBER

MBZ = MUST BE ZERO

ME = MACHINE ERROR

RING = RING NUMBER

RHU = RESERVED FOR HARDWARE USE

RS = RETRY SUCCESSFUL

S = SIGN

STE = SEGMENT TABLE ENTRY

STN = SEGMENT TABLE NUMBER

TAG = DESCRIPTOR TYPE

UM = UNDERFLOW MASK

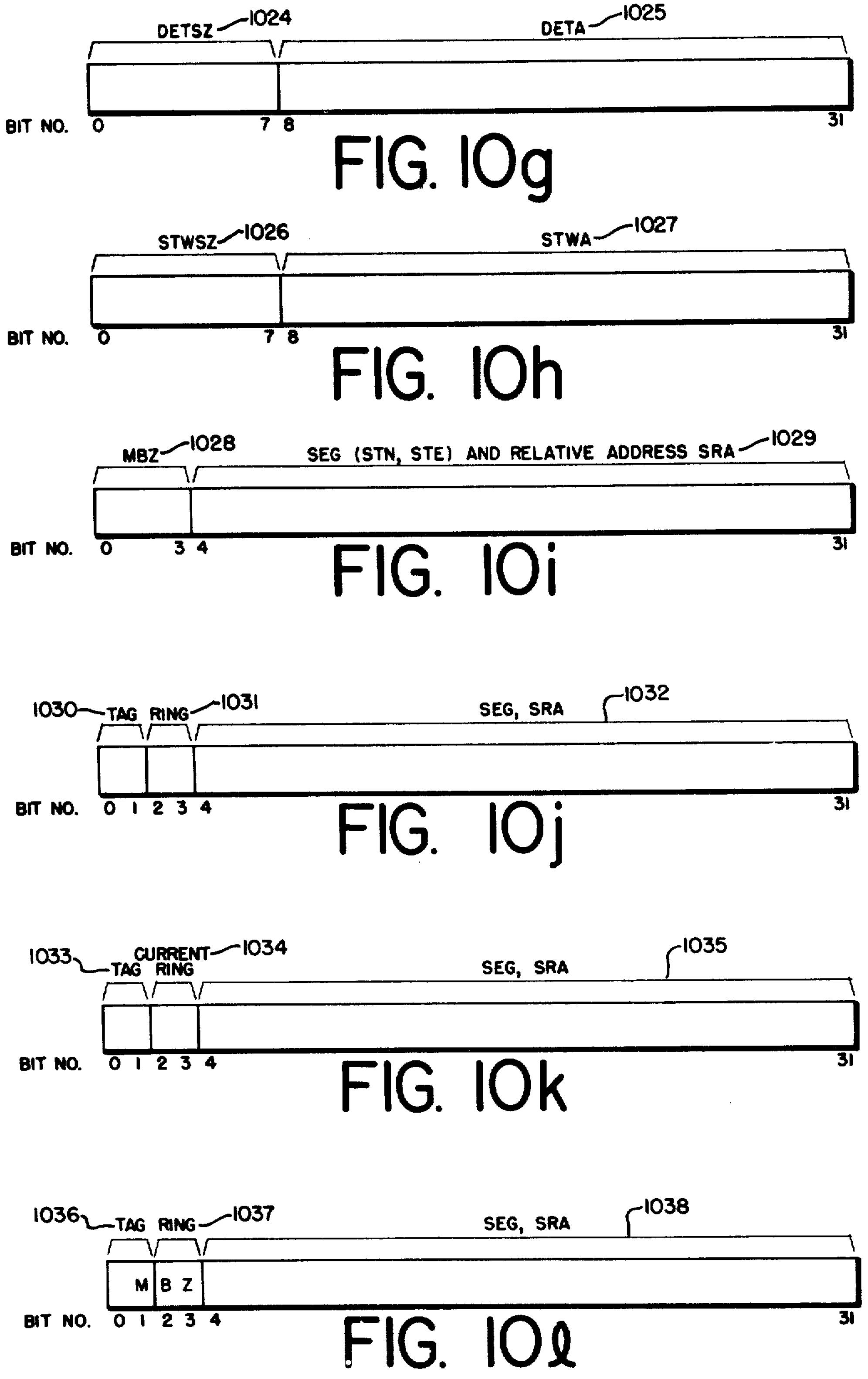
FIG. 10g, FIG. 10h, FIG. 10i, FIG. 10j, FIG. 10k, FIG. 10ℓ

DATA PROCESSING SYSTEM HAVING EMULATION CAPABILITY FOR PROVIDING WAIT STATE SIMULATION FUNCTION

RELATED APPLICATIONS

The following applications are incorporated by reference to the instant application.

1. "Buffer Store" invented by J. L. Curley, T. J. Donahue, W. A. Martland, and B. S. Franklin, filed on Oct. 5, 1972 having Ser. No. 295,301 now U.S. Pat. No. 3,820,078 and assigned to the same assignee named herein.
2. "Variable Masking for Segmented Memory" invented by Wallace A. Martland and John L. Curley, filed on Oct. 5, 1972 having Ser. No. 295,303 now U.S. Pat. No. 3,800,292 and assigned to the same assignee named herein.
3. "Override Hardware for Main Store Sequence" invented by Thomas J. Donahue, filed on Oct. 5, 1972 having Ser. No. 295,418 now U.S. Pat. No. 3,820,081 and assigned to the same assignee named herein.
4. "Main Memory Sequencer" invented by T. J. Donahue, J. L. Curley, B. S. Franklin, W. A. Martland, and L. V. Cornaro, filed on Oct. 5, 1972 having Ser. No. 295,331 now U.S. Pat. No. 3,821,709 and assigned to the same assignee named herein.
5. "Main Memory Reconfiguration" invented by J. L. Curley, B. S. Franklin, W. A. Martland, T. J. Donahue and L. V. Cornaro filed on Oct. 5, 1972 having Ser. No. 295,417 and assigned to the same assignee named herein.
6. "Process Control Block" invented by Jacques Bienvenu et al., filed on Dec. 2, 1974 and having Ser. No. 528,954, (and claiming priority of French Case Ser. No. 73 42689, filed on Nov. 30, 1973) and assigned to the same assignee named herein.
7. "Segmented Address Development" invented by Jacques Michel Jean Bienvenu, filed on May 15, 1974 and having Ser. No. 470,430 and assigned to the same assignee named herein.
8. "Protection of Data in an Information Multiprocessing System by Implementing a Concept of Rings to Represent the Different Levels of Privileges Among Processes" invented by Marc Appell et al., filed on Dec. 2, 1974, and having Ser. No. 528,953, (and claiming priority of French Case Ser. No. 73 42706, filed on Nov. 30, 1973) and assigned to the same assignee named herein.
9. "Procedure Calls and Stack Operations" invented by Marc Appell et al., filed on Dec. 2, 1974, and having Ser. No. 529,019, (and claiming priority of French Case Ser. No. 73 42705, filed on Nov. 30, 1973) and assigned to the same assignee named herein.
10. "Process Synchronization Utilizing Semaphores" invented by Jacques Michel Jean Bienvenu et al., filed on Dec. 2, 1974, and having Ser. No. 529,256, (and claiming priority of French Case Ser. No. 73 42691, filed on Nov. 30, 1973) and assigned to the same assignee named herein.
11. "System Base" invented by Claude Carre et al., filed on Dec. 2, 1974, and having Ser. No. 528,951, (and claiming priority of French Case Ser. No. 73 42698, filed on Nov. 30, 1973) and assigned to the same assignee named herein.
12. "Process Management Structures and Hardware/Firmware Control" invented by Jean-Claude Cassonet et al., filed on Dec. 2, 1974, and having Ser. No. 529,012, (and claiming priority of French Case Ser. No. 73 42693, filed on Nov. 30, 1973) and assigned to the same assignee named herein.
13. "Extended Decor Instruction" invented by Marc Appell et al., filed on Dec. 2, 1974, and having Ser. No. 529,257, (and claiming priority of French Case Ser. No. 73 42695, filed on Nov. 30, 1973) and assigned to the same assignee named herein.

BACKGROUND OF THE INVENTION

The present invention relates generally to computers and more particularly to computer systems having emulation capabilities.

Generally, each process or program which an electronic data processor is to execute, is described in an entirely different series of steps. This series of steps is dictated by a plurality of variables, two of which are the hardware available within the data processor and the character configuration employed. The execution of a process or program written and usually based on the architecture of a given data processor in which the process is to run thereby providing a more efficient system for running such process is defined as the natural mode or native mode of operation of the associated electronic data processor. Therefore any program written for a particular processor can be executed in the native mode of operation of that processor. Each time that another data processing system is introduced, the problem is always raised as to whether such other data processing system will operate with the programs written for the native mode of operation of the given data processing system. Quite naturally, such other data processing system includes different hardware units and concepts of data flow which are not found in the given data processing system. Therefore, the programs written for the other system are usually not operable in the native mode of operation of the given system. Accordingly, means must be provided to emulate the other data processing system in conjunction with the given data processor.

In certain cases, various instructions or conditions which are executable in the emulated central processor are not executable in the central processor doing the emulating. This may be true for a number of reasons. One particular aspect of the data processing system being emulated which is not emulatable, not by design, but by choice, is the machine wait state of the emulated central processor. During the wait state, the processor that is the emulated data processor does not function and sits waiting for an event to occur so that it may exit from the wait state and again continue to execute instructions. Accordingly, associated with such wait state of the emulated data processor is a large overhead in that no processing is continuing while the machine is in the wait state and accordingly much execution time is lost. Furthermore, the operator is not informed of this condition and considerable time is wasted before the operator on his own might discover that such a wait state condition exists. Thus, it is desirable when emulating such a central processor having a wait state condition to by design provide wait state simulation during which further processing of the instructions in the native mode associated with the emulating central processor is allowed. Thus, it is desirable, even though the emulated central processor is in the wait state, to allow processing to continue in the native mode while continuing to periodically notify the operator of the wait state condition of the emulated processor.

It is accordingly an object of the present invention to provide a data processing system which can emulate a data processor having a wait state condition so that the processing overhead associated with such wait state condition is substantially overcome and so that the operator is continually informed of such condition.

SUMMARY OF THE INVENTION

The purposes and objects of the present invention are satisfied by providing a data processing system having a central processing unit for executing instructions in a native mode and an emulation unit coupled with the central processing unit for executing instructions in a non-native mode so that the operation of another central processing unit is emulated. The system further includes means for detecting whether the emulated central processor is in its wait state thereby inhibiting further processing therein, means for indicating whether there is a pending allowable interrupt and means for exiting from the wait state in order to continue emulator processing in the non-native mode if such pending allowable interrupt is emulator specific, i.e., if such interrupt relates to an event which must be attended to by the emulator. Further means are provided for enabling data processing in the native mode of the emulating processor while the emulated processor is in the wait state. In addition, means are provided for monitoring the period of time during the wait state continues and notifying the operator of such wait state condition at specified intervals thereby avoiding a situation wherein the system is not productive.

BRIEF DESCRIPTION OF THE DRAWINGS

The advantages of the foregoing configuration of the invention become more apparent upon reading the accompanying detailed description in conjunction with the figures in which:

FIG. 2 is a schematic representation of various hardware structures utilized by the invention.

FIG. 3 is a legend of terms used for reserved areas of storage in registers depicted in FIG. 2.

FIGS. 10*a* through 10*l* are block diagrams of structures in the PCB.

DETAILED DESCRIPTION OF THE PREFERRED EMBODIMENTS

Figure 1:
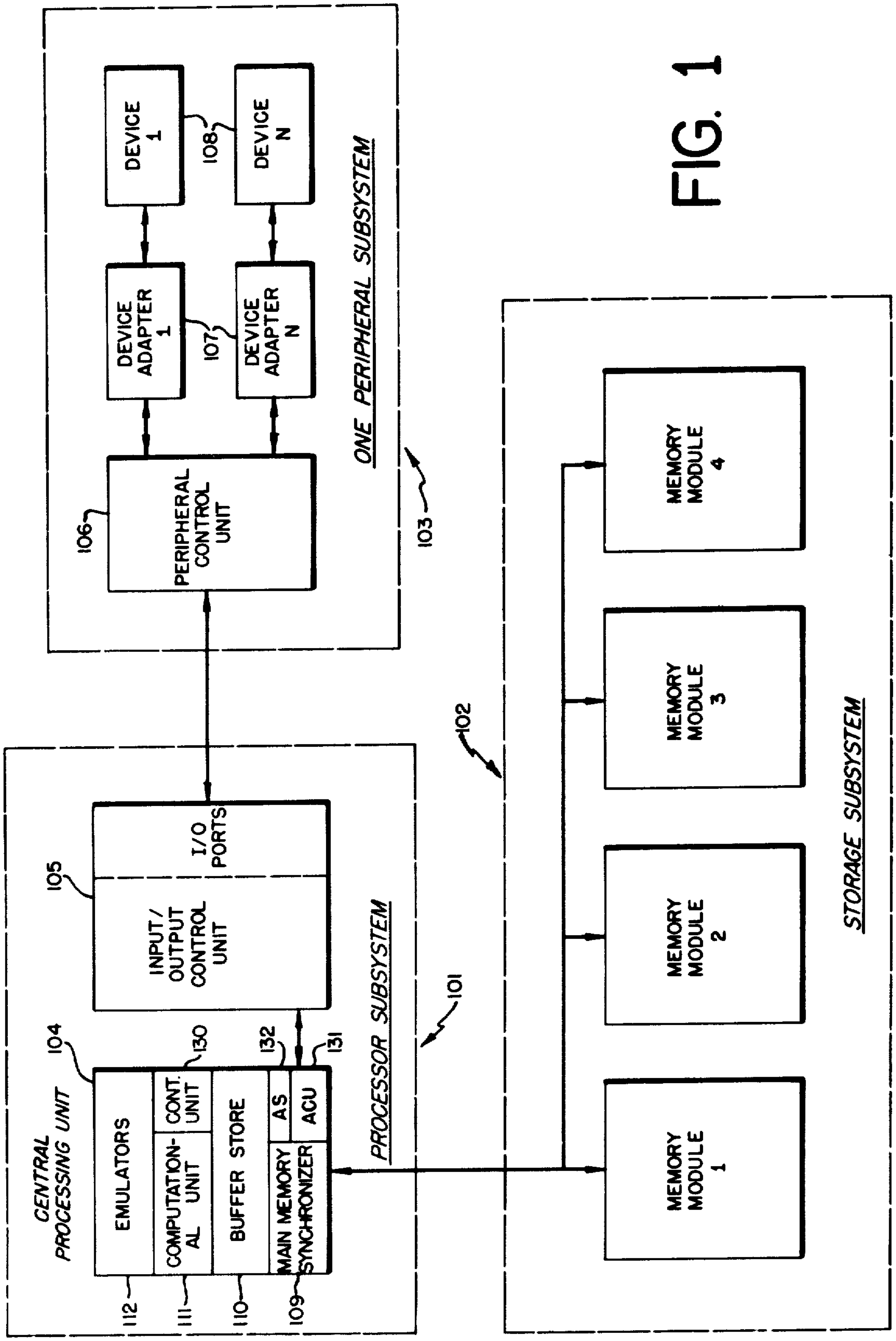
FIG. 1 is a block diagram of a multiprogramming system utilizing the invention.

The invention operates typically in the hardware system environment, hereinafter described, coordinated by a hardware/firmware/software operating system. Referring to FIG. 1 the subsystems are the processor subsystem 101, the storage subsystem 102, and one or more —up to 32— peripheral subsystems 103. The processor subsystem contains a central processing unit (CPU) 104 and up to four input/output control units (IOC) 105. Each peripheral subsystem consists of a peripheral control unit (PCU) 106, a number of device adapters (DA) 107, and up to 256 peripheral i/o devices 108. The storage subsystem 102 consists of one to four semiconductor memory modules of 32 to 512 kilobytes each.

I. PROCESSOR SUBSYSTEM

In the processor subsystem 101, the CPU 104 performs the basic processing operations for the system, and interfaces with memory 102. The IOC 105 controls all information exchanges between the storage subsystem 102 and peripheral devices 106.

A. CENTRAL PROCESSING UNIT

The CPU includes a main memory synchronizer 109, a buffer store 110, various elements that comprise the computational unit 111, and emulation facilities 112. The main memory synchronizer 109 resolves conflicts for the use of main memory among the computational unit 111, the buffer store 110, and the IOC 109. Conflicts are resolved on a priority basis: the IOC has the highest priority followed by memory writes (from the computational unit) and then memory reads (into the buffer store). The main CPU also includes the address control unit ACU 131 which controls main memory addressing and the associative memory AS 132 used to store most recently used addresses of main memory. The buffer store 110 is a small high-speed buffer memory that reproduces a selected region of main memory and interfaces with the computational unit to decrease average memory access time. During each memory read, both the buffer store and main memory are accessed. If the information to be fetched is already in the buffer store, the main memory read is terminated and the information fetched from the buffer store. Otherwise the main memory 102 is read. Every time this is done, the CPU 104 fetches 32 bytes that contains the desired information. This information remains in the buffer store for future memory references. Since the buffer store is transparent to software, the program controlling the computer at any given moment cannot determine whether the information it is processing has been fetched from the buffer store or from the main memory.

The computational unit 111 performs all data processing address generation within the CPU. A typical control store 130 within the computational unit (see a book entitled Microprogramming: Principles and Practices, Samir S. Husson, Prentice Hall, Inc.) contains firmware which initializes the system, controls the CPU 104 and IOC 105, and decodes an instruction set (not shown). Optionally the control store may provide scientific instructions, test routines, emulation packages, or special purpose features which extend the capabilities of the processor subsystem.

As an option, the CPU provides emulation of systems other than the instant system. Emulators 112 are components of firmware, software, and in some instances hardware.

B. INPUT-OUTPUT CONTROL UNIT

The IOC 105 portion of the processor subsystem provides a data path between any peripheral subsystem 103 and the storage subsystem 102. This path allows for the initiation of peripheral commands and controls the resulting data transfers. An IOC can typically handle up to 32 channel control units (not shown).

C. PERIPHERAL SUBSYSTEMS

In a peripheral subsystem 103 on FIG. 1 the PCU 106 is a stand-alone microprogramming processor that relieves the load on the CPU 104 by controlling the i/o devices 108 during i/o operations. The PCU does this by executing instructions contained in a channel program. This program results in arithmetic, logical, transfer, shift, and branch operations being performed in the PCU. There are several kinds of PCU's according to the kind of device each controls: i.e., unit record, mass (disk) storage, magnetic tape, communications, etc.

Device adapters 107 mediate between every PCU and the devices it controls. Each contains the dedicated firmware and logic necessary to implement communication with a particular type of device. Depending on the type, a DA 107 controls one or several devices.

The major functions performed by a peripheral subsystem 103 are as follows:

1. Transforming CPU instructions into a series of commands acceptable to the appropriate peripheral device.
2. Packing and unpacking data in the form needed by the CPU or the appropriate peripheral device.
3. Keeping the CPU informed of the status of the subsystem and of the devices under its control.
4. Independently initiating and processing error and recovery procedures.
5. Allowing on-line diagnosis of a device without disturbing the device-sharing capabilities of the associated peripheral processor.

A PCU resolves conflicts for main memory between devices attached to it; however, the IOC resolves conflicts between PCU's.

D. STORAGE SUBSYSTEM

Each memory module 1–4 is 4 or 8 bytes wide. The number of modules, their size, and the data path width may vary according to size of computer. Memory modules are four-way interleaved in such a way that the four modules are accessed sequentially (module 1 contains the first 8 bytes, module 2 contains the second 8 bytes, etc.). Interleaving decreases the number of conflicts for access to main memory and thereby decreases the average memory access time. Memory is reconfigurable in case of failure; i.e., blocks of memory within a module may be removed without destroying contiguous addressing.

Main memory 102 consists of a capacitive storage medium in the form of metal oxide semiconductor (MOS) chips. This medium operates on the refresh principle to maintain information. Each memory location is typically refreshed at least once every 2 milliseconds; the design ensures that few conflicts occur between refresh timing and memory accesses. (In cases of conflict, refreshing takes precedence).

An area at the beginning of main memory is reserved for hardware and firmware. The upper limit of this area is defined by the content of a boundary address register (BAR — to be later described) which is visible to the system software. The BAR content is set at system initialization time. The memory area below the address specified in the BAR can contain IOC tables which define the configuration of the peripheral subsystems, firmware to control the CPU, or microprograms and tables for emulation. The size of the area below the address specified in the BAR depends on the system configuration. Whether microprograms are in main memory or control store depends on the system configuration and the applications run on the system.

II. BASIC MACHINE STRUCTURES

There are typically three basic data structures utilized in this hardware: data formats, software visible registers, and the instruction formats.

A. DATA FORMATS

Information is transferred between memory and the CPU in multiples of 8 parallel bits. Each 8-bit unit of information is called a byte. Parity or error correction data is also transferred with data but cannot be affected by software. Therefore, in this patent specification the term data excludes the associated parity or error correction data.

B. BYTES

Bits within a byte are numbered 0 through 7 from left to right. Bytes are processed separately or in groups. Two bytes constitute a halfword, 4 bytes a word, 8 bytes a doubleword, and 16 bytes a quadword. These are the basic formats for all data, including instructions.

C. DATA REPRESENTATION

All data are in binary form, but may be interpreted as binary, decimal, or alphanumeric. Data bits are interpreted in groups of four, as binary coded decimal data; eight as alphanumeric, or 16 to 64 as binary digits. The latter are interpreted as signed, fixed, or floating-point numbers in binary rotation. Any number of contiguous bits up to a doubleword may also be manipulated as a string. The alphanumeric character set is represented in EBCDIC. ASCII is supported as an alternate exchange code.

D. BYTE ADDRESSES

Byte locations in main memory are consecutively numbered starting with zero; each number is the address of the byte. A group of consecutive bytes is said to be halfword-, word-, doubleword-, or quadword-aligned, if the address of the left byte in a group is a multiple of 2, 4, 8, or 16, respectively. Whenever a halfword, word, doubleword, or quadword is so aligned, that unit can be fetched from that address. The location of data in main memory is specified by a data descriptor which is accessed indirectly during address development. "Segmented Address Development" invented by Jacques Michel Jean Bienvenu, filed on May 15, 1974 and having Ser. No. 470,430 and assigned to the same assignee named herein.

E. VISIBLE REGISTERS

There are 33 user-visible registers in the CPU 104 FIG. 1 whose contents collectively define the state of the CPU. There are four types: (See FIG. 2).

1. general registers
2. base registers
3. scientific registers (optional)
4. miscellaneous registers

F. GENERAL REGISTERS

General registers (GR) 201 are used to manipulate fixed-point binary numbers and bit strings. There are typically sixteen 32-bit general registers in the CPU 104—GR0 through GR15. General register GR8 through GR15 are also usable as index registers. When used as index registers, they are herein called X0 through X7: Indexing is performed using the 32-bit two's complement integer contained in a register.

G. BASE REGISTERS

Base registers (BR) have the same format as instruction counters IC and stack registers 202–203. Base registers are used during address computation to define a part of memory. There are typically eight 32-bit base registers, BR0 through BR7.

H. SCIENTIFIC REGISTERS

Scientific registers (SR) are optional equipment for computation with floating-point binary numbers. There are typically four 8-byte scientific registers which are referred to as SR0 through SR3. Scientific registers have the format 204–205 of FIG. 2.

I. MISCELLANEOUS REGISTERS

There are five other registers:

instruction counter—having format 202–203;
status register—having format 207;
stack register (called the T register);
boundary address register—having format 202–203; and
hardware control mask register—having format 208.

The instruction counter (IC) is a 32-bit register that contains the address of the instruction being executed. The status register (STR) 207 is an 8-bit register that records facts about the procedure currently being executed, for example, whether an underflow was caused by the most recent operation. The stack register also known as the T-register is a 32-bit register that contains a pointer to the top of a pushdown stack associated with the currently active procedure. Stacks to be described infra provide a work space, and a mechanism for saving local variables and preserving procedure entry, and return information. The boundary address register (BAR) 206 is a 28-bit register which specifies the lowest absolute main memory address accessible by software. This register is loaded during system initialization and can only be read by software. The hardware control mask register 208 is an 8-bit register which records machine condition information.

J. INSTRUCTION FORMATS

There are approximately 200 instructions although more or less may be utilized. Each instruction is one of four different lengths but always an even number of bytes long. Instructions are stored in consecutive storage locations. The address of the leftmost byte is a multiple of 2, and is the address of the instruction.

The eight most significant bits (and in some cases bits 8 through 11 or 12 through 15) of an instruction represent the operation code, while the remaining bits represent one or more operands. An operand may be a register designator, displacement designator, address syllable (logical address), literal value, immediate literal value. The type and number of operands are determined by the instruction format.

III. SYSTEM ORGANIZATION

A. JOB STEP AND TASK

Work to be performed by the computer system is defined externally by a series of job steps via a job control language. A job step is a unit of work to which hardware resources are allocated. Typically a job step consists of several tasks. A task is the smallest unit of user defined work consisting of a stream of instructions executed without parallelism.

B. PROCESS

The user-visible concepts of task and job step are represented in the hardware by a process and process group, respectively. A process is defined as an ordered sequence of instructions which can be executed asynchronously by the CPU (i.e., several processes can be active and sharing resources, but only one process is actually running at any one instant). A process group is a related set of processes necessary to perform one job step.

C. PROCESS CONTROL BLOCK AND SYSTEM BASE

Because processes can relinquish CPU control at various points during their execution, a storage area in main memory is made available to a process to save CPU status. This status information is utilized to precondition the CPU before a process regains control of the CPU.

Figure 4:
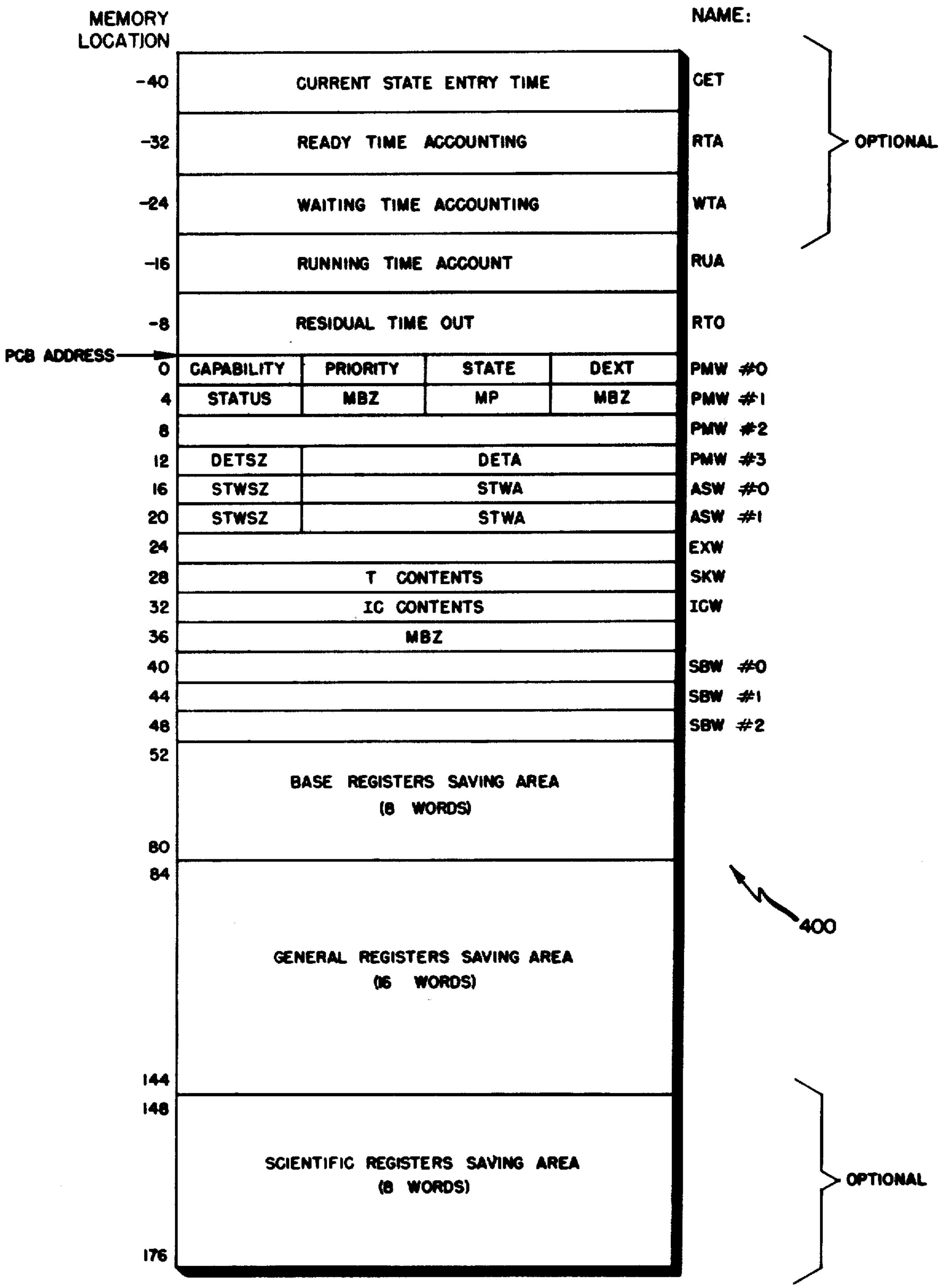
FIG. 4 is a schematic diagram of a process control block.

The storage area assigned to a process is called a process control block (PCB) 400 on FIG. 4. The data contained in a PCB include the addresses of memory areas (address space) assigned to the process, the contents of all pertinent registers, and the state of the process. Thus a PCB serves as a temporary storage area for information necessary to start or restart a process without any information loss. Each PCB is visible to the hardware and can be addressed by the operating system via a set of hardware tables developed during system initialization and modified during system operation (FIG. 5).

Figure 5:
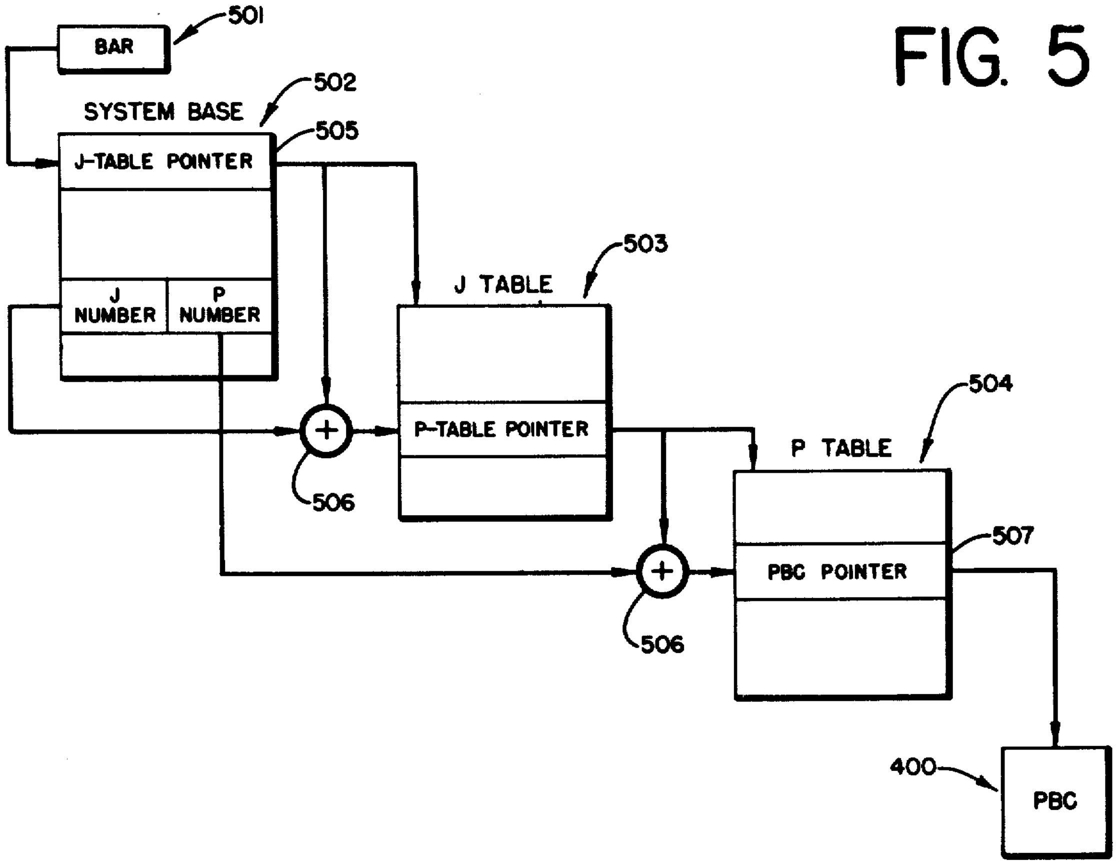
FIG. 5 is a schematic diagram of a system for addressing a process control block.
Figure 6:
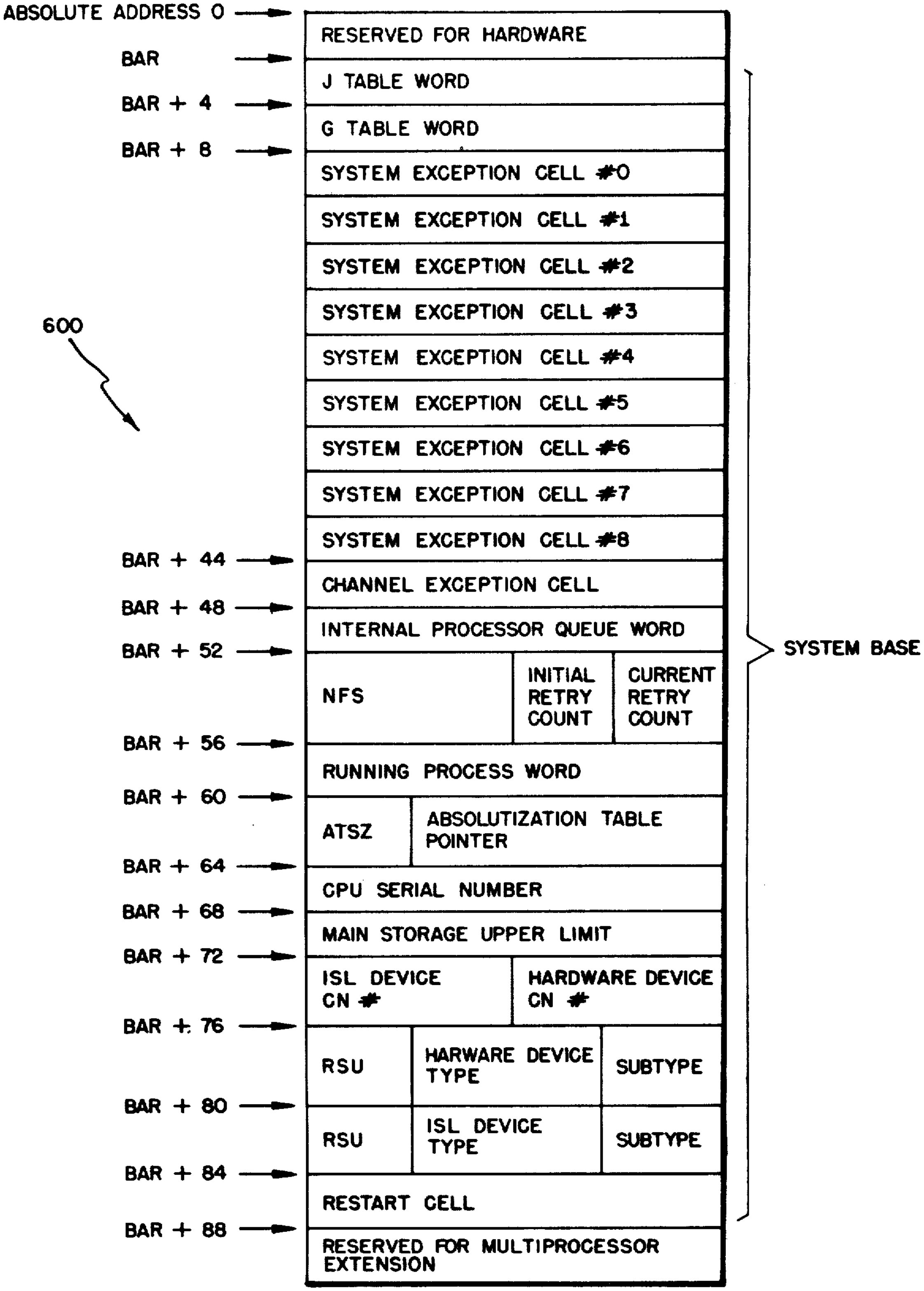
FIG. 6 is a schematic diagram of the system base of the invention.

There is an absolute main memory area which is referred to as the system base (FIGS. 5 and 6). This area is developed by firmware and is accessible via the base address register (BAR) 501 which can be read but not written. The system base 502 contains a number of system attributes which include a job step number and a process group number (J, P) respectively for the currently running process. Another attribute in the system base is a pointer to a hardware defined data structure known as the J table 503. This table contains an entry for every job step presently in the system. Each entry in the J table 503 points to an associated P table 504 which is also a hardware defined data structure. This table defines a process group and contains an entry for every process in the process group. Each P-table entry points to a PCB 400.

Referring to FIG. 5 the J-table pointer 505 indexed by the J number via the arithmetic portion 506 of computational unit 111 (FIG. 1) provides access to a J-table entry 503. This entry contains a P-table pointer which when indexed by the P number via computational unit 506 provides access to a P-table entry 504. The P-table entry contains a pointer 507 to the PCB of the current running process. Thus the operating system can access the active PCB using the contents of the BAR 501 and can access any other PCB given its associated (J, P) logic name.

D. MEMORY SEGMENTATION

In a multiprocess environment, such as herein described there are many processes in memory at any given time. These processes vary in size and demand for memory which causes a memory allocation problem. The hardware herein described in cooperation with an operating system (not shown herein) solves the problem by dynamically allocating memory space. Due to the random nature of memory requirements, memory is allocated in variable size segments and the memory allocation can be restructured during process run time. Thus, a process may be allocated a number of noncontiguous memory segments. This memory allocation method is called segmentation.

Segmentation represents an additional problem in that memory addresses have to be modified whenever part or all of a process is relocated. To alleviate this problem the system herein described provides a technique whereby addresses used by a process are logical rather than absolute main memory addresses. These logical addresses are used to develop absolute addresses.

Segmentation also allows each process to access its own or related memory segment via a system of segment descriptors. By accessing a segment descriptor, a process can obtain the address of a segment. Segment descriptors are contained in main memory and are maintained by the operating system.

Each process may have access up to 2068 memory segments. Normally, this would require an equal number of segment descriptors per process. However, since segments can be shared, the operating system groups segment descriptors into segment tables. This grouping is based on accessability by one process (task), a process group (job step), or globally (system wide). Each process may have up to 15 segment tables associated with it. This technique requires only one segment descriptor for each segment which can be accessed by a process via a segment table. Thus, the memory space required for segment descriptors is decreased; memory updating during relocation is reduced; and some program protection is provided. (The main mechanism for program protection is the ring system. "Protection of Data in an Information Multiprocessing System by Implementing a Concept of Rings to Represent the Different Levels of Privileges Among Processes" invented by Marc Appell et al., filed on Dec. 2, 1974, and having Ser. No. 528,953, (and claiming priority of French Case Ser. No. 73 42706, filed on Nov. 30, 1973) and assigned to the same assignee named herein.

A process must be able to determine which segments it is allowed to access. Accordingly, the system provides a process with two segment table word arrays (STWA). These arrays contain the addresses of all segment tables accessible to a process. There are two segment table word arrays per process because there are two segment sizes, large and small. Large segments have a maximum size of $2^{22}$ bytes while small segments have a maximum size of $2^{16}$ bytes. All segments vary in size in 16-byte increments up to the maximum. A system can typically accommodate up to 28 large segments and 2040 small segments.

Segment table word arrays may be relocated by the operating system; therefore, a process must know the absolute address of its associated STWA's. The PCB for any process contains two words which contain this information which are known as address space words ASW0-1 on FIG. 4. Each word points to a segment table word array STWA. The operating system updates the contents of the ASW's whenever the associated STWA's are relocated. Working down the chain of pointers and decoding the segment descriptor is a firmware function and thus once initiated is not visible even to the operating system.

Segmentation defines over 200 million bytes of address space as being available for processes. This number exceeds the capacity of main memory; therefore, a secondary storage (magnetic disk or drum) is used in conjunction with main memory. The operating system creates the illusion that the system has a much larger main memory than is really available. This concept is called virtual memory.

At any given time, a defined segment may or may not be physically in main memory. The contents of a segment descriptor indicates whether or not the associated segment is in main memory. The hardware detects any attempts by a process to access a segment not in main memory and notifies the operating system. The operating system causes the desired segment to be loaded into main memory from secondary storage. Then the operating system places the segment's memory address in the segment descriptor which is the only place where the absolute address of a segment can be found. This operation is invisible to the process and thus it is not aware that the segment was not in main memory or that it may have to be relocated in main memory. (For details on memory segmentation see Patent application No. 470,430 filed May 15, 1974 and entitled "Segmented Address Development".

The computer system herein described provides data and procedure protection by preventing processes from interferring with each other or sharing each other's address space in an unauthorized manner. This protection is accomplished by restricting addressability via memory segmentation and by a ring system.

The segment tables isolate the address space of the various processes in the system. Processes always use a segmented address during execution. A segmented address consists of a segment number and a relative address within the segment (see above referenced application on Segmented Address Development). The hardware checks that the address used by a process is part of the address spaced assigned to the process. If the address is outside the prescribed address space, an exception occurs. A process cannot refer to data within the address space of another process because the hardware uses the segment tables of the referencing process. Thus, there is no possibility for a process or process group to reference an entity belonging to another process group.

Generally, overlap in address space in the system occurs for those segments shared by all processes. These public segments are created by system programs which check to insure against address conflicts. Thus, segmentation protects user programs against each other and protects the operating system against user programs.

Segments shared by several processes are not protected from misuse by one of these processes. To solve this problem, a ring system is utilized whereby procedure and data segments are grouped into a four-class hierarchy. The four ring classes are numbered 0 through 3. EAch ring represents a level of system privilege with level 0 (the innermost ring) having the most privilege and level 3 (the outermost ring) the least. Every procedure in the system has a minimum and a maximum execute ring number assigned to it which specifies who may call the procedure. A procedure is a subroutine which is capable of calling other procedures and passing parameters to them:

The general rules of the ring system are as follows:

1. A procedure in an inner ring has free access to data in an outer ring. Conversely a procedure in an outer ring cannot access data in an inner ring.
2. A procedure in an outer ring can branch to a procedure in an inner ring, but the reverse is not allowed.
3. Each segment containing data is assigned two ring values, one for read (RD) and one for write (WR). These ring values specify the maximum ring value in which a procedure may execute when accessing the data in either the read or write mode.

Each time a procedure instruction is executed, the procedure's ring number (effective address ring, EAR) is checked against the ring numbers assigned to the segment containing the referenced data. The EAR is the maximum number of process ring numbers in the instruction counter and all ring numbers in base registers and data descriptors found in the addressing path. Access to the data will be granted or denied based on a comparison of the ring numbers. For example, if a system table exists in a segment having a maximum read ring value of 3 and a maximum write ring of 1, then a user procedure executing in ring 3 may read the table but may not update the table.

By predesign, rings 0 and 1 are reserved for the operating system and rings 2 and 3 are reserved for the user. Ring 0 contains those segments critical to total system operation. Ring 1 contains the bulk of the system segments whose failure would not be catastrophic and would allow recovery. The user may utilize ring 2 for checked-out programs and ring 3 for programs being debugged.

F. PROCEDURE CALLS

Figure 7A:
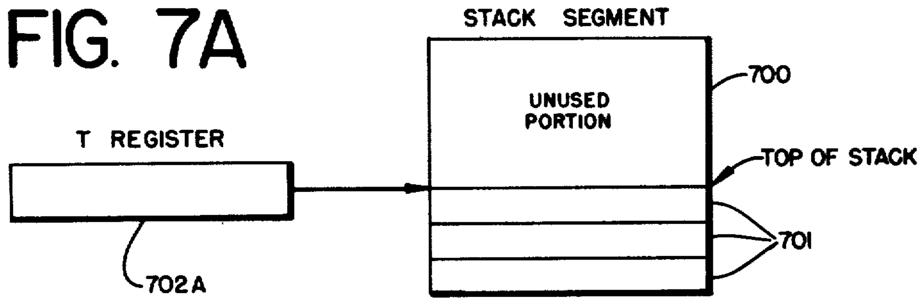
FIGS. 7A and 7B are a schematic representation of a stack segment and a stack frame respectively.

The procedure call is an important function in the system herein described. Procedure calls are used to pass from one procedure to another; to allow user procedures to employ operating system services; and to achieve a modular structure within the operating system. A procedure call is effected by instructions and a hardware recognized entity called a stack (FIG. 7A).

A stack is a mechanism that accepts, stores and allows retrieval of data on a last-in-first-out basis. Stacks reside in special segments called stack segments. A stack segment consists of a number of contiguous parts called stack frames 701 (FIGS. 7A and 7B) which are dynamically allocated to each procedure. The first stack frame is loaded into the top of the segment and succeeding frames are loaded after it. The last frame loaded is considered the top of the stack. The T-register 702 locates the top of the stack for the currently active process. A virtual T-register exists in the PCB of all other processes in the system.

Figure 7B:
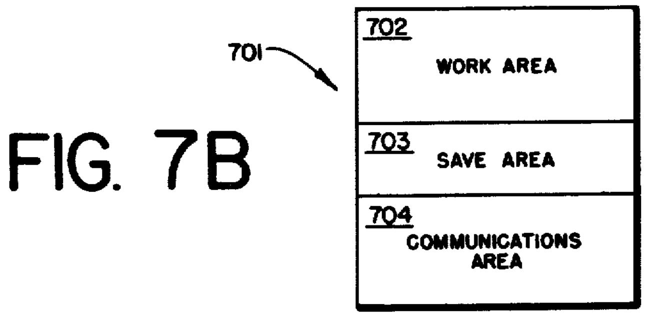

A stack frame 701 of FIG. 7B consists of three areas: a work area 702 in which to store variables, a save area 703 in which to save the contents of registers, and a communications area 704 in which to pass parameters between procedures. Prior to a procedure call, the user must specify those registers he wishes saved and he must load into the communications area the parameters to be passed to the called procedure. When the call is made, the hardware saves the contents of the instruction counter IC and specified base registers to facilitate a return from the called procedure.

Each procedure call creates a stack frame within a stack segment 701 and subsequent nested calls create additional frames. Each exit from one of these called procedures causes a stack frame to be deleted from the stack. Thus, a history of calls is maintained which facilitates orderly returns.

To insure protection between procedures executing in different rings, different stack segments are used. There is one stack segment corresponding to each protection ring per process. A PCB contains three stack base words which point to the start of the stack segments for rings 0, 1 and 2 associated with the process. The ring 3 stack segment can never be entered by an inward call; therefore, its stack starting address is not required in the PCB.

IV. PROCESS MANAGEMENT AND SYNCHRONIZATION

The system herein provides for multiprocessing operations which are controlled by an operating system using a combination of software, hardware and firmware. Software creates and deletes processes within the system while hardware and firmware multiplex processes on the CPU. In addition, a combination of software, hardware and firmware provide for synchronization between processes.

Processes are normally, but not always, started and stopped at the initiation and termination of i/o operations, during related job handling, and at other times for purposes deemed necessary by the operating system. Therefore, a communications system is necessary to efficiently start and stop related processes and to pass information between them. The hardware system herein provides internal messages called semaphores to provide a communications link between the processes.

A. PROCESS STATES

A process can be in one of four possible states at any time: running, ready, waiting or suspended. The hardware recognizes these four possible process states and executes various firmware procedures to effect process dispatching, state changes and to maintain data structures based on a process's state. The PCB contains a state field which defines the current state of its associated process.

A process is in the running state when it has control of the CPU. This state involves supplying the CPU with an address space (segment tables) and a starting address. The CPU then executes instructions in the procedure segments of the process. The process name J table word (logical address) of the PCB for the currently running process is retained in the running process word (BAR +60) within the system base (FIG. 6). (Note: The system base shown in FIG. 5 is the same as that shown in FIG. 6, but with some details omitted.)

The ready state is equivalent to running state except that the process does not have control of the CPU because it has not been recognized by the CPU. A process in the ready state is in contention for the CPU with other ready processes and the running process.

A process is in the wait state when it cannot continue until a specific event occurs such as a message via a semaphore. A waiting process is not in contention for the CPU but it may be in contention with other waiting processes for the required event.

A suspended process is a process which has been stopped for a time by software and may be resumed later. The decision to stop and resume the process is external to the process. Thus, a suspended process is not active and therefore cannot receive notification of event occurrences and cannot utilize the CPU.

A process is suspended under the following conditions:

1. By executing a Terminate instruction (as a result of having completed all its functions.)
2. By execution of a Suspend instruction by the operating system.
3. By the occurrence of an exception condition whereby control is transferred to the operating system.

B. PROCESS DISPATCHING

Processes move from one state to another voluntarily by action of the process while running or involuntarily by the actions of other processes. CPU firmware, known as the dispatcher, controls the transaction of processes between states. The dispatcher uses a set of queues (to be later described) to manipulate processes which are in the ready or the waiting states. Suspended processes are controlled by software.

Figure 8:
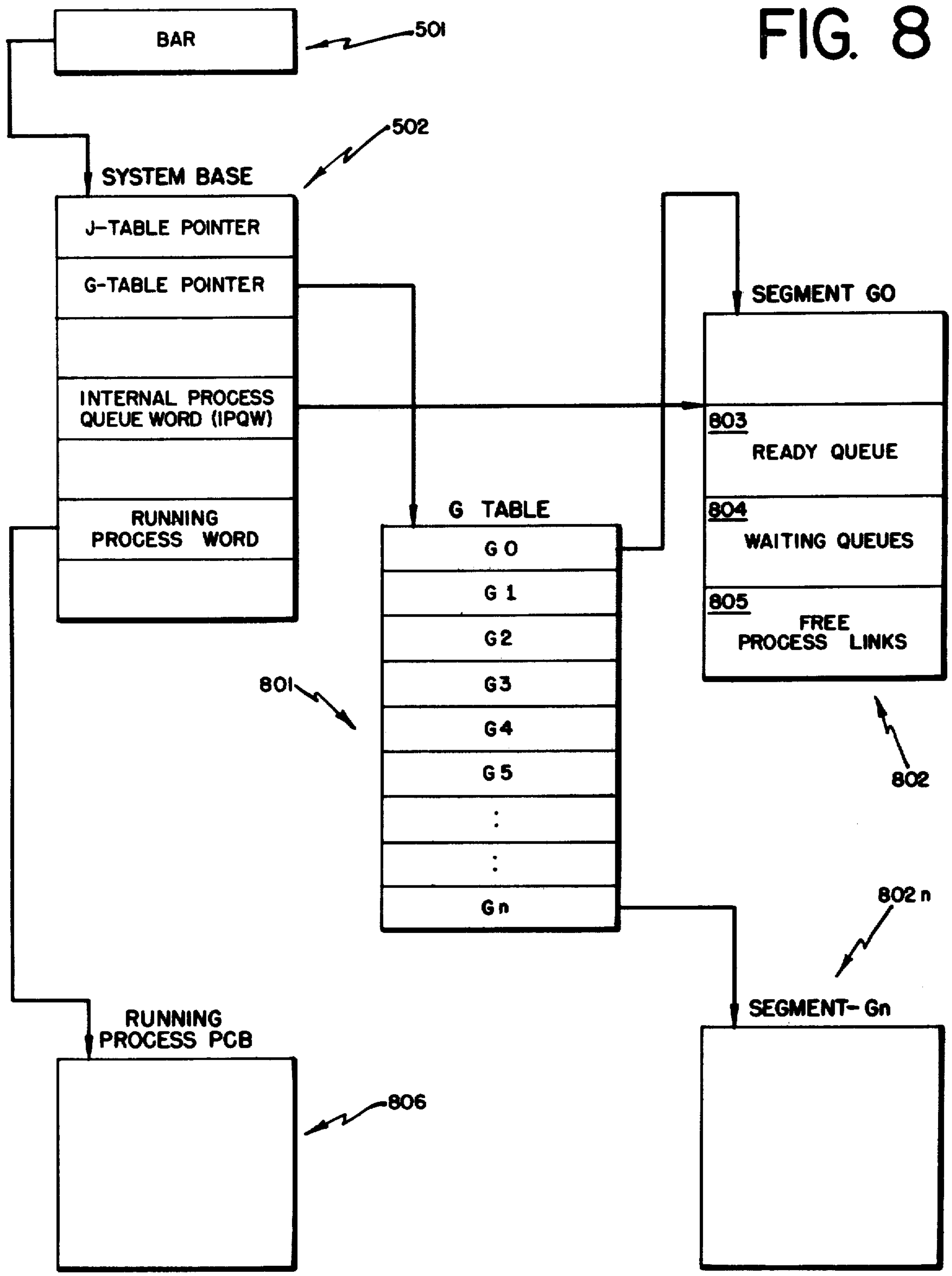
FIG. 8 is a schematic diagram of a system for addressing G-segments and in particular the queue of processes in the GO segment.
Figure 9:
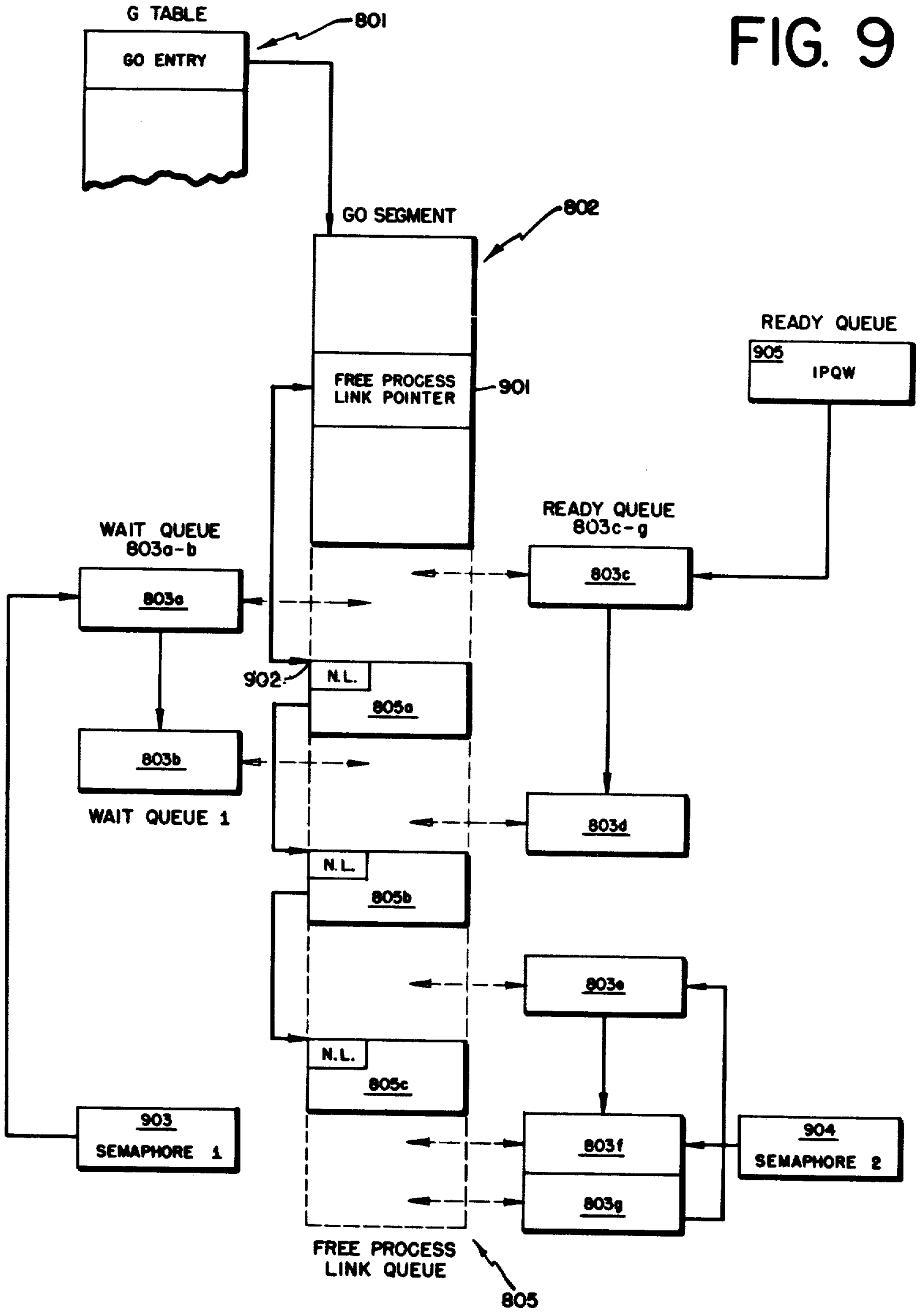
FIG. 9 is an exploded diagram of a GO segment illustrating queue of processes and process linking.

Referring to FIGS. 6, 8 and 9, a ready or waiting process is represented by a PCB and a special queue entry called a process link. FIG. 9 shows an exploded view of contents of the GO segment 802, and contains process links 803*a*–803*b* and 803*c*–803*g* of active processes, and free process links 805*a*–805*c* of suspended processes. Each process link specifies the process name (J, P), the process priority and a pointer to the next process link in the queue. There are various types of queues such as wait queue 803*a–b* and ready queue 803*c–g*.

A hardware device similar to the J table, known as the G table, (FIGS. 6 and 8) contains pointers to all general (known system wide) segments 802–802*n*. The first element, GO, of the G table 801 points to that segment 802 containing the dispatcher queues. A G-table pointer to the G table 801 is found in the system base 502 on FIG. 5. Also in the system base is an entry called the internal process queue word (IPQW) which identifies the head 805 of the ready queue 803*c*–803*g* in the GO segment 802.

Thus, the dispatcher can examine all ready processes processes by consulting the ready queue 803*c*–803*g*. When the currently running process changes states, the dispatcher removes the process link at the head of the ready queue and uses the J, P name to access its PCB. The process defined by the PCB then becomes the new running process.

Since more than one process may be awaiting on the same event, a queue of waiting processes 803*a*–803*b* exists for each event. Waiting processes are also strung together via process links 805 residing in the GO segment. A pointer to the head of a wait queue exists in a semaphore 903 (to be later described). A number of events exist for which a process may wait; therefore, there are a number of wait queues each of which has an associated semaphore 903, 904.

The number of processes ready or waiting varies dynamically. Thus, the number of process links required for the ready and wait queues also varies. This fact introduces a memory management problem for the dispatcher. The problem is solved by another queue called the free process link queue 805*a–c*. This queue links together all process links in segment GO that are not being used by the ready or the wait queues and can be used to extend a particular queue of ready or waiting processes. A pointer 901 to the head 902 of the free process link queue 805 resides near the beginning of the GO segment 802.

C. PROCESS SYNCHRONIZATION

Process synchronization is required to coordinate the activities of two processes working on the same task. The synchronization is achieved using semaphores 903–904 which are data structures residing in the address space of communicating processes. A semaphore is used to signal event occurrence and to handle queues of messages. An event in this context is anything observed by a process which may be of interest to some other process. The event may be the completion of an asynchronous operation or the availability of a resource.

A process uses two semaphore operations to signal an event occurrence. One operation sends a signal to a semaphore; the other picks up a signal from a semaphore. (The sending operation is often called a V-operation; the receiving operation is called a P-operation). The sending operation allows a process to send data or a signal that data are ready. The semaphore stores the signal until another process is ready to pick it up. Thus, the sending process is free to proceed, since it has sent the data. The receiving operation examines a specified semaphore and picks up the signal. If a signal is present, the receiving process continues executing. However, if there is no signal at the semaphore, the receiving process enters the wait state. The semaphore then serves as a pointer to the head of a wait queue. The process remains in the wait state queued at the semaphore until another process sends a signal to that particular semaphore. Thus, a semaphore can hold a signal until a process picks it up, or a semaphore can hold a process until a signal is sent to it.

Messages can also be passed from process to process. A message has the same present or not present quality as a signal plus additional information. Part of the information is supplied by hardware and part is supplied by the procedure of the process that sent the message. A message carries the process name of the sending process. Thus, many processes can send information through a single semaphore stamped with the sender's name.

A message semaphore may have a queue of messages waiting to be picked up by processes. As with signal semaphores, requirements for memory space increases and decreases thus presenting a memory management problem. Again, the problem is solved with a queue of free message links. These links reside in a known place in a segment that can easily be found when needed to supply or absorb message links.

Because semaphores and the queues built on them are shared by different processes, the total semaphore structure is protected. This is accomplished by hardware and software conventions that restrict access to any segment containing semaphores. Thus, semaphores must be in semaphore descriptor segments, some of which may be G segments (if system communications is necessary). However, all G segments (except GO) are semaphore descriptor segments.

Each semaphore descriptor contains a pointer to a semaphore. Semaphore addresses are developed via a semaphore descriptor, thus providing added protection for the semaphore. A semaphore segment can be addressed logically using a segment number and a relative location within the segment or directly using the G, D number.

PROCESS CONTROL BLOCK STRUCTURES

Figure 10A:
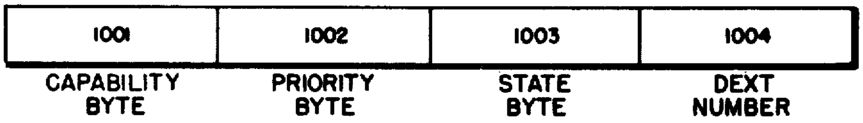
Figure 10B:
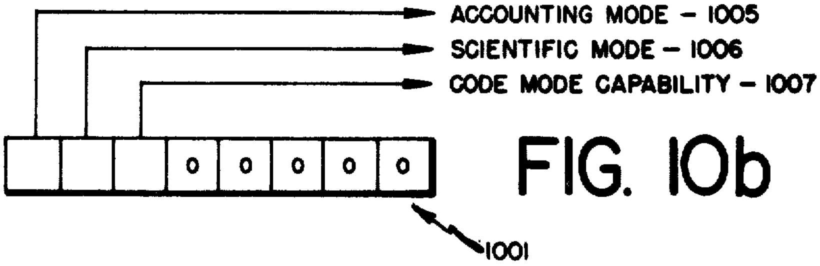

Referring to FIG. 4 there is shown the format of the process control block (PCB). The process control block 400 is a storage area in main memory made available to a process to save the CPU status. Addressing a PCB is performed as described supra in relation with FIG. 5. The PCB pointer 507 (FIG. 5) points to the process control block PCB at memory location 0 on FIG. 4. It will be noted that proceeding in a downward direction memory locations increase by 4 bytes whereas in proceeding in an upward direction from memory location 0 they increase by 8 bytes. The downward memory locations are considered positive from 0 whereas the locations in an upward direction from 0 are considered negative directions. The upward locations are optional and may or may not be included in the process control block; also locations 148 through 176 are also optional. (Note that the numerals under memory location specify the displacement in bytes from the 0 reference location of the process control block PCB and are not to be confused with the reference numerals commonly used to identify parts in a patent drawing). Starting at byte 0 up to but not including byte 16 there are stored four process main words PMW 0 through PMW 3 with each process main word PMW being 4 bytes in length. Process main word 0 occupies bytes 0 through 3 and is comprised of 4 parts: a capability byte, a priority byte, a state byte and a decor extension byte DEXT. Referring to FIGS. 10*a* through 10*d* there are shown details of process main word PMW 0, with further details of the capability byte 1001 shown on FIG. 10*b*. Referring to FIG. 10*b*, the first bit 1005 is the accounting mode bit for indicating whether or not time accounting functions are being performed for the process. When the accounting mode bit 1005 is set to binary 0 no time accounting function is being performed for the process; whereas when the accounting mode 1005 is set to binary 1, time accounting is being performed. The scientific mode bit 1006, when set to zero, indicates that saving of scientific register of the machine is not performed and the scientific register saving area located at bytes 148 to 176 on FIG. 4 does not exist in the process control block PCB. When the scientific mode bit 1006, is set to binary 1, the scientific optional feature exists and is being used in the process, and the scientific registers saving area is used to save the contents of the scientific registers when necessary. The code mode bit 1007 indicates whether or not a standard code set or compatibility code set is being used by the process, with a binary 0 in that position indicating that standard code set is being used; whereas a binary 1 in the third bit position 1007 indicates a compatibility code set is being used. The remaining of the bits of the capability byte are set to zero.

Figure 10C:
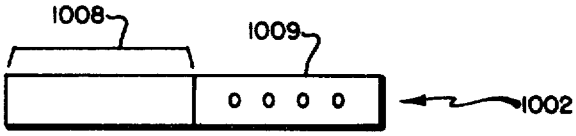

Details of the priority byte 1002 are shown on FIG. 10*c*. Referring to FIG. 10*c* the first four bits 1008 of priority byte 1002 is utilized to set the priority level of the process associated with that given process control block PCB. Each process is assigned one of 16 levels of priority which is used for ordering competing processes i.e., (a) for choosing the process to be run among ready processes, (b) for putting processes in queues. Priorities decrease from 0 to 15, and for a given priority level the FIFO (first in first out) rule is applied. The next 4 bits 1009 of priority byte 1002 are zeroes.

Figure 10D:
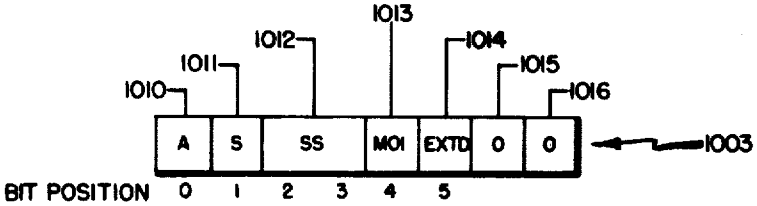

Referring to FIG. 10*d* details of the state byte 1003 are shown. A state byte is utilized to provide information with regard to the process associated with the process control block PCB 400. The active field bit A 1010 is set to binary 1 when the process is activated. The suspend field S 1011 is set to binary 1 when the process is suspended. The substate field SS 1012 is a 2 bit field and defines the following substates of the process: (a) when set to binary 00 the process is inactive; (b) when set to binary 01 the process is waiting in the queue of ready process (Q/PR/RDY); (c) when set to binary 10 the process is waiting on a semaphore in a queue of semaphores (Q/PR/S); (d) when set to binary 11 the process is being executed by the processor. The mid-operation field (MOI) 1013 is set to binary 1 when an interrupt happens and is taken care of during the execution of an instruction—i.e., before the completion of the process. The extended decor mode bit EXTD 1014 is set to 1 when the process is operated in an extended decor mode which is an emulation mode of the machine. Bits 1015 and 1016 are set to 0. The fourth byte of process main word PMW 0 contains the decor extension number and is utilized when the system is in emulation mode.

Figure 10E:
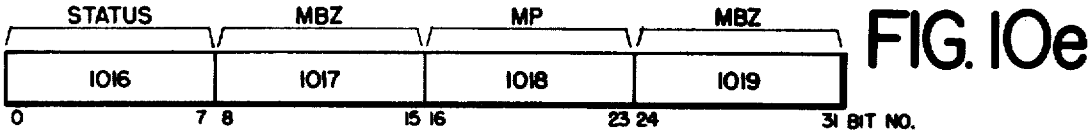

Process main word PMW 1 is stored in bytes 4–7 of the process control block PCB. Details of PMW 1 is shown on FIG. 10*e*. The status byte 1016 is the first byte in PMW 1 and stores the status register contents. The multiprocessor byte MP 1018 is significant in a multiprocessor architecture otherwise this field is zero. The second and fourth bytes of process main word 1 are the MBZ fields 1017 and 1019 respectively which must be zero for normal operation.

Figure 10F:
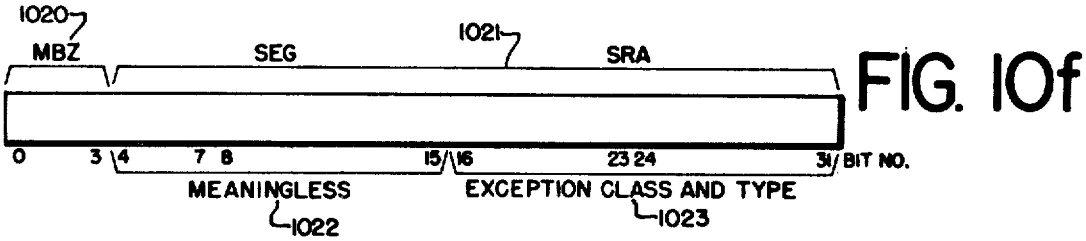

Process main word PMW 2 occupies bytes 8 through 11 of the process control block and is shown in more detail on FIG. 10*f*. Referring to FIG. 10*f* the field from bit 4 through bit 31 contains the local name SEG, SRA 1021 of the semaphore to which the PCB is linked when the process is either in the waiting or suspended states. The exception class and type field 1023 contains the class and the type of the interrupt-like exception which cause the process to enter the suspended state after an exception. The field from bits 4 through 15 is meaningless 1022 when a process is in a different state than those mentioned above.

Process main word PMW 3 occupies bytes 12 through 15 in PCB 400 and points to a decor extension table. Referring to FIG. 10*g* for details of PMW 3 the DETSZ field 1024 defines the number of entries in the table and if this field is zero no decor extension is allowed to the process. The DETA field 1025 is the absolute address of the decor extension table in units of 16 bytes and is significant only if DETSZ is not 0. The decor extension table is made up of DETSZ entries. Each entry is one byte size. The DEXT$^{th}$ entry of the table defines the capability of the process to operate in the decor extension mode DEXT. When the DEXT$^{th}$ byte is 0 the decor extension number DEXT is not allowed, whereas if the DEXT$^{th}$ byte is 1 the decor extension number DEXT is allowed. Values of DEXT other than 0 and 1 are illegal. (See FIGS. 10*a* DEXT number 1004).

Bytes 16 through 23 of PCB 400 contains 2 address space words ASW 0 and ASW 1 respectively and each ASW contains a pointer to an array of segment table words. Both ASW 0 and ASW 1 respectively have the same format shown on FIG. 10*h*. The size of the array of the segment table words is defined by the number of segment table words in an array and typically comprises six for ASW 0 and eight for ASW 1. The STWSZ field 1026 indicates the size of the array of the segment table words. The segment table word array field STWA 1027 contains the absolute address STWA of the array in units of 16 bytes—i.e., the absolute address of the array is 16 times STWA in bytes.

Bytes 24 through 27 in the PCB contain an exception word EXW shown in greater detail on FIG. 10*i*. The exception word contains a pointer (SEG, SRA) 1029 to an exception class table which defines the action to be taken following a process exception according to its class as stored in process main word PMW 2. (See FIG. 10*f*). The MBZ field 1028 of exception word EXW must be 0.

The stack word SKW located in bytes 28 through 31 of the PCB contains the value of the top of the T register of the stack of the process when the process is not running and is shown in greater detail in FIG. 10*j*. Referring to FIG. 10*j*, bits 0 and 1 define the TAG field 1030. The TAG indicates the type of descriptor by its contents and must be zero for SKW. Bits 2 and 3 of the SWK word contain the RING field 1031 which contains the ring number associated with the segmented address of the stack for protection purposes and in this case must be zero. Bits 4 through 31 contain the segment number SEG, and the segment relative address SRA 1032 and is a field which identifies the segment described in a segment table and the segment relative address within the segment. The stack word SKW is updated every time the process leaves the running state. It is used to restore the T register contents every time the process becomes running. In this last case the TAG 1030 and RING 1031 are tested to be zero, otherwise an illegal PCB exception occurs.

Bytes 32 through 35 of the PCB 400 contain the instruction counter content word ICW sometimes also referred to as ICC. Referring to FIG. 10*k* there are shown details of the instruction counter word ICW wherein the TAG field 1033 must contain binary 00 (i.e., values other than zero are illegal in the instruction counter). The current RING field 1034 occupying bits 2 and 3 defines the current ring number of the process to be used in determination of access rights to main storage. Bits 4 through 31 define the segment number and the segment relative address (SEG, SRA) 1035 which define the address of the next instruction to be executed.

The MBZ field in bytes 36 through 39 must be zero. (Note the MBZ field always indicates a field which must be zero). The MBZ word is tested every time the PCB is accessed from the name J, P. If it is not zero an illegal PCB exception occurs.

Stack base words SBW 0–2 occupy bytes 40–51 in the process control block 400. These words have the same format which is shown in greater detail on FIG. 10*l*. They are utilized during stack operations and whenever used their TAG field 1036 and RING field 1037 must be zero otherwise an illegal PCB exception occurs. Bits 4 through 31 contain the segmented address (SEG, SRA) 1038 of the first bytes of the stack segments for ring zero, 1 and 2 respectively.

Bytes 52 through 83 of the process control block 400 is a space reserved for the base registers saving area (8 words). Bytes 84 through 147 is a saving area which is utilized to save the values of all general registers (16 words). Bytes 148 through 179 is a saving area which is utilized to save the scientific registers (8 words).

Five double words are provided in the PCB 400 above the PCB zero address, for time accounting purposes when the accounting mode bit in the PMW 0 word is set. These words are located from PCB address minus 8 to PCB address minus 40. Each word contains a time or a time interval expressed in microsecond units in its first 52 bits with bits 52–63 filled with zeroes. The residual time out double word RTO (first 8 bytes above 0 in the PCB) contains the quantum of time which is actually spent by the processor on behalf of the process before a time out exception occurs. The RTO word is updated in the following way: each time the process exits the running state the process timer value is stored in the RTO word. Each time the process enters the running state, the process timer value is loaded from the RTO.

The running time accounting RUA double word at bytes 7 through 15 is a time counter which specifies the total amount of processor time a process was in the running state. The time accounted for is the time actually spent by the processor on behalf of the process exclusively. The RUA word is updated in the following way: each time the process exits the running state, the value of the process timer PT is read. The difference of the contents of RTO and PT is added to RUA. (Consecutively, the PT value is stored in RTO). Note that the time during which the process is suspended is not computed. The RTO and RUA words are updated even if the accounting mode bit is set to 0. However the CET, RTA, and WTA words (to be later described) are provided in the process control block only if the accounting mode bit in the process main word PMW 0 is set to 1. They are updated only in this case.

The waiting time accounting WTA word at bytes 17 through 23 is a real time counter which specifes the total amount of real time the process was in the waiting state. The WTA word is updated in the following way: each time the process exits the waiting state the time of day clock (not shown) value TOD is read and the value of TOD minus the value of CET word is added to the WTA word.

The ready time accounting RTA word located at by bytes 24 through 31 is a double word which is a real time counter which specifies the total amount of real time the process was in the ready state. The RTA is updated in the following way: each time the process exits the ready state, the time of day clock value TOD is read, and the contents of TOD minus the contents of CET is added to RTA.

The current entry time CET double word at bytes 32 through 39 contains the time of day at which the process entered one of the following states: ready, waiting, running, and suspended.

SYSTEM BASE STRUCTURES

Figure 11A:
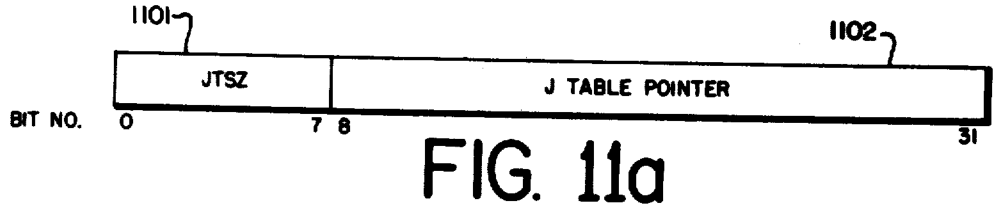
FIGS. 11*a* through 11*r* are block diagrams of structures in the system base.
Figure 11B:
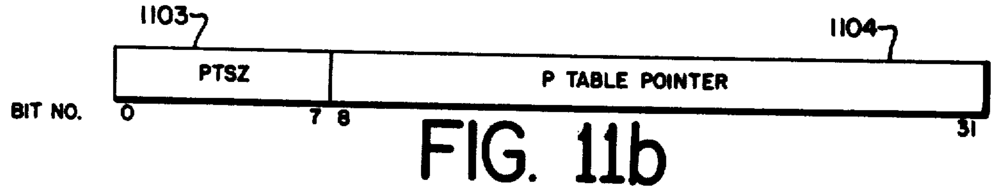
Figure 11C:
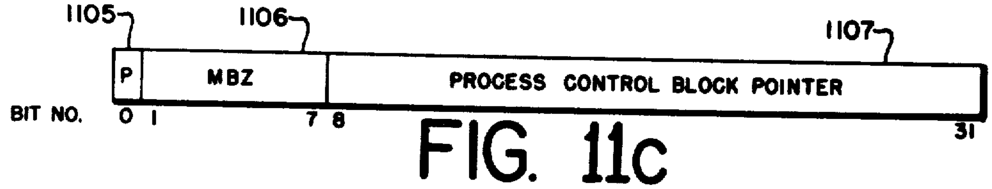

Referring to FIG. 6 the format of the system base 600 is shown. The system base resides in absolute main memory and is developed by firmware and is accessible via the boundary address register (BAR) which can be read but not written. The boundary address register BAR is below an area in main memory reserved for hardware and separates this area in memory reserved for hardware and the system base 600. Referring now to FIG. 6 the system base 600 contains a number of system attributes which includes a job step number and a process group number (J, P) for the currently running process. From the logical name of the process J, P, the absolute address of the corresponding process control block PCB is obtained. The size and address of the J table are defined by the contents of the J table word (JTW). This word is located at the address defined by the BAR register. The format of the JTW is shown on FIG. 11*a*. The size (JTSZ) 1101 or the J table 1204 on FIG. 12 defines the number of entries in the J table 1204 which may be up to 255 entries. The JTSZ 1101 is an 8 bit positive integer; an out of J table exception occurs if J is greater than JTSZ. The absolute address of the J table 1204 is obtained by multiplying the J table pointer 1102 by 16. The J table 1204 contains J table entries whose format is shown in greater detail on FIG. 11*b*. Each J table entry defines the absolute address of a P table 1205 which is obtained by multiplying the P table pointer 1104 by 16. The size (PSTZ) 1103 of a P table defines the number of entries in the P table. The PTSZ is an 8 bit positive integer which may typically vary from 0 to 255 to indicate the number of entries in the P table. An out of P table exception occurs if P is greater than PTSZ. Each entry of the P table 1205 defines the absolute address of a process control block (PCB) 1206 by multiplying the process control block pointer 1107 by 16. A presence indicator P 1105 indicates the absence of a PCB 1206 when set to binary 0 and indicates the presence of a PCB when set to binary 1. (When the presence indicator P 1105 is found to be 0 a vacant P table entry exception occurs). Bits 1 through 7 of the P table indicator (FIG. 11*c*) must be 0 (MBZ) 1106, otherwise an illegal P table entry exception occurs.

Figure 11D:
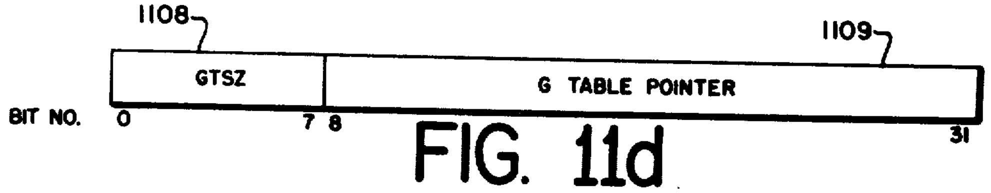
Figure 11E:
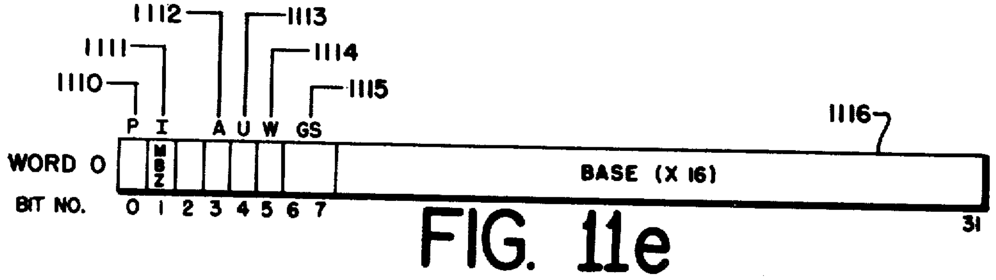
Figure 11F:
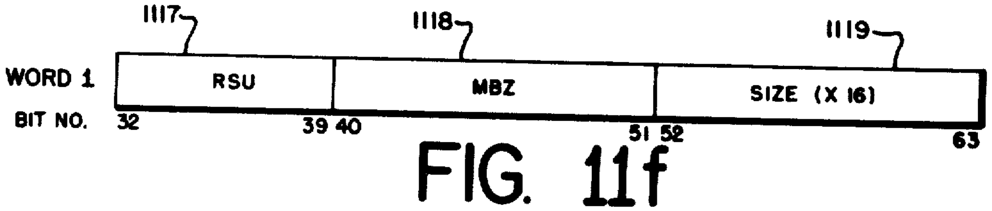

At address BAR plus 4 of the system base 600 there is the format byte of a G table word (GTW) shown in greater detail on FIG. 11*d*. The size and the address of a G segment-table 1212 on FIG. 1200 are defined by the contents of the G table word (GTW). The size (GTSZ) 1108 of the G table 1212 defines the number of entries in the G table which may typically be up to 255 entries. GTSZ is an 8 bit positive integer; an out of G table exception occurs if the G number is greater than the GTSZ. The absolute address of the G table 1212 is obtained by multiplying the G table pointer 1109 by 16. The format of the G segment table entry has a two word size (8 bytes) and is called a G segment descriptor. The format of the G segment descriptor is shown in detail on FIGS. 11*e* and 11*f*. All G segment descriptors are direct and therefore the indirect bit I, 1111 must be 0 otherwise an illegal segment descriptor exception occurs. The presence indicator P 1110 is a one bit field which when set to binary 1 indicates that a segment is defined in main storage for the segment number to which that descriptor corresponds; whereas if it cleared to 0 no segment is defined and a reference to the segment descriptor causes a missing segment exception. The available bit A 1112 is a one bit field which indicates whether or not the segment is available; it is only checked if this segment is defined (i.e., P equals binary 1), otherwise it is ignored. The used flag field U 1113 indicates whether or not the segment has been accessed. If the U bit is set to binary 0 the segment has not been accessed; whereas if the U field is set to binary 1 the segment has been accessed. The written flag field W 1114 indicates whether the segment has been written. If W is set to binary 0 the segment has not been written; whereas if W is set to binary 1 the segment has been written. The gating indicator GS 1115 of a G segment descriptor must be set to binary 01, otherwise an illegal segment descriptor exception occurs. The reason for this is that a G segment always contains semaphores (although the reverse is not true i.e., all semaphores are not required to be in a G segment) and instructions on semaphores require the GS code to be binary 01. The absolute address of the base of a segment 1214 is defined in the G segment descriptor of FIG. 11*e* by the 24 bit base field 1116; the content of this field is multiplied by 16 to obtain the absolute address. The second word of the G segment descriptor of FIG. 11*f* occupies bit position 32 through 63 in the G table 1212. The RSU field 1117, bits 32 through 39 is reserved for software use and is generally ignored when used as a G segment descriptor as it is in this case. The MBZ field 1118 must be 0 otherwise an illegal segment exception occurs. Since the MBZ field 1118 occupies bits 40 through 51 it sets the SIZN field 1119 which is the field for a small segment SIZN: hence all G segments must be of the small segment type. The segment SIZN 1119 is a 12 bit positive integer defining the number of bytes in the segment and the segment size is interpreted as a multiple of 16. Therefore the segment size for a G segment 1214 cannot exceed 216 bytes (small segments).

Figure 11G:
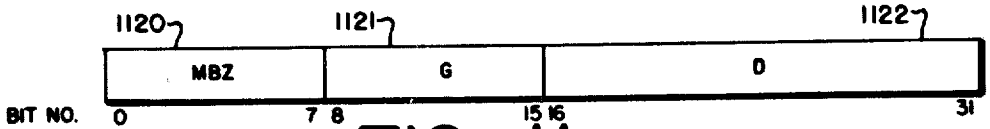

Referring once again to the system base 600 of FIG. 6 there are 9 system exception cell words located between BAR plus 8 and BAR plus 44. The format of the system exception cell words EXC is shown on FIG. 11*g*. Since semaphores are utilized for transmitting messages to dedicated processes when a system exception occurs the pointers to these semaphores are found in 9 locations of memory each location called a system exception cell—one per class of system exception. The MBZ field 1120 must be set to binary 0 otherwise a system check occurs. Each exception cell (EXC) contains the system name G, D 1121 and 1122 respectively.

The channel exception cell located in BAR plus 44 of the system base 600 has a format which is similar to the system exception cell previously discussed and contains the system name GD of a semaphore which is used for transmitting messages to dedicated processes when a channel exception occurs.

Figure 11H:
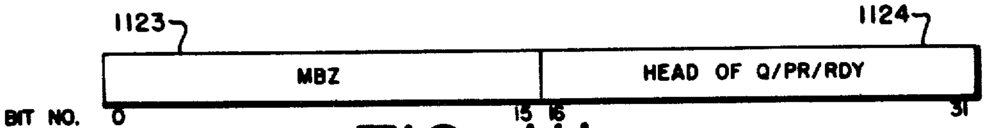

An internal processor queue word IPQW is located beginning at BAR plus 48 and details of its format are shown on FIG. 11*h*. The IPQW word points to the head of a queue of processes ready (Q/PR/RDY) as shown on FIG. 9 by reference numerals 905 and 805. The queue of processes ready (Q/PR/RDY) links all processes which are in the ready state. It is referenced by the HEAD of Q/PR/RDY-field 1124 (FIG. 11*h*) of the IPQW word by pointing to the top of the ready process queue. The HEAD of Q/PR/RDY-field 1124 contains a 16 bit positive integer which is the displacement from the base of the G segment number 0, referred to as the GO segment, to the first byte of Q/PR/RDY. If this Q/PR/RDY bit field is 0, the ready queue is considered to be empty. The MBZ field 1123 must be 0 otherwise a system check occurs.

Figure 11I:
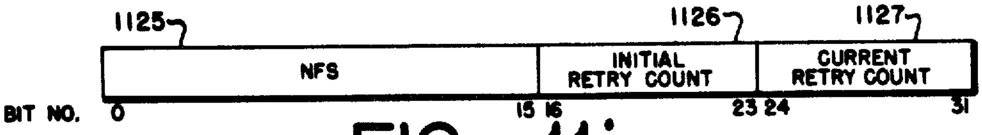

At BAR plus 52 of the system base 600 there is shown the storage for the initial and current retry counts whose format is shown in detail on FIG. 11*i*. The NFS field 1125 is a nonfunctional storage field and is not utilized by the system base. The initial retry count field 1126 and the current retry count field 1127 are used to control the number of times automatic instruction retry is executed before a machine error is made to produce a machine failure exception condition. They are loaded with the same number by a Reset Retry Count (not shown herein).

Figure 11J:
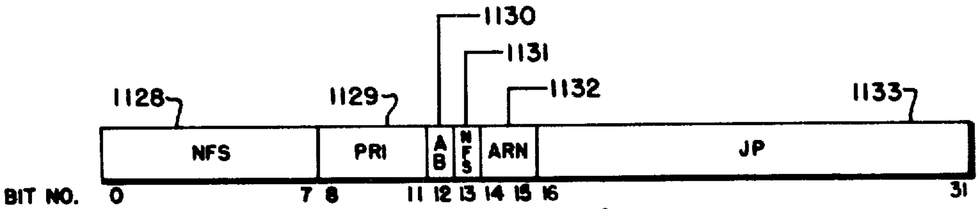

The running process word (RPW), shown in FIG. 11*j*, is stored in BAR plus 56 of the system base 600 and is used to store the name of the running process with its priority in case of a monoprocessor architecture. The NFS fields 1128 and 1131 respectively are nonfunctional storage fields and may be utilized for any purpose by any facility but is generally not utilized by the system base. The priority level of a running process is stored in the PRI field 1129. An asynchronous trap bit is stored in AB field 1130; whereas an asynchronous trap ring is stored in ARN field 1132. The logical name J, P of the running process in case of a monoprocessor architecture is stored in the J, P field 1133.

Figure 11K:
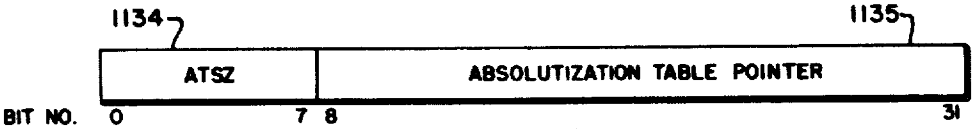

An Absolutization Table Pointer word shown on FIG. 11*k* is located at BAR plus 60 in the system base 600 and is utilized in initial system load to initialize the absolute addresses in the initial system load (ISL) program by adding the contents of BAR to all absolute addresses in the ISL program. The Absolutization Table Pointer 1135 defines the location of an Absolutization Table (not shown). The Absolutization Table Size is shown by the ATSZ field 1134.

Figure 11L:
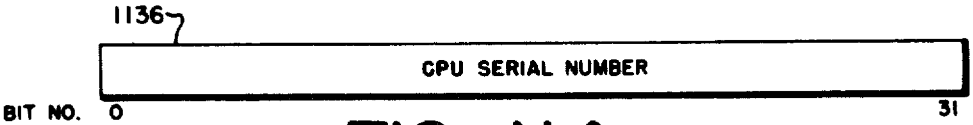

The CPU serial number word shown on FIG. 11*l* is a 4 byte word located at BAR plus 64 and contains the serial number of the CPU in the CPU serial number field 1136.

Figure 11M:

A main storage upper limit word shown on FIG. 11*m* is located at BAR plus 68 and indicates the main storage upper limit 1139 by providing the absolute address of the last available word in main storage.

Figure 11N:
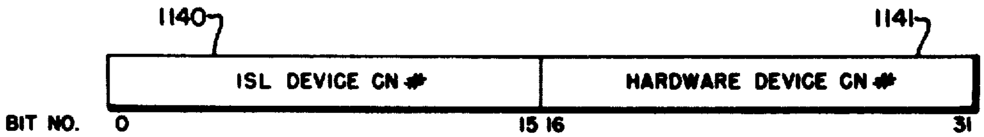

At BAR plus 72 there is located a word shown on FIG. 11*n* for providing the initial system load ISL device channel number (CN) 1140 and the hardware device channel number (CN) 1141.

Figure 11O:
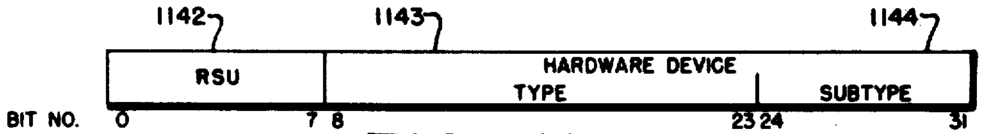
Figure 11P:
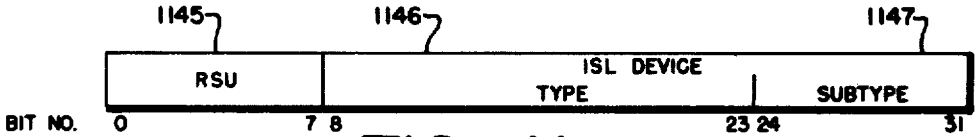

The type and subtype of a device used in the computer system is shown by a hardware device type word (FIG. 11*o*) in fields 1143 and 1144 respectively; where the RSU field 1142 is reserved for software. This word is found in the system base at BAR plus 76. A similar word having a similar type format shown on FIG. 11*p* contains the type and subtype of the device used in the initial system load. This word is located at BAR plus 80.

Figure 11Q:
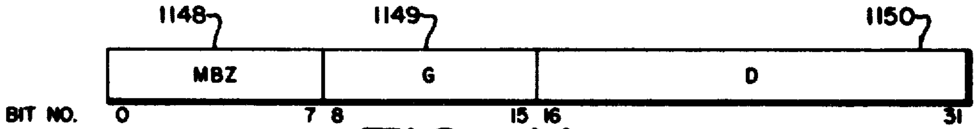
Figure 11R:

When the restart button of a computer is pressed, a simulated V-operation is performed on a semaphore and the Ready state is entered. A pointer to this semaphore is found at BAR plus 84 of the system base 600 and is called a restart cell word, and has a format shown on FIG. 11*q*. The format is similar to the system exception cell described supra and contains the system name G, D of a semaphore in the G field 1149 and D field 1150 respectively. The MBZ field 1148 must be 0.

Where there is more than one processor to the computer system, a word is provided in the system base 600 at BAR plus 88 for multiprocess extension. Details of this word are shown on FIG. 11*r*.

EXAMPLES OF SYSTEM BASE AND PROCESS CONTROL BLOCK USE

Figure 12:
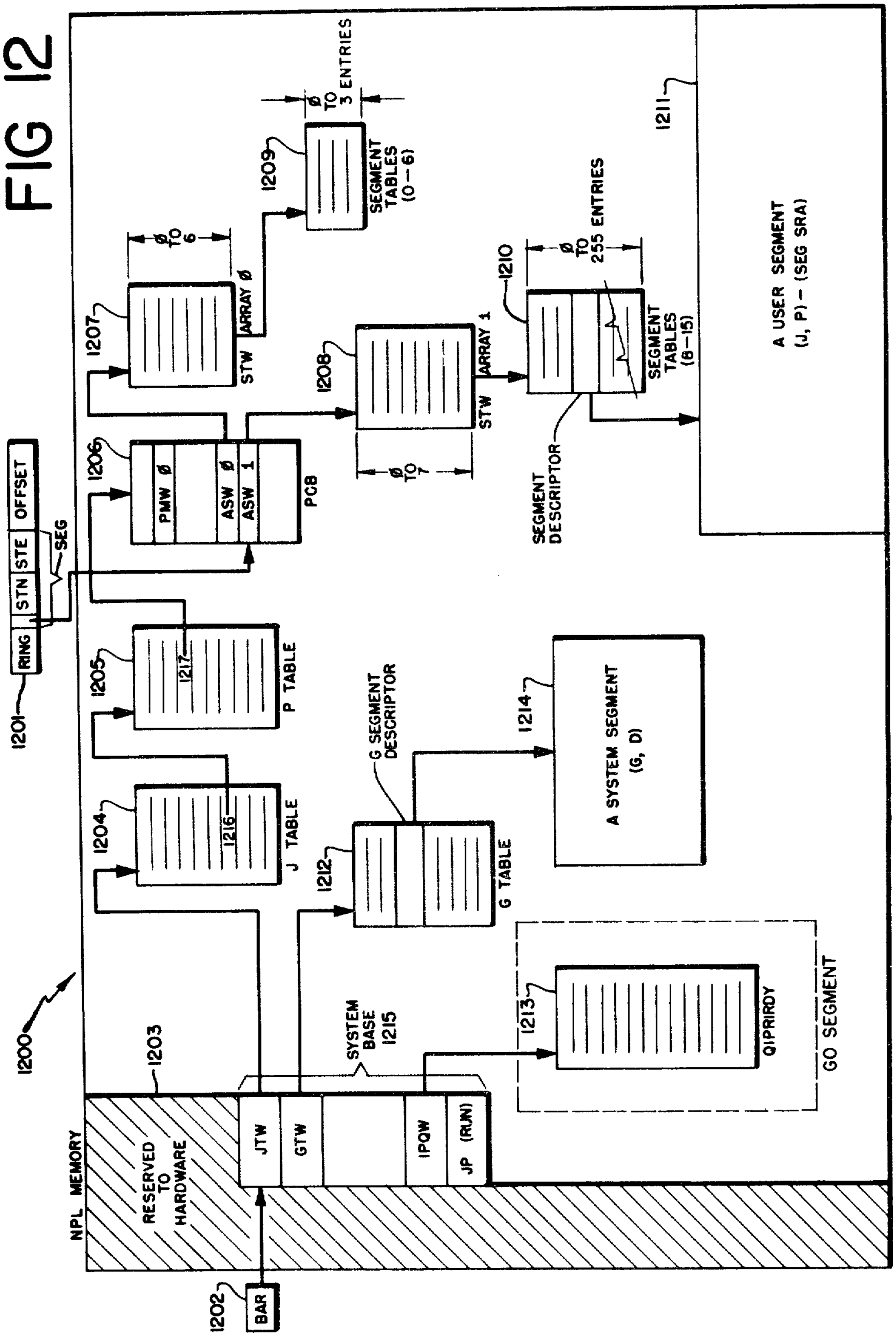
FIG. 12 is a schematic diagram of addressing schemes of user and system segments utilizing the system base and PCB structures.

Referring to FIG. 12 there is shown one example, how the system base may be utilized in combination with the process control block in order to address and access a user segment, a system segment, or a queue of processes ready (Q/PR/RDY) segment. Main memory 1200 has a portion 1203 reserved for hardware use. A boundary address register BAR 1202 separates the system base 1215 from the portion of memory 1203 reserved for hardware. The boundary address register BAR 1202 is utilized to address items in the system base 1215 by adding the contents of the boundary address register to the displacement in 4 byte units of the item desired in the system base. This address then points to the first byte of the item in the system base desired. In FIG. 12 the BAR 1202 is pointing at the J table word (JTW). The J table word, as previously discussed, has a pointer which points to a J table 1204. By indexing to the J number shown on FIG. 5, a J table entry 1216 is obtained. At the J table entry there is a P table pointer which points to the absolute address of the P table 1205. By indexing to the P number (see FIG. 5) within P table 1205 the absolute address of the process control block 1206 is obtained. As previously shown in process control block PCB 1206 there are two address space words ASW 0 and ASW 1. The high order bits of the segment table number field STN in the base register 1201 is used to access one of these two address space words, in this instance ASW 1 which has a segment table word array STWA pointer that points to segment table word array STWA 1208. Together with the segment table number STN of the base register 1201 one of 8 segment table words is accessed in STWA 1208, which points to one of 8 segment tables 1210. The segment table entry STE from base register 1201 is then utilized to make one of 256 entries in segment table 1210 where a segment descriptor is located. The segment descriptor is then utilized to access a user segment 1211. (For greater detail see "Segmented Address Development" invented by Jacques Michel Jean Bienvenu, filed on May 15, 1974 and having Ser. No. 470,430 and assigned to the same assignee named herein as the instant invention and is hereby incorporated by reference herein).

In order to access a system segment 1214 which is utilized to store semaphores a G table word GTW is utilized in the system base 1215. The address of the G table word is obtained by adding the displacement of the G table word in the system base to the boundary address register BAR 1202. (See FIG. 6). The G table word GTW includes a G table pointer which points to a G table 1212. By utilizing a G number available to the system and indexing in the G table a G segment descriptor is accessed which is utilized to address a system segment 1214.

Similarly the system base 1215 is utilized to access the queue of process ready (Q/PR/RDY) 1213 by locating an internal processor queue word IPQW which points to the Q/PR/RDY segment 1213.

CONTROL UNIT

Referring to FIGS. **13*a*–13*c* details of the control unit are shown. The control unit, although shown separate from the central processing unit (CPU), is in actuality a part of the CPU and is comprised of a control store unit CSU 1301, a control store interface adapter CIA 1302 and appurtenant subunits, control store loader CSL 1303 and control and load unit CLU 1304.**

The control store unit CSU 1301 receives micro-instructions from the control store loader CSL 1303 via the control and load unit CLU 1304 and the control store interface adapter CIA 1302. Under normal operating conditions, microprograms are loaded from an external source during system initialization and become a permanent control function of the machine. However the control store unit CSU 1301 has the ability to be reloaded and initialized in a manner that provides for a variety of central processing unit CPU 1306 operational modes. The following modes of operation of the CPU are available under control of the CSU 1301; (a) native mode; (b) emulation mode; (c) concurrent native and emulation modes; (d) diagnostic mode. This capability is possible because the micro-instructions resident in the CSU are the source of micro-operations used to control the operation of all other CPU functional units such as the emulation unit 1316, the arithmetic logic unit ALU 1317, the instruction fetch unit IFU 1318, the address control unit ACU 1319 and the data management unit DMU 1321. Also shown within the central processing unit CPU 1306 are previously described general registers 1307, base registers 1308, scientific registers 1309, T-registers 1310, status registers 1311, instruction counter IC 1312, and hardware control mask register 1313.

Typically the control store unit CSU 1301 is a 9K bipolar integrated circuit programmable read-only memory (PROM) mixed with read/write random access store (RAM). It has a typical 150 nanosecond read cycle and a 450 nanosecond write cycle. Each location of control store stores one 84-bit micro-instruction word (to be later more fully described), and each micro-instruction word controls one CPU cycle. As each location of the control store of the control store unit CSU 1301 is read, its contents are decoded by micro-operation decoders which provide micro-operation control signals each of which causes a specific operation within the CPU to take place (to be later described in detail).

By grouping locations within each micro-instruction word (to be later described in detail) control store sequences are obtained that can perform a specific CPU operation or instruction. As each instruction is initiated by the CPU, certain bits within the op-code are used to determine the control store starting sequence. Testing of certain flops (not shown) which are set or reset by instruction decode functions allows the control store memory to branch to a more specific sequence when necessry.

The control store interface adapter CIA 1302 communicates with the control store unit 1301, the data management unit DMU 1321, the address control unit ACU 1319, and the arithmetic logic unit ALU 1317 for directing the operation of the control store memory 1333 of FIG. **13*b*. The CIA 1302** includes logic for control store address modification, testing, error checking, and hardware address generation. Hardware address generation is utilized generally for developing the starting address of error sequences or for the initialization sequence.

The data management unit DMU 1321 provides the interface between the CPU 1306 and the main memory and/or buffer store memory shown on FIG. 1. It is the responsibility of the data management unit to recognize which unit contains the information required by other units and strobe the information into the CPU registers at the proper time. The data management unit DMU also performs the masking during partial write operations.

The instruction fetch unit IFU 1318 interfaces with the DMU 1321, the ACU 1319, the ALU 1317, and the CSU 1301, and is responsible for keeping the CPU supplied with instructions. The instruction fetch unit has the next instruction available in its registers before the completion of the present instruction. To provide this capability, the instruction fetch unit IFU 1318 contains a 12-byte instruction register (not shown) that normally contains more than one instruction. In addition, the IFU, under control of the CSU, requests information (instructions) from main memory before the instruction is actually needed, thus keeping its 12-byte instruction register constantly updated. Instructions are thus prefetched by means of normally unused memory cycles. The instruction fetch unit also decodes each instruction and informs the other units of the instruction's length and format.

The address control unit ACU 1319 communicates with the IFU, ALU, DMU, and the CSU via the CIA. The ACU 1319 is responsible for all address development in the CPU. All operations of the ACU, including transfers to, from, and within the unit, are directed by CSU micro-operation and logic in the unit. The normal cycling of the ACU depends on the types of addresses in the instruction rather than on the type of the instruction. Depending on the address types the ACU may perform different operations for each address in an instruction. The ACU also contains an associative memory 1319*a* that typically stores the base address of the 8 most recently used memory segments, along with their segment numbers. Each time a memory request is made, the segment number is checked against the associative memory contents to determine if the base address of the segment has already been developed and stored. If the base address is contained in the associative memory 1319*a*, this address is used in the absolute address development, and a considerable amount of time is saved. If the base address is not contained in the associative memory 1319*a* it is developed by accessing the main memory tables. However, after the base address of the segment is developed, it is stored in the associative memory, along with the segment number, for future reference.

Interfacing with the ACU, IFU, DMU, and the CSU is the arithmetic and logic unit ALU 1317. Its primary function is to perform the arithmetic operations and data manipulations required of the CPU. The operations of the arithmetic logic unit are completely dependent on micro-operation control signals from the control store unit CSU 1301.

Associated with the ALU 1317 and the CSU 1301 is the scratch pad memory unit LSU 1315, (sometimes referred to also as the local store unit). It is typically comprised of 256-location (32 bits per location) solid state memory and selection and read/write logic for that memory. The scratch pad memory 1315 is used to store CPU control information and maintainability information. In addition, the scratch pad memory 1315 contains working locations which are primarily used for temporary storage of operands and partial results during data manipulation. Also associated with the ALU 1317 is an auxiliary memory 1317*a* comprised typically of 64 flip-flops for storing miscellaneous states of the computer system.

The CPU also has a clocking unit 1320 and is essentially 2 clocking systems in 1: the first clocking system generates the timing for the control interface adapter CIA 1302 and the second clocking system generates the timing pulses for the operations of the functional unit within the central processing unit.

Figure 13A:
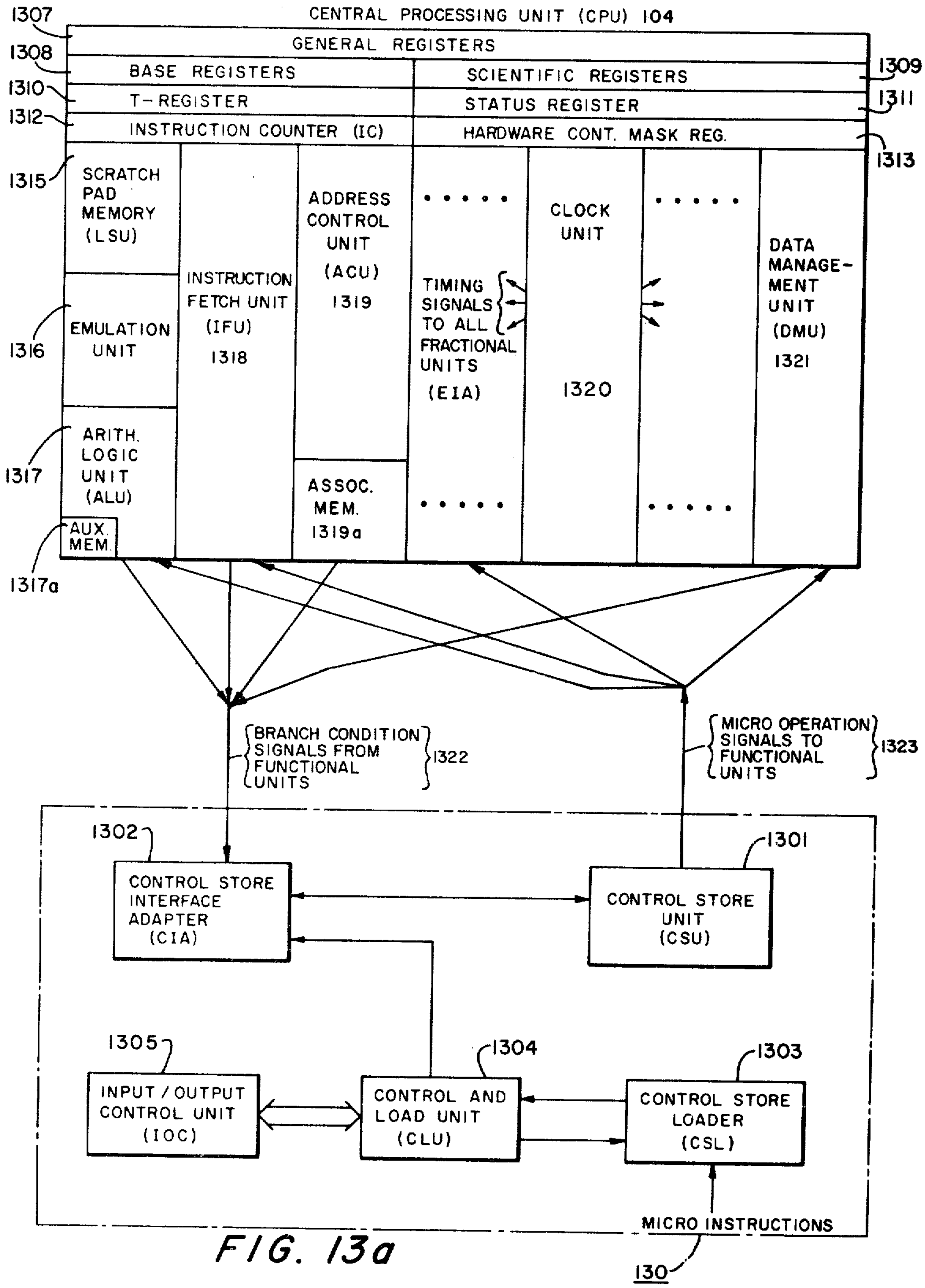
FIG. 13 (i.e., FIGS. 13*a*, 13*b*, and 13*c*) is a schematic diagram of the control unit.
Figure 13B:
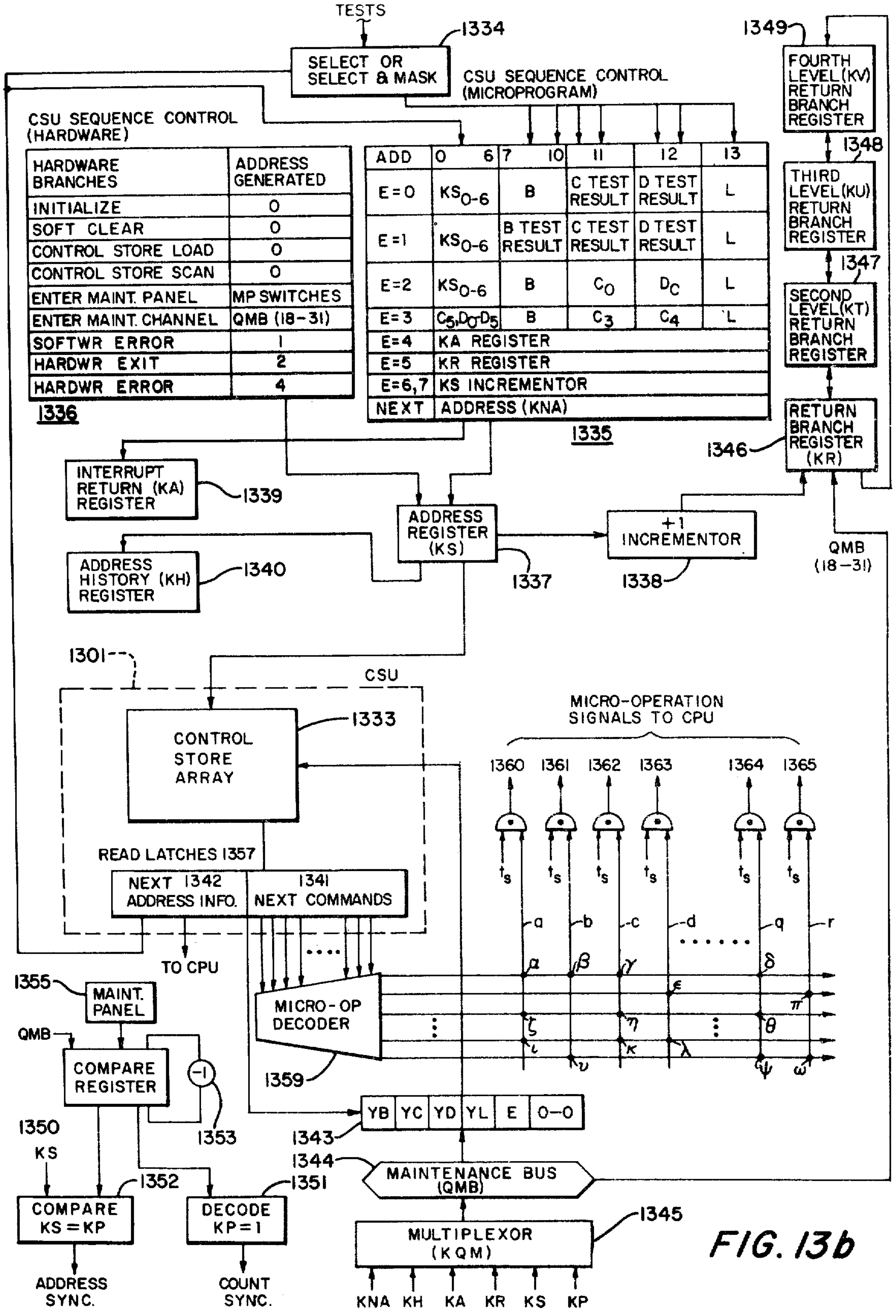
Figure 14I:
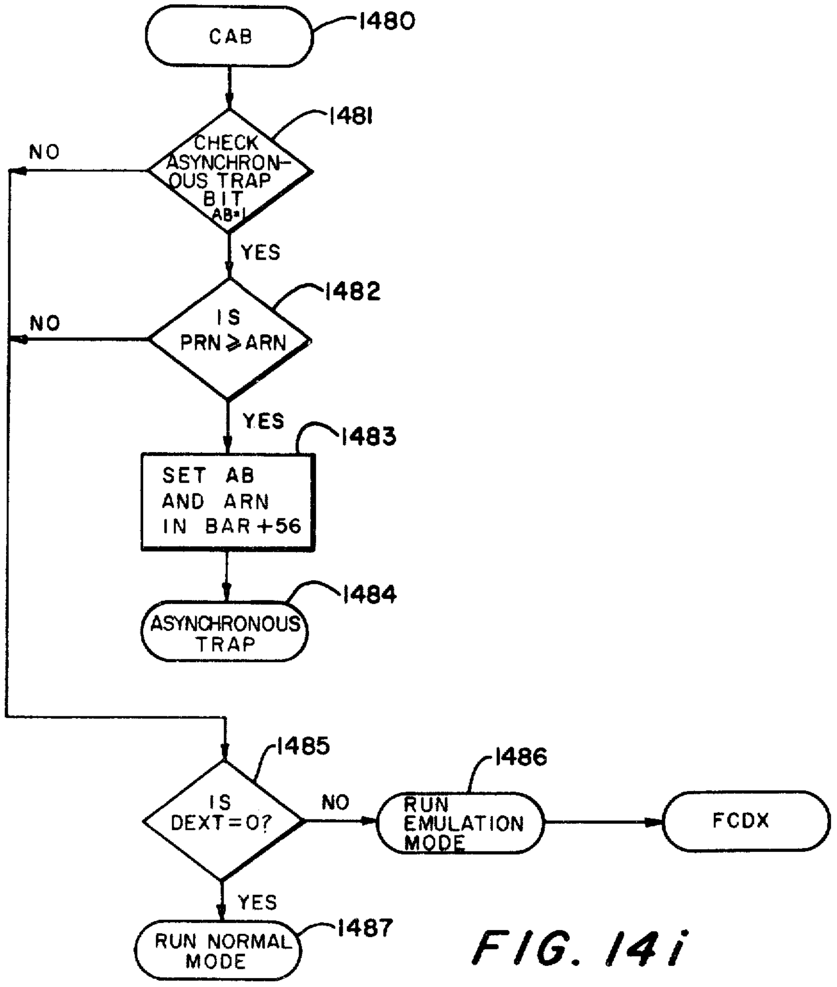
FIGS. 14*a* through 14*i* are flow diagrams of the dispatcher unit in firmware.
Figure 13C:
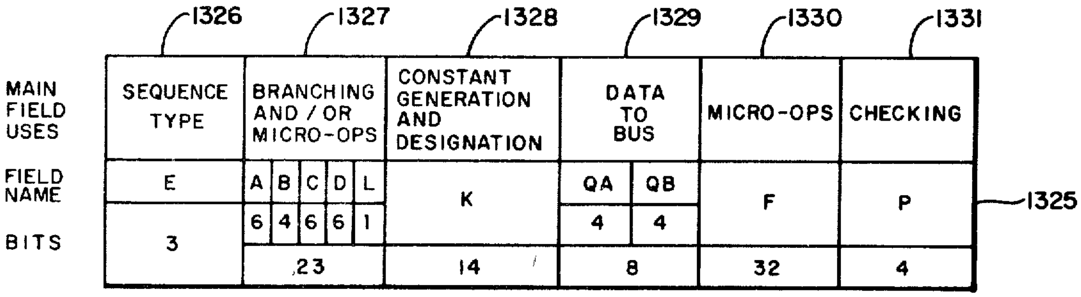

Referring now to FIG. 13*c* there is shown the format of the control store word 1325. The control store word is typically 84 bits wide and is divided into 6 main fields:

a. sequence type field 1326 (3 bits);
b. branching and/or micro-operations 1327 (23 bits);
c. constant generation and designation 1328 (14 bits);
d. data to bus 1329 (8 bits);
e. micro-operations 1330 (32 bits); and
f. checking 1331 (4 bits).

The 3-bit E field of the control store word 1325 is used as a sequence control field. There are typically 7 different sequence types and 1 reserved type for the instant computer system. Referring to block 1335 of FIG. 13*b*, when E field equals binary 0, 1, or 2, the branching field A, B, C, D, and L of micro-instruction 1325 is utilized to generate the next address. The first 6 bits of KS register 1337 is utilized together with the B field, a C test results, the D test results and the L field to provide the next address of the next micro-instruction which is then placed in address register KS 1337. When the E field is set to binary 4 (see block 1335) the next address selected is taken from interrupt return register KA 1339. The address stored in the KA register is the one generated by the next address generation logic when the hardware interrupt occurs. When the E field is set to binary 5 a branch is used to initiate a subreturn from a micro-program subroutine. When used, the contents of the return register KR 1346 are used as the next control store address. The return register 1346 is loaded by issuing a control store command which will load present control store address in KS register 1337 plus 1, from incrementor 1338, into the KR register 1346. A one-level-nesting subroutine ability is provided via the KT return branch register 1347. Every time the KR register 1346 is loaded the old contents of the KR register is transferred to the KT register 1347 every time the micro-program return is called; the contents of the KT register will transfer to the KR register. Third level nesting subroutine ability is provided by the KU register 1340; and fourth level nesting subroutine ability is provided by the KV return branch register 1349. When the E field of the control store word is set to binary 6 the next control store word addressed is equal to the present address in KS register 1337 plus 1 in incrementor 1338. When the E field is set to binary 7 the CSU 1301 enters the diagnostic mode and the next address will be the present address plus 1.

In addition to the sequencing control of branching to the next control store address described above and shown in block 1335, there is hardware generated sequence control shown in block 1336 of FIG. 13*b*. (Note: Blocks 1335 and 1336 are in actuality hardware registers drawn so as to depict the different forms that the microinstruction words may take.) The hardware generated branches are overriding conditions (such as erros, initialize, control store scan, etc.) which suppress the E field and force a fixed address into the control store address register KS 1337. The branch is made by forcing an interrupt line high (not shown) for one clock period and storing the address which would have been generated under the control of the E field into the KA interrupt return register 1339. A hardware generated address will be placed into the control store address register. Certain hardware/firmware generated interrupts take priority when the interrupt-block flip-flop (not shown) which prevents additional interrupts in their class from being executed until the interrupting condition has been satisfied. A firmware micro-operation exists for controlling the resetting of the interrupt-block flip-flop for those sequences which are under firmware control. Those sequences under hardware control automatically generate a reset of the block-flop at the end of the sequence. The following conditions, listed by priority, exists in this category; (a) control store load; (b) control store scan; (c) hardware error; (d) software error. The remaining hardware conditions do not set the interrupt block-flop but do cause an immediate action to occur when generated. The following conditions listed by priority, exist in this category;

(a) initialize;
(b) soft-clear;
(C) enter maintenance panel;
(d) enter maintenance panel;
(e) hardware exit.

An initialize signal causes the CSU 1301 to branch to address binary 0, clear hardware resettable errors and execute a control store load operation followed by a control store scan sequence under hardware control. It will also perform system initialize. A soft-clear signal causes the CSU 1301 to branch to address binary 0, clear hardware resettable errors and reset the interrupt block-flop. An enter maintenance panel signal causes the CSU to branch to the address preset in the CSU address switches on the maintenance panel (not shown).

An enter maintenance channel signal causes the CSU to branch to an address generated via the maintenance channel (not shown). The address loaded is from maintenance bus QMB 1344, which is part ot the maintenance channel, and is right-justified. A hardware exit signal causes the CSU to branch to binary address 2. This sequence is used as a maintenance facility. At the end of the sequence a return is initiated by issuing an E field branch with the E field set to binary 4.

A control store load signal causes the CSU to branch to address binary 0. It also turns off the CSU read-cycle flop (not shown), the system clock 1320, and places the CSU in the load state. In the load state the CSU can be loaded from the control store loader CSL 1303, the IOC 1305, the main memory 102, or the maintenance panel 1355. When loaded from the CSL an automatic scan is generated at the end of the load. When loaded from any other media a scan may be issued by either generating a micro-operation signal or setting the scan switch on the maintenance panel. A control store scan signal causes the CSU to branch to an address binary 0. A control store scan is under hardware control for the duration of the sequence. During the scan the system clock 1320 is off and therefore no commands or tests are executed. At the end of the scan sequence the hardware transfers the contents of the interrupt return register KA to the address register KS, the system clock is turned on and control is returned to the firmware.

A hardware error signal causes the CSU to branch to address binary 4. In the normal processing mode a hardware error detected in any CPU functional unit will activate a hardware error line (not shown). The control store sequence generated will test the system conditions to determine the action to be taken. In the diagnostic mode, error conditions which are hardware detectable are visible to microdiagnostics. The microdiagnostics control the action to be taken. A software error signal on the other hand causes the control store to branch to address binary 1. This address is the start of the software error reporting sequence which is under micro-program control.

Referring once again to FIG. 13*c* the E field 1326 is a 3 bit field for the branch code as previously described. The branching and/or micro-operation field 1327 is comprised of the A, B, C, D, and L fields (also shown on block 1335 of FIG. 13*b*) wherein the A field is the upper 6 bits of the next address, the B field is the middle 4 bits of next address of the mask field on 64-way branch, the C field is a 6 bit test field for 1 of 64 tests, the D field is another 6 bit test field for 1 of 64 tests, and the L field is the least significant bit. The K field 1328 is a 14 bit field of which 6 bits are for the constant field, 4 bits are for a constant or steering field, and 4 bits are a steering field for a constant. The data to bus field 1329 is comprised of the OA field having 4 bits for controlling information to the QA portion of the QMB bus 1344 and the QB field has 4 bits for controlling information to the QB portion of the QMB bus 1344. The F field 1330 is a 32 bit field which is coded to generate micro-operation subcommands. The P field 1331 is comprised of 4 bits reserved for checking.

In operation the micro-instruction words are stored in the control store array 1333. During a cycle of operation, the control store array is adressed by the contents of the KS address register 1337. This causes the contents of the location specified by the address to be read into the group of read latches 1357. Portions of the word contents of the read latches are distributed or transferred to storage registers within each of the functional units in the CPU. Each functional unit includes decoding logic circuits for generating the requisite subcommands specified by the control store word under control of the system clock source. In general decoding is performed within each functional unit in the CPU rather than being performed centrally in order to minimize the decoding time and to reduce the number of cables which would be normally required for transmitting command signals if decoding were performed centrally. Additionally, the decoding is done within each unit to avoid timing problems arising from differences in cable delays. Further, by decoding subcommands with each unit, those signals which are representative of certain conditions existing within the functional unit are required for the generation of certain subcommand signals do not have to be returned to the CIA unit 1302. A typical decoder unit 1359 is shown in FIG. 13*b* as receiving various fields from micro-instruction words and generating micro-operation signals *a, b, c, d, . . . q, r.* A typical micro-operation decoder 1359 recives commands from a micro-instruction word. The field from the micro-instruction word is decoded and sets one of a plurality of lines *s, t, u, . . . y, z* high. A matrix is formed by having predetermined control line impedance coupled to the *s–z* lines at points α, β, γ, . . . ψ, ω. Typically then when the field from a micro-instruction is decoded one of the lines *s–z* goes high. Since the black dots shown in the matrix by Greek letters α through ω represent impedance coupling between the two sets of lines, any electrical signal propagating along any horizontal wire will be coupled through to propagate along the vertical wire *a–r* where an impedance coupling (black dot) is indicated. Each vertical line *a–r* then may be coupled as one input to one each of AND gates 1360–1365. Other input signals may also be coupled to AND gates 1360–1365 including a timing signal $t_s$ from the central timing unit. Accordingly as each timing signal $t_s$ goes high those gates which have all the other input signals high will be enabled and will provide micro-instruction signals to predetermined functional units in the CPU. For example, if a command 1341 from read latch 1357 is decoded and a horizontal line is high the *a, b, c,* and *q* vertical control lines will be high and AND gates 1360, 1361, 1362, and 1364, will be enabled as the $t_s$ timing signal is applied to these gates sequentially. Hence the combination in which the vertical control lines are coupled to the horizontal control line at different points represented by the Greek leters α through ω represent a permanent switching matrix for supplying micro-operation signals to the central processing unit CPU for controlling the functional units within the central processing unit by micro-instructions furnished from the control store array 1333. Thus permanent firmware having an alterability feature can be built into the machine of this invention by merely specifying the sequence of microoperations that is required as a capability of the computer system.

Under normal conditions data is written into the control store array 1333 via the CPU write-data register also known as the local register YO 1343. A control flop (not shown) defines whether the upper half or lower half of the storage array is to be written. Data from the control and load unit CLU 1304 arrives at the CIA/CSU via the maintenance bus QMB 1344 and is buffered by the storage local register YO 1343 before being written into the control store array 1333. The storage local register 1343 is time shared as both a read and a write local register. The multiplexor KQM 1345 may be controlled by either the maintenance panel 1355 or by micro-diagnostics and provides a read out path from the registers connected to it. A compare register KP 1350 is provided for non-functional use and is used mainly for maintenance purposes and is utilized along with compare logic 1352 and decode logic 1351.

DISPATCHER FIRMWARE FOR CONTROL OF PROCESSES

The dispatcher is a firmware/hardware unit whose main purpose is to manage the various queues of processes, and to switch between processes and includes the updating of the queues of processes, the process control blocks PCB's, the running process word in the system base and the register of a new process. It also delivers messages to a process which is actually waiting for it on a semaphore (after a V-operation, a simulated V-operation for the IOC or for the exception handler). It also enqueues a message on a semaphore after a P-operation which freed a message link when a process is waiting on the free-link semaphore to deliver its message.

The dispatcher unit further calls on the native mode instructions firmware after the "rolling-in" of a process executing in native mode, or after a "contest" if the current process remains running and is executing in native mode. It also calls on decor extension firmware for:

a. a temporary call during the rolling-out of a process executing in that decor extension;

b. a temporary call during the rolling-in of a process executing in that decor extension;

c. a definitive call at the end of the rolling-in of a process executing in that decor extension; and, d. a definitive call after a contest if the current process remains running and is executing in that decor extension.

Moreover the dispatcher places the system in the idle loop when there is no running process.

There are several ways of entering or leaving the dispatcher as follows:

1. The initialization procedure (SIP) provides entry as the last step, (See "Arrangement for Initializing a Data Processing System" invented by William Woods et al., filed on Dec. 2, 1974, and having Ser. No. 528,814, (and claiming priority of French Case Ser. No. 73 42704, filed on Nov. 30, 1973) and assigned to the same assignee named herein.)

2. The Start and Suspend Instruction provides for the entry into the dispatcher. The Start instruction starts a process and the Suspend instruction terminates a process. (See "Process Management Instructions for a Central Processor" invented by Claude Carre et al., filed on Dec. 2, 1974, and having Ser. No. 529,253, (and claiming priority of French Case Ser. No. 73 42694, filed on Nov. 30, 1973) and assigned to the same assignee named herein.)

3. The P and V operations provide for entry into the dispatcher. The P op picks up a message from a semaphore and if no message then the process goes into wait state. (See "P and V Instructions on Semaphores for Process Synchronization" invented by Jacques Bienvenu el al., filed on Dec. 2, 1974 and having Ser. No. 529,017, (and claiming priority of French Case Ser. No. 73 42697, filed on Nov. 30, 1973) and assigned to the same assignee named herein.)

Briefly then, the dispatcher is the main mechanism which manages the processes and accordingly the process control blocks PCB's by deciding which process is to be run and then taking the appropriate action, such as rolling-out the currently running process (i.e., write into the PCB all information relative to the currently running process contained in hardware registers, scratch pad memory, etc.), and rolling-in the new process (i.e., write from the PCB to various hardware registers, scratch pad memory, etc., all information necessary to run the new process.)

Figure 14A:
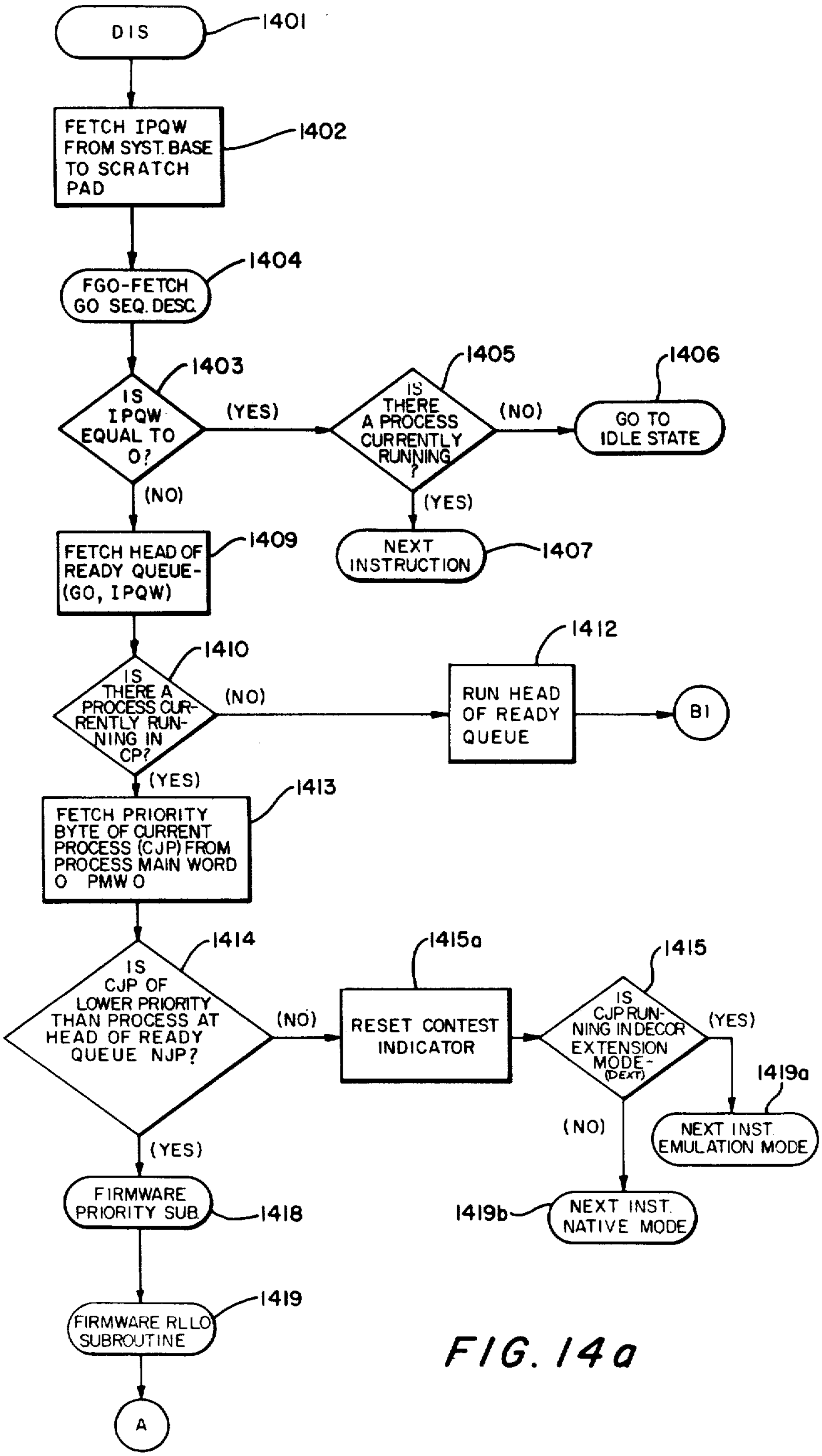
Figure 14B:
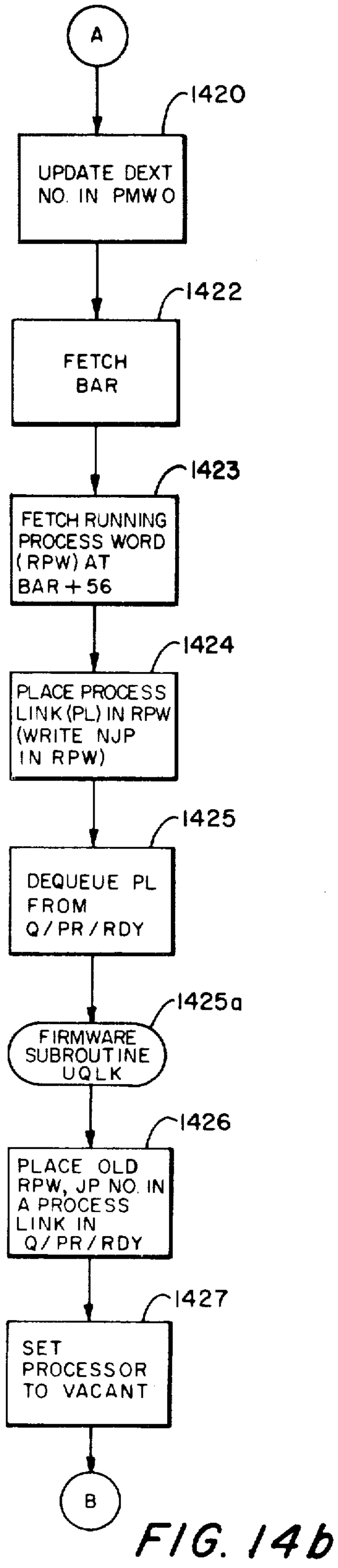
Figure 14C:
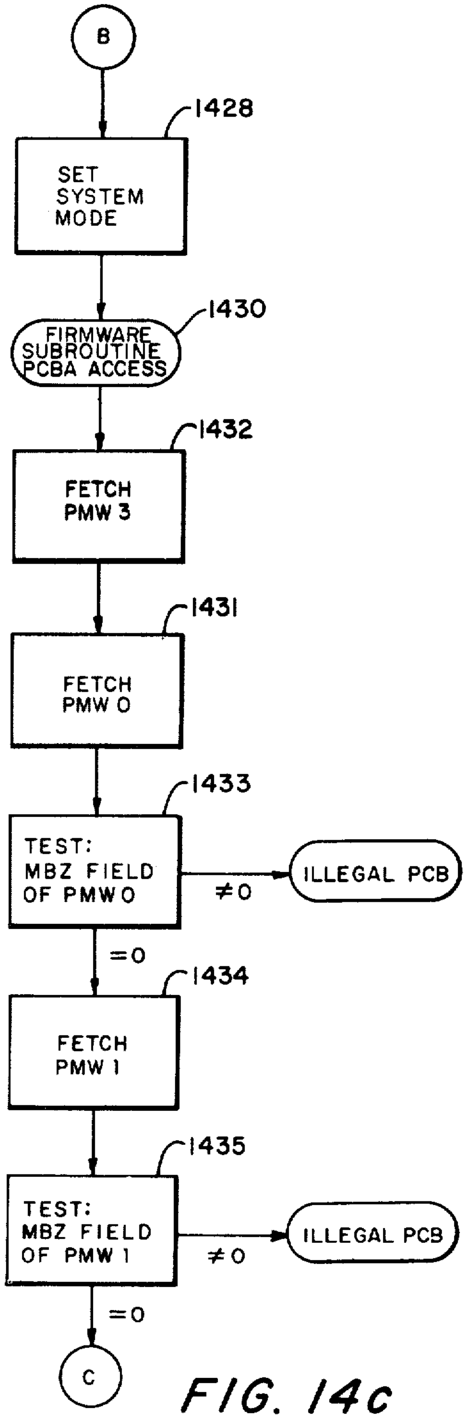
Figure 14D:
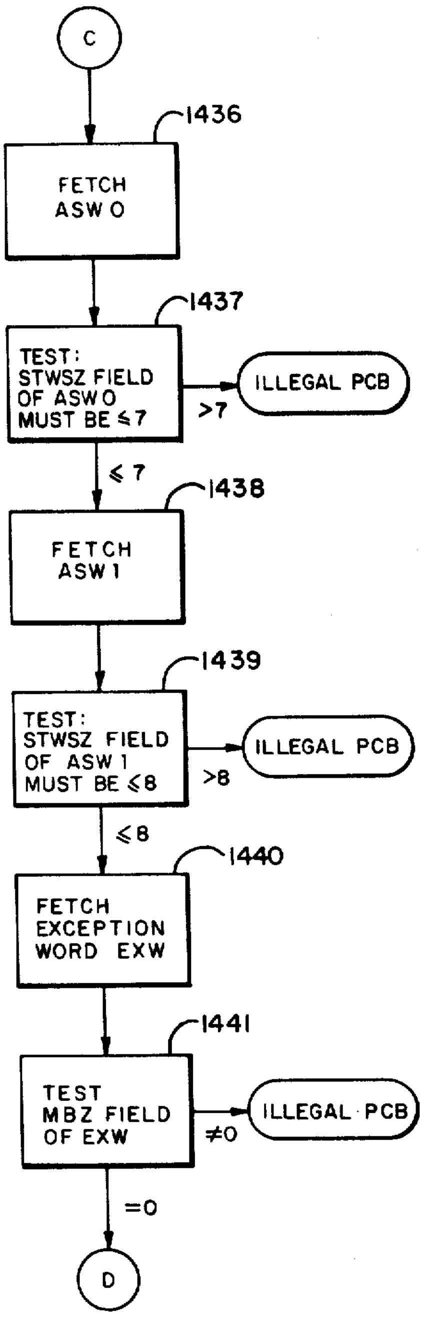
Figure 14E:
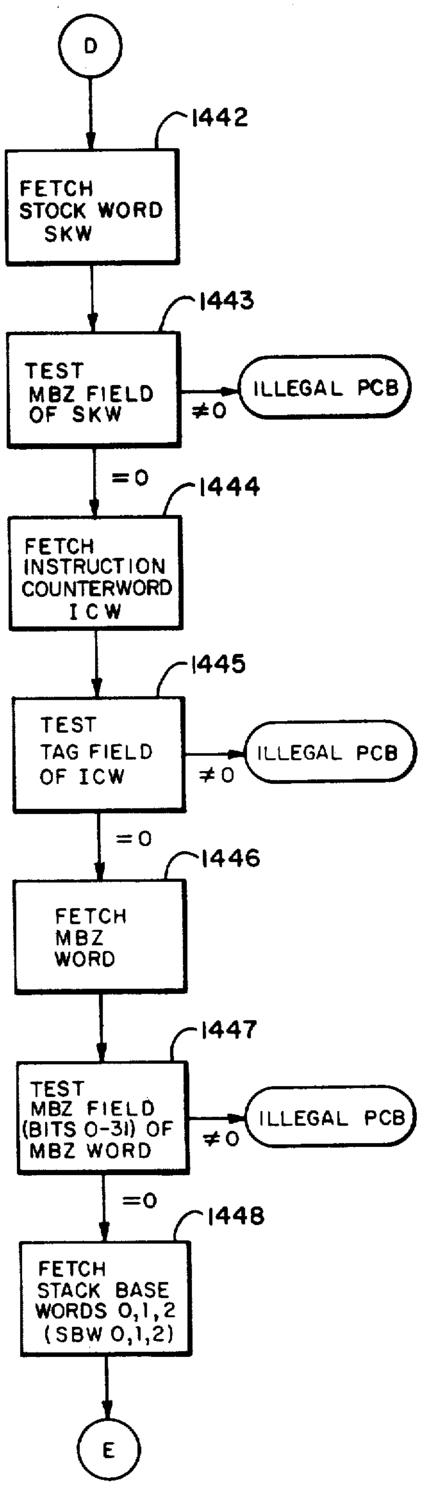
Figure 14F:
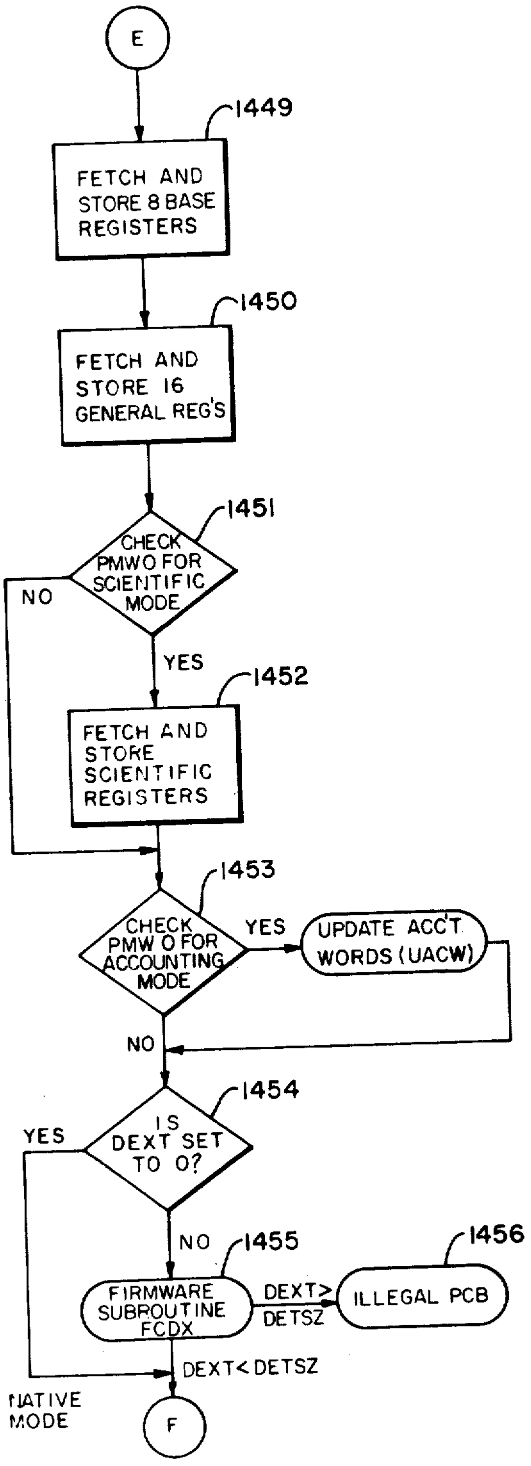
Figure 14G:
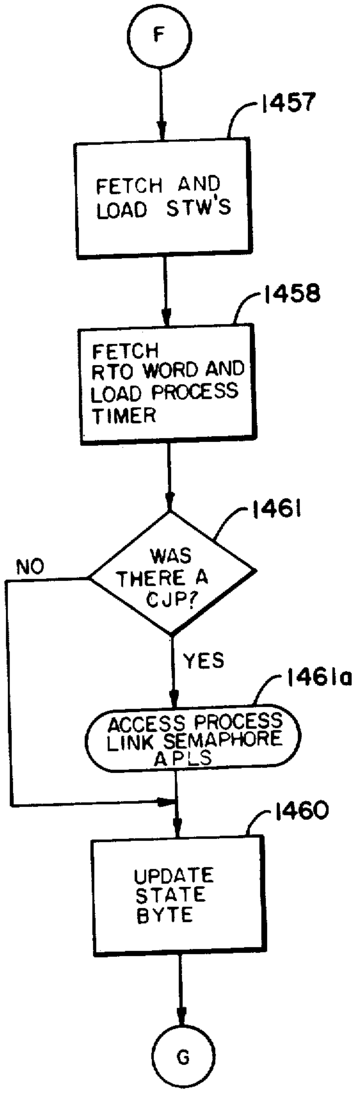
Figure 14H:
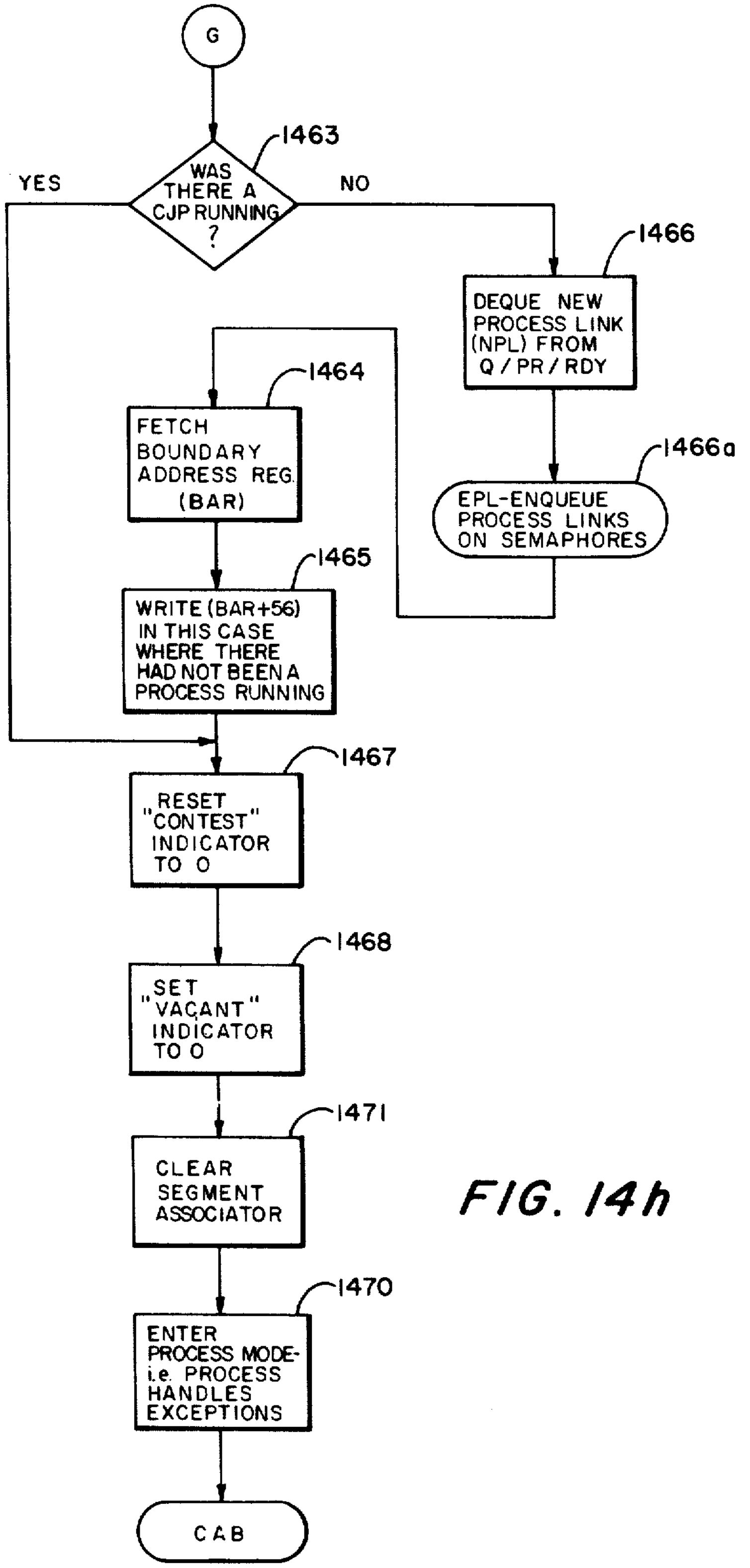

The representation of the functions performed by the dispatcher are shown in flow-charts FIGS. 14*a*–14*i*. For example, block 1402 of FIG. 14*a* is a representation of the function performed by the dispatcher wherein a microprogram word is delivered by the control store unit, and upon decoding by decoder 1359 controls the applicable portions of the CPU via an appropriate series of micro-operation signals 1360, 1361, etc. to retrieve the IPQW from the system base in storage subsystem 102, and transfer it to scratch pad memory 1315. Simultaneously the dispatcher fetches 1404 the GO segment descriptor (see FIG. 12) from the G table of segment descriptors pointed to by the G table word GTW in the system base. Bits 16–31 of the IPQW word contain a 16-bit positive integer which is the displacement from the base of the G segment number 0, referred to as the GO segment, to the head (first byte) of the Q/PR/RDY, queue of processes ready. If bits 16–31 of the IPQW word is 0, 1403 the ready queue is considered to be empty. If the ready queue is empty it indicates that there is no process currently waiting in the Q/PR/RDY and the ready-queue is empty. The next question to be decided in decision block 1405 is whether or not a process is currently running in the machine by determining whether or not the Vacant Indicator is set. (The Vacant Indicator is a flip-flop located in auxilliary memory 1317*a;* it is set when there is no current process CJP running in the processor). If the Vacant Indicator is set (i.e., there is no process currently running) and since it was previously determined that there is no process in the ready-queue waiting to use the processor then the machine goes in the idle state 1406. However if there is a process currently running in the machine, but there is no one waiting to use the machine, the current process accesses its next instruction 1407.

Returning now to decision block 1403, of the flow chart of FIG. 14*a* if there is a positive integer in the pointer area of the IPQW (i.e., bits 16–31) the head of the ready queue pointed to by the IPQW word in the GO segment is fetched to the scratch pad memory. (Note: To avoid repetition and in the interest of clarity the intermediate functions of the dispatcher in conjunction with the control unit and CPU will be omitted; however it is to be understood that such intermedite functions as previously described by example are present typically.) Up to this point it has been determined that there is some process waiting in the ready-queue. Before further action can be taken it is necessary to determine if there is a process currently running in the central processor. This is determined at decision block 1410 of the flow chart representation and if there is no process currently running in the central processor (i.e., no CJP) the head of the ready queue is run 1412. However if there is a process running in the central processor the dispatcher must determine who has priority — the currently running process or the head of the ready queue? Accordingly therefore the priority byte of the current process (CJP) which is located in the running process word of the system base 600 or in the process main word 0 PMW 0 of PCB 400, is fetched 1413. A decision is then made 1414 as to whether or not the current running process CJP is of lower priority than the new process NJP waiting at the head of the ready queue? (See decision block 1414.) If CJP is not of lower priority than NJP, CJP remains in control of the central processor and the contest indicator is reset 1415. (The contest indicator is always set to 0 except when one or more new processes have been placed on the ready-queue since the beginning of the last instruction executed on behalf of CJP thereby creating the possibility of a conflict; under these conditions the contest indicator is set to binary 1). Before the current process CJP is permitted to continue however, and execute further instructions a determination is made whether or not the CJP is running in decor extension mode 1415. If CJP is running in decor extension mode then the next instruction is executed in emulation mode (i.e., decor extension) and if it is not running in decor extension mode then the next instruction is executed in native mode. Returning once again to decision block 1414, if the NJP at the head of the ready queue has a higher priority than the CJP (i.e., its priority number is lower than CJP's priority number, the current running process CJP is "rolled-out" of the machine and the new process NJP is "rolled-in" to the machine. Accordingly a firmware priority subroutine PRIQ 1418 directs the enqueueing of the current process CJP into the ready-queue by LIFO priority and by priority number by first "rolling-out" the CJP under the direction of the firmware subroutine RLLO 1419. The RLLO subroutine directs the writing of the information of the CJP that is stored in the general registers, base registers, scientific registers, T-register, status registers, and instruction counter, back into the appropriate storage areas of the process control block PCB in main memory, and it directs the updating of the RUA. Moreover the DEXT number of process main word 0 (PMWO) in PCB 400 is updated 1420.

The new process NJP is now ready to be "rolled-in." The boundary address register BAR is fetched 1422 and the running process word RPW is fetched from address BAR plus 56 of the system base. See block 1423. The name of the new process NJP is next written into the running process word RPW and since the name of the new process NJP was written in the process link PL of the Q/PR/RDY, the name in the process link PL is therefore now placed in the RPW, block 1424. Therefore NJP from the ready-queue now becomes CJP and is entitled to control the central processor and accordingly is no longer waiting in the Q/PR/RDY and must be dequeued by taking its name out of the process link PL of the Q/PR/RDY, block 1425. When this is done the queue of processes ready Q/PR/RDY is updated by the firmware subroutine UQLK, **1425*a*. Accordingly the JP number of the process which was just taken out of the machine is placed in a process link in the Q/PR/RDY, since it now no longer has control of the machine and must wait for it, 1426. At this point the transformation of giving this control of the central processor to the new process and placing the old process in a ready queue is accomplished and beacause there is a process (the new CJP) in control of the central processor, the Vacant Indicator is set to 0, 1427; if on the other hand there were no CJP in control of the central processor the Vacant Indicator would be set to 1. At this point the assignment of the processor is complete and a new process has acquired the central processor whereas the old process was placed in a ready queue; however, the new process is not ready to run yet for the hardware of the central processing unit, 1306 of FIG. 13*a*, such as the general registers 1307, the base registers 1308, scientific registers 1309, the T-register 1310, the status registers 1311, and the instruction counter 1312,** must be supplied with control information from the process control block of the new process.

Accordingly the firmware subroutine 1430 controls the CPU and first fetches PMW 3 from the PCB (FIG. 4) to scratch pad memory 1315, and then fetches PMW 0. The MBZ field of PMW 0 is checked 1433 and if it is not binary 0 an illegal PCB exception results. However if the MBZ field of PMW 0 is zero then PMW 1 is fetched 1434. Again the MBZ field of PMW 1 is tested to determine whether or not it is a binary 0. If it is not binary 0 there is an illegal PCB exception; whereas if it is equal to 0 the dispatcher proceeds to C.

Accordingly address space word 0 ASW 0 is fetched from the appropriate space in the PCB and the segment table word size STWSZ is tested 1437 to determine whether or not it is less than 7. If it is greater than 7 an illegal PCB results if it is less than or equal to 7, then ASW 1 is fetched from the PCB, block 1438, and its STWSZ field is tested 1439 to determine whether or not it is less than or equal to 8. If its field is greater than 8 then an illegal PCB results; however, if its STWSZ field is equal or less then 8 the exception word EXW is fetched 1440, and its MBZ field is tested to determine whether or not it is equal to 0. If its MBZ field is not equal to 0 an illegal PCB results whereas if it is equal to 0 the stack word SKW is fetched 1442, and its MBZ field is tested 1443 to determine whether or not it is equal to 0. If the MBZ field is not equal to 0 then an illegal PCB results; whereas if it is equal to 0 the instruction counter word ICW is fetched from the PCB and placed in the instruction counter IC and its TAG field is tested to determine whether or not it is equal to 0, 1445. If the TAG field is not equal to 0 then an illegal PCB results. However if the TAG field is equal to 0 the MBZ word is fetched 1446 and its MBZ field (bits 0–31) is tested to determine whether or not it is equal to 0, 1447. If it is not equal to 0 then an illegal PCB results; whereas if it is equal to 0 stack base words 0, 1 and 2 SBW 0, 1 and 2 are fetched 1448. The contents of the 8 base registers in the base register saving area of the PCB is then fetched 1449 and stored in the machine's base registers 1308. Then the contents of the 16 general registers from the general register saving area of the PCB are fetched 1450 and stored in the machine's general registers 1307. Before fetching t e contents of the scientific registers however a check is made of the capability byte of process main word 0 (PMW 0) to determine whether or not scientific mode is being utilized 1451. If scientific mode is being utilized then the contents of the scientific registers from the scientific register saving area of the PCB are fetched and stored 1452. The firmware then proceeds to make a check of the capability byte of PMW 0 to determine whether or not the accounting mode is being utilized 1453. If the accounting mode is being utilized (i.e., accounting bit of capability byte set to binary 1) the accounting words exists in the PCB and the ready time account word RTA is updated. Then the firmware proceeds to determine whether or not the DEXT number is set to 0, 1454. If it is not set to 0 it indicates that the machine may be in emulation mode (i.e., the decor extension capability is being utilized) and accordingly the DEXT number of PMW 0 is checked 1455 to determine whether or not it is greater or less than the DETSZ field of process main word 3 and if it is greater than the DETSZ field an illegal PCB exception 1456 results since the DEXT number is less than the DETSZ field but not equal to zero the machine is performing in legal emulation mode and proceeds to F. Returning to decision block 1454 if the DEXT field is binary 0 then native mode is being performed and the machine fetches STW's, 1457. The residual time out word RTO word of the PCB is fetched 1458 and the process timer is loaded, with the time limit that the CJP may spend in the running state.

Up to this point either (a) a new process NJP has been "rolled-in" to take control of the CPU when there was an old process CJP in the machine and the new process NJP was at a higher priority than the old process CJP or (b) there was no CJP in control of the CPU and the head of the ready queue was run. Briefly under condition (a) the CJP was taken out of the RPW and placed in a process link PL in the Q/PR/RDY, and the NJP in a process link PL in Q/PR/RDY was placed in the RPW thus effectively switching the positions of the 2 processes giving control to the NJP which now becomes the CJP and taking control away from the old CJP. Then the PCB of the NJP was accessed and the information required to run NJP (now the CJP) was placed in scratch pad memory or the array of registers in the ACU.

If there was no CJP in control of the CPU (condition *b*), then the head of the ready queue was run—i.e., the NJP became the CJP because of the dispatcher taking the NJP from the process link PL from the head of the ready queue and placing it in the RPW word. By doing this a process link PL was left empty in the Q/PR/RDY and it is required to take it out.

Accordingly beginning now at decision block 1461 the firmware determines whether or not there was a CJP in control of the CPU and if there was a free process link (FPLS) it was accessed and enqueued and the CJP was written therein. However if there was no CJP in control of the CPU state byte of PMW O of the NJP is updated 1460 and again there is a determination whether or not there was a CJP in the machine 1463. If there was no CJP in control of the processor the process link of the NJP (which was in the Q/PR/RDY and is now in control of the machine) is taken out of the Q/PR/RDY 1466 (i.e., dequeued from the Q/PR/RDY) and becomes a free link semaphore FLSP and is now enqueued in the free process link queue (805 on FIG. 9) and becomes a part of the free process link queue 1466*a*. The contents of the boundary address register BAR are fetched 1464 and the running process word RPW of the NJP (now the CJP) located at BAR plus 56 of the system base is updated by placing the NJP identification in the RPW, block 1465. The Vacant Indicator is set to 0 in the case where there had been no CJP. Next the Contest Indicator (i.e., a flip-flop in auxiliary memory 1317*a* used to indicate a possible conflict in priority between the CJP and a process placed in the ready queue) is set to 0, 1467 and the Segment Associator (AS 132 on FIG. 1) which is a typical content addressable memory is cleared, 1471; then the process mode is entered 1470. (A process mode indicates that exceptions are handled by the process which is operating in the processor rather than by the operating system). The firmware then continues to CAB 1480 and the asynchronous trap bit AB is checked to determine whether or not it is set to binary 1, 1481. If the AB bit is set to binary 1 then a check is made 1482 to determine whether or not the process ring number PRN is greater than or equal to the asynchronous trap bit ARN. (The AB and the ARN are located in the priority byte of the PCB of each process and is meaningful when the process is in the running state; the AB and ARN are obtained from the RPW located at BAR plus 56 of the system base). The AB and ARN in BAR plus 56 of the RPW are reset since the next step 1484 is to proceed to an asynchronous trap routine which would take care of the conditions that cause the asynchronous trap bit or the asynchronous ring number to be set in the first place, and if these were not reset then at the next pass by the firmware it would give an indication that something was wrong where actually there was nothing wrong, and hence would always proceed to the asynchronous trap routine 1484 and would never execute. Going back now to decision blocks 1481 and 1482 if the AB bit is not set or AB bit is set and PRN is not greater than ARN, then the firmware would proceed to determine in what mode the processor would run—in the normal or native mode or in the emulation mode. Accordingly the DEXT number is checked to determine whether or not it is set to 0 and if it is set to 0 the normal mode of the machine is run 1487. However if the DEXT number is not set to 0 the emulation mode is run 1486.

Figure 15:
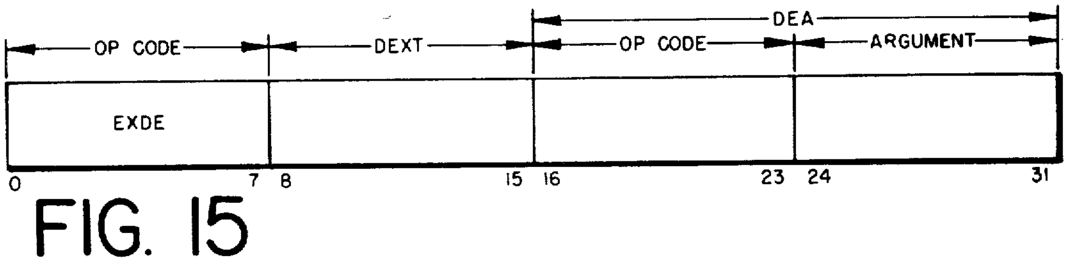
FIG. 15 is a representation of a native mode instruction for switching the operating mode of the present invention.

As previously discussed, the decor extension mode and thereby the emulation mode or any other mode or specified function desired, may be entered in the data processing system of the present invention in response to a native mode instruction called the execute decor extension instruction having a mnemonic EXDE. The EXDE instruction is shown in FIG. 15. As generally discussed hereinbefore, the instruction is 32 bits in length, wherein the first eight bits identify the opcode as being the EXDE instruction. The next eight bits define the DEXT field, whereas the last 16 bits define the DEA field. The DEXT field in bits 8 through 15 identifies the decor extension number and is the logical name of the decor extension. As will be seen, the DEXT field must be different from zero, otherwise as illegal format field condition will occur. The DEXT field having eight bits can identify up to 255 possible decor extensions or specified functions or operations. Thus, a DEXT field equal to one may correspond to the emulation of a first type processor whereas a DEXT field having another number may correspond to the emulation of yet another data processing system. Other numbers indicated by the DEXT field may indicate some other functional operation by the data processing apparatus included in the present invention such as for example as may be provided by a hardware option not normally included in the architecture of the system.

The DEA field is the decor extension argument and acts as an input to the specified decor extension hardware such as the emulation unit. The DEA field may include for example two subfields, namely the opcode field, included in bits 16 through 23, and the argument subfield included in bits 24 through 31. The opcode subfield may for example indicate a jump or move instruction and the argument section may for example indicate the manner in which a move is to be made. That is, the opcode subfield might include for example a move instruction indicating that certain data must be transferred from one register to another register in the data processing apparatus whereas the argument section might define the manner in which or the apparatus or route by which such data is to be transferred between the two points.

As previously discussed, the data processing system of the present invention contemplates the use of a process control block for each program or process included in the data processing system. The process control block is a data structure and contains information needed to specify the state of a process at any given time. The process control block includes process main words PMW No. 0 and PMW No. 3 for use with the decor extension instruction. PMW No. 0 includes two subfields of byte length which are of interest here. The DEXT byte or subfield may be coupled to include the same information as the DEXT byte as defined for the EXDE instruction. The DEXT subfield in PMW No. 0 is written from the EXDE instruction during the switching of the data processing system from the native mode to the non-native mode for that situation where more than one instruction is to be executed in the non-native mode for the specified function such as emulation. The DEXT byte of PMW No. 0 is written and saved in the process control block in order to insure that should an interrupt occur, that for example the emulation process may later continue at the point at which it was interrupted. As will be seen, the DEXT byte is not written in PMW No. 0 for an EXDE instruction which contemplates only one non-native mode instruction upon exit from the native mode. Also included in PMW No. 0 is a STATE byte which includes an EXTD bit which corresponds to a binary ONE when the processor is operated in the decor extension mode which as previously discussed may be the emulation mode of the machine of the data processing apparatus. The EXTD bit in the STATE byte is another means of checking whether or not the non-native mode has been entered properly but may be excluded for purposes of the present discussion.

Figure 17:
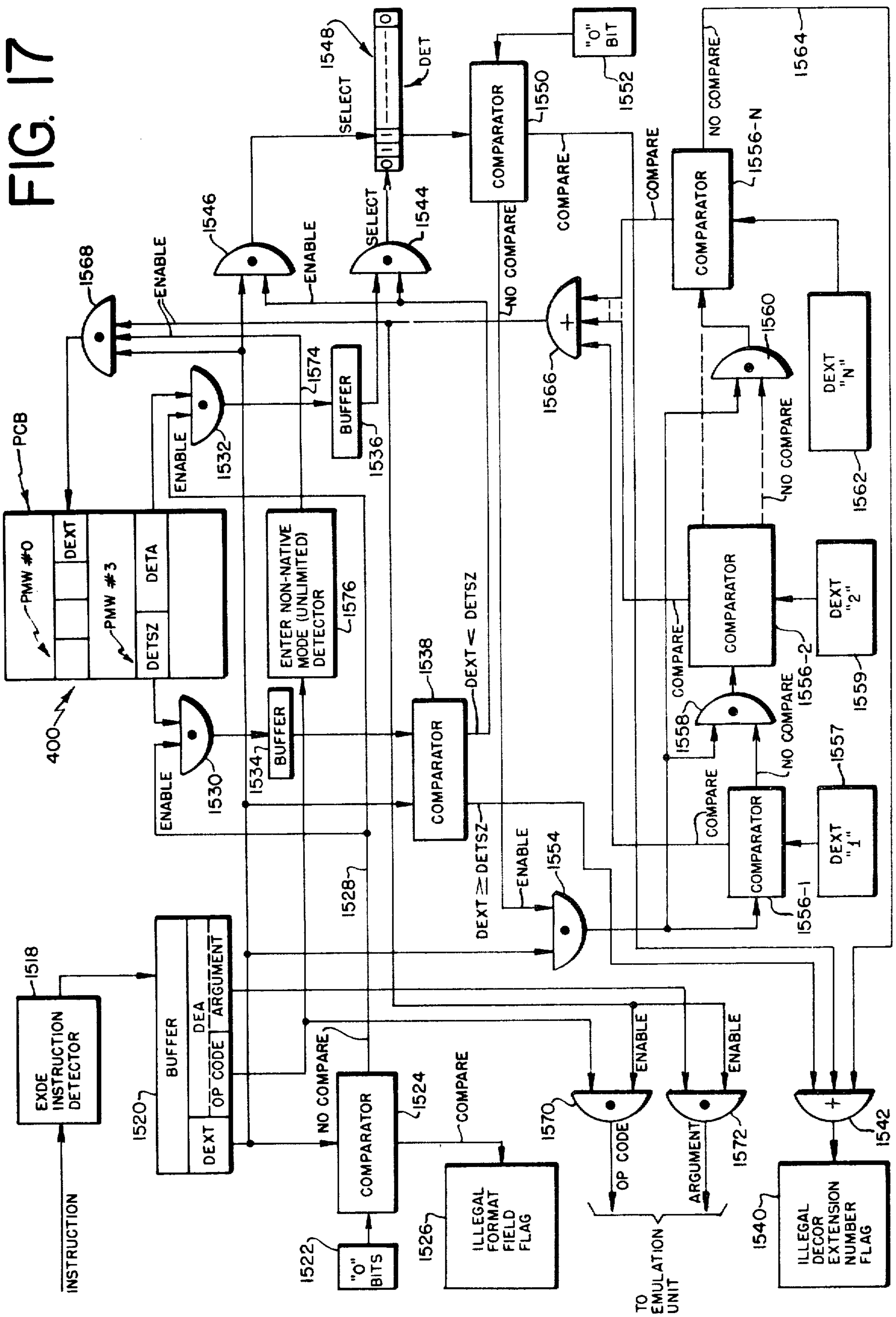
FIG. 17 is a functional block diagram representation of the hardware and firmware required to implement the operating mode switching of the present invention.

The process control block also includes the process main word number three, PMW No. 3, which as shown in FIG. 17 includes a DETSZ subfield and a DETA subfield. The DETSZ subfield includes 8 bit locations whereas the DETA subfield includes 24 bit locations. The DETSZ subfield defines the number of possible entries in the decor extension table which will be presently discussed. If the DETSZ subfield is a binary zero, the decor extension mode is not allowed to be processed. Before discussing the DETSZ subfield and the decor extension table (DET) in more detail, the DETA subfield contains the absolute address in memory of the decor extension table and is utilized and therefore significant only if the DETSZ subfield is not a binary ZERO.

A decor extension table is associated with each one of the processes included in the data processing apparatus of the present invention and accordingly there may be a correspondence in the number of process control blocks and decor extension tables. However, it is anticipated by the present invention that a plurality of process control blocks may share and accordingly point to one decor extension table thereby resulting in a fewer number of tables than there are blocks. Each decor extension table may include for example as envisioned by the present system, up to 256 bit locations. Each bit location defines whether or not the decor extension mode will be allowed. In further explanation, the maximum number of locations in the decor extension table corresponds to the DEXT field in the EXDE instruction. Thus, with the DEXT field having 8 bits, then 256 locations in the decor extension table may be addressed. Each one of the bit locations in the decor extension table corresponds to a DEXT number. Accordingly, each DEXT number, which as indicated hereinbefore, corresponds to a specified function or operation such as for example the emulation of another processor, indicates by a binary ONE in that particular bit location in the decor extension table that such emulation of the other processor is allowable. When a particular bit in the decor extension table is a binary ZERO, then the process is not allowed.

In certain systems, it is entirely possible that more than 256 functions might be configured in the decor extension mode. Accordingly the DEXT byte or field would have to be increased in size in order to indicate the additional functions and in addition the decor extension table would have to also be increased in the number of bit locations. It is also entirely possible in a system to include less than the total number of functions which are capable of being handled by the system. In that case, the DEXT field could remain at eight bits in length without in general using excessive and unnecessary bit locations in the memory associated with the data processing apparatus of the present invention. However, a significant amount of memory space may be saved if the decor extension tables are reduced in size. Thus, for example if only five other data processing apparatus are to be emulated by the data processing apparatus of the present invention, then the decor extension table might only be for example eight bits in length, it being necessary to in most cases include fields in eight bit groups. Accordingly, the manner in which the switching is performed between the native mode and the non-native mode must include a check to insure that the function number indicated by the DEXT field is not greater than the number of bits in decor extension table associated with the active process.

Thus the process to be presently discussed includes switching and checking apparatus for inclusion in the data processing system of the present invention when the system is to be switched from a native mode to non-native mode of operation as previously indicated and generally discussed with respect to the flow diagram of FIG. 14. Accordingly, once the system detects the EXDE instruction, and now referring to FIG. 16, the program mode switching apparatus of the present invention is initiated as shown by the start block 1500 in FIG. 16. After the EXDE instruction is detected, the DEXT byte thereof is compared to binary ZERO to insure that in fact the format of such field is correct. If the DEXT byte compares to a binary ZERO, then an illegal format field flag is activated thereby signalling that the data processing apparatus of the present invention may return to the next active process and further indicate such illegal format field to the operator. This comparison is indicated by block 1502 and the illegal format field flag is indicated by block 1503 in FIG. 16. If there is no comparison from block 1502, then the read operation indicated by block 1504 is entered. By the operation of block 1504, PMW No. 3 of process control block (PCB) is read out such that now included temporarily in buffers are the DETSZ field and the DETA field of PMW No. 3. As previously stated, the DEXT byte received in the instruction as depicted by FIG. 15, must be compared with the number of possible entries (DETSZ) in the decor extension table associated with this particular process control block. Accordingly, by block 1506, if the DEXT field byte is greater than or equal to the DETSZ field, then an illegal decor extension number flag is indicated at block 1508 and an operator may be so informed. Thus, by block 1506, if the address or number in the DEXT byte is larger in size than the number of bits in the decor extension table, then an illegal decor extension number is flagged. Such flag is also activated if DEXT byte is equal to DETSZ. This is so because of the numbering of the particular byte and bits in the decor extension table. For example, if the DEXT number is eight, and there are only eight bit locations in the decor extension table, and since as shall be described, the first entry in the decor extension table indicates native mode, then the remaining seven bit locations in the decor extension table are not enough to service the eight possible decor extension modes.

If the DEXT byte is less than the DETSZ number, then the read operation of block 1509 is entered and the DEXT$^{th}$ bit of the decor extension table is read. Thus if the number for the DEXT field is five, the fifth bit (sixth location as shall be described) of the decor extension table is read. After this, the DEXT$^{th}$ bit of the decor extension table is compared to the binary ZERO as shown in block 1510. If it is a binary ZERO, then block 1508 is entered flagging the illegal decor extension number. If such comparison does not produce an equal condition, then block 1512 is entered and the DEXT number is checked to insure that, as received from the EXDE instruction, the actual decimal number of the DEXT field represents a decor extension whose hardware and firmware are in the data processor of the system. If not, then block 1509 is entered. Otherwise, the emulation unit is activated as shown in block 1514. If the emulation unit is activated, such unit is processed for one or more instructions depending upon either the native mode EXDE instruction or the emulation unit itself as will be hereinafter discussed. This processing of the emulation unit takes place after the flow of FIG. 16 is stopped, as shown in block 1516.

Figure 16:
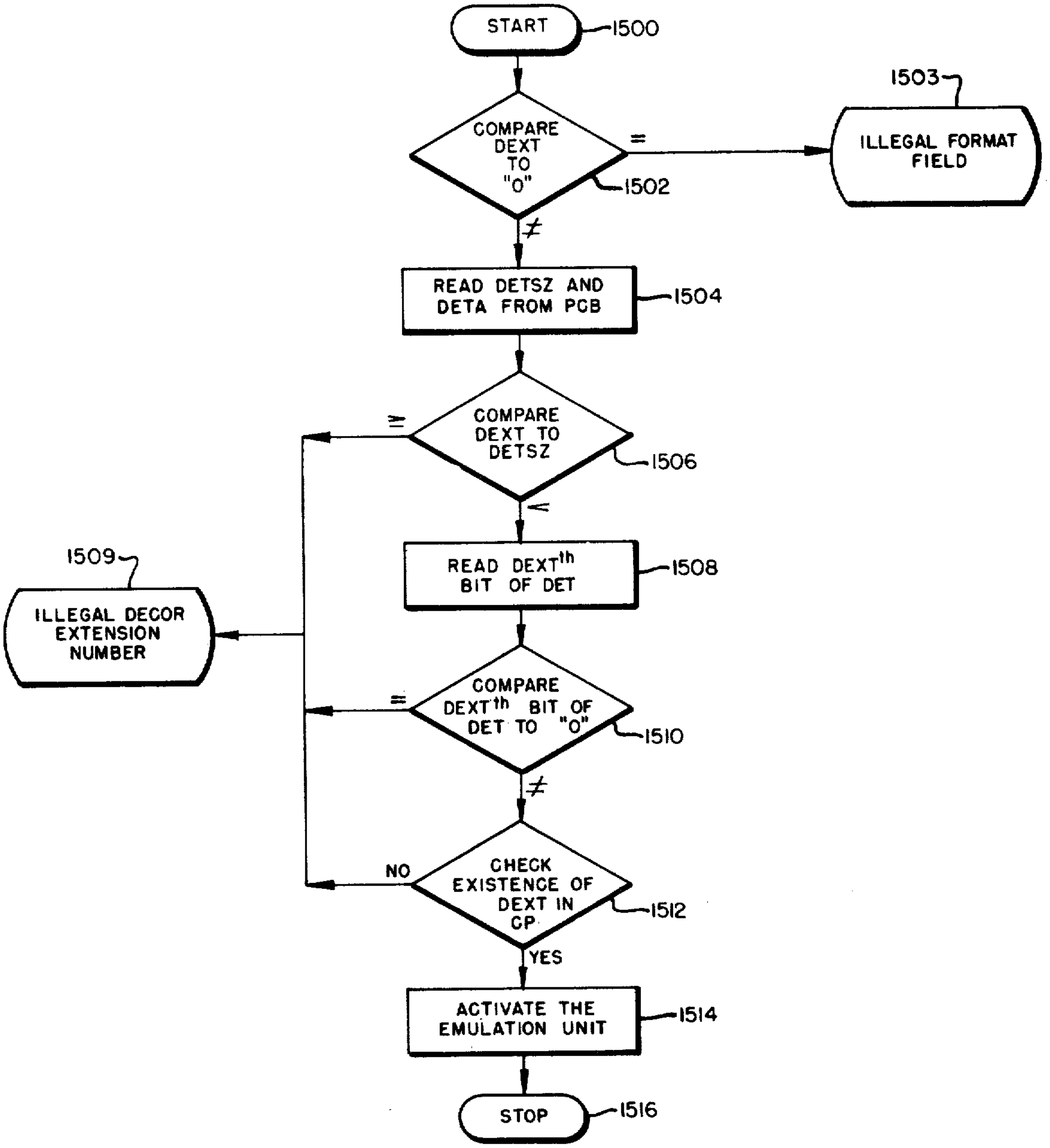
FIG. 16 is a flow diagram illustrating the switching mode operation of the present invention.

Accordingly, it can be seen that the flow chart of FIG. 16 depicting the program switch mode of the apparatus of the present invention envisions that block 1502 check to determine if in fact the EXDE instruction is being used in a totally wrong manner. Further, a check is made by block 1506 to insure that in fact the number of entries in the decor extension table, the number of bits of which has possibly been reduced to a number less than that which can be addressed by the DEXT byte, is in fact greater than the number indicated by the DEXT byte. In this manner, the decor extension table can be minimized in size. Further, a check is made to insure that in fact by minimizing the size of the decor extension table, an error condition has not resulted based upon the DEXT number being greater than the number of entries in the decor extension table. Also, it can be seen by block 1508, the check is made as to whether or not the decor extension table as may be loaded by the operating system or operator in conjunction with the data processing apparatus of the present invention allows a particular decor extension mode to be entered. Yet a further check is made by for example block 1512 wherein the DEXT number is checked to insure that the particular decor extension mode represented by the number DEXT exists in the firmware and hardware of the system. Further, as will be seen hereinafter with respect to FIG. 17, the decor extension mode may be entered for a single instruction or for a plurality of instructions, before processing is resumed in the native mode.

Now referring to FIG. 17, there is shown a block diagram representation of the hardware and firmware required in order to implement the program mode switching technique of the present invention. Thus, as shown in FIG. 17, a process control block 400 is shown, the one shown being associated with the active program in the data processing apparatus of the present invention. PCB 400 includes the process main words PMW No. 0 and PMW No. 3 respectively. PMW No. 0 includes the DEXT field whereas PMW No. 3 includes the DETSZ field and the DETA field. Upon receipt of an EXDE instruction as indicated by the EXDE instruction detector 1518, the DEXT and DEA fields are temporarily stored in buffer 1520. The DEXT field in buffer 1520 is immediately compared with the zero bits 1522 by means of comparator 1524. If there is a comparison as indicated for block 1502 in FIG. 16, then the illegal format field flag 1526 is set. If there is no comparison, then line 1528 receives a signal thereon to enable AND gate 1530 and AND gate 1532. The enabling of these two AND gates allows the contents of the DETSZ field to be placed in buffer 1534 and the contents of the DETA field to be placed in buffer 1536. By means of comparator 1538, the DEXT field received from buffer 20 and the DETSZ field received from buffer 1534 are compared. Comparator 1538 includes well known logic which is utilized to determine equalities of two numbers as well as determining which number is greater. If as indicated at block 1506 in FIG. 16, the DEXT number is greater than or equal to the DETSZ number, then an illegal decor extension number 1540 is activated by means of OR-gate 1542. If the DEXT number is less than the DETSZ number, then both AND gates 1544 and 1546 are enabled. The enabling of AND gate 1544 allows the selection of the decor extension table 1548 associated with the process control block 400. That is, the absolute address of the decor extension table as indicated in the DETA field is allowed to pass and select the proper DET. The enabling of AND gate 1546 allows the number indicated by the DEXT field in buffer 1520, to address the appropriate bit in the decor extension table 1548, herein shown to select the third bit from the left. It should be noted that the decor extension table 1548 includes a plurality of bit locations starting from address 0 (the address indicating native or non-native mode) and ending at address 7 for an 8 bit decor extension table. Accordingly, if DEXT is equal to 2, then the third location of the DET as shown is addressed.

The bit read from decor extension table 1548 is transferred to comparator 1550 wherein such bit is compared to the zero bit 1552 in accordance with the block 1510 of FIG. 16. If there is a positive comparison, then the illegal decor extension number flag 1540 is set. If there is no comparison, then the output of comparator 1550 enables AND gate 1554. The enabling of AND gate 1554 allows the DEXT number to be compared in succession by comparators 1556-1 through 1556-N as shall be presently discussed. The DEXT number in buffer 1520 is first compared with the DEXT number one 1557 in order to determine whether the associated hardware and firmware represented by that number is present in the system. The DEXT numbers in blocks 1557, 1559 and 1562 are set or present only if the associated hardware/firmware is included in the system. If there is no comparison, then AND gate 1558 is enabled to allow the DEXT number to be compared with the DEXT number two 1559. Such successive comparisons are made until the last comparator 1556-N receives an input via AND gate 1560, in order to compare the DEXT number with the DETSZ number N 1562. If there is no comparison, then the signal generated on line 1564 from comparator 1556-N, also activates the illegal decor extension flag via OR-gate 1542. If either one of the comparators 1556 generates a compare signal, then via OR-gate 1556, AND gates 1568, 1570 and 1572 are enabled. AND gate 1570 is enabled to pass the opcode of the DEA field to the emulation unit and AND gate 1572 is enabled to pass the argument of the DEA field to the emulation unit, each from buffer 1520.

The other AND gate 1568 is enabled to pass the DEXT number to the process control block 400 to be written therein in PMW No. 0. AND gate 1568 must also be enabled by a second line 1574 received from detector 1576. The signal is generated on line 1574 if the opcode of the DEA field received in buffer 1520 indicates that the non-native mode is to be entered from the native mode for more than one instruction. In this case, the DEXT number is stored in PCB 400 so that should an interrupt occur during the processing in the non-native mode for the particular specified function or operation, such status as indicated by the DEXT number will be saved in the PCB 400 for the particular process. If the DEA field indicates that only one instruction is to be processed in the non-native mode, then there is no need for saving the DEXT number in PCB 400. Accordingly, with the DEXT number saved in the PCB 400 and the emulation unit now having received the opcode and argument from buffer 1520, the emulation unit is activated for processing. Further and not shown, should the argument not be acceptable to the emulation unit or outside the capabilities of such emulation unit, then a signal is received from the emulation unit flagging such illegal argument and accordingly notifying the operator by means of an illegal argument flag. After proper activation, the emulation unit may then process in such emulation mode after which the emulation unit may return control to the native mode, unless sooner interrupted by a higher priority process in the system.

The emulator included in the present CPU, i.e., CPU 104, is comprised of firmware, software and hardware components. The emulator runs as two processes with one process acting as an interface between the emulator and the operator, and the second process primarily responsible for execution of the emulated central processor (ECP). As such, the second process switches between ECP mode (non-native mode) and native mode. The emulator is logically structured into three major components. The first component is the firmware Compatibility Feature (CF), which emulates most ECP instructions and which interfaces with the native firmware event recognition mechanisms. Another component is the Emulator Software Package (ESP), which performs all remaining CPU functions, all generalized I/O channel functions, and all special emulator support functions. The last component is the Peripheral Conversion Package (PCP) (not shown), which performs all peripheral subsystem specific functions.

Figure 18:
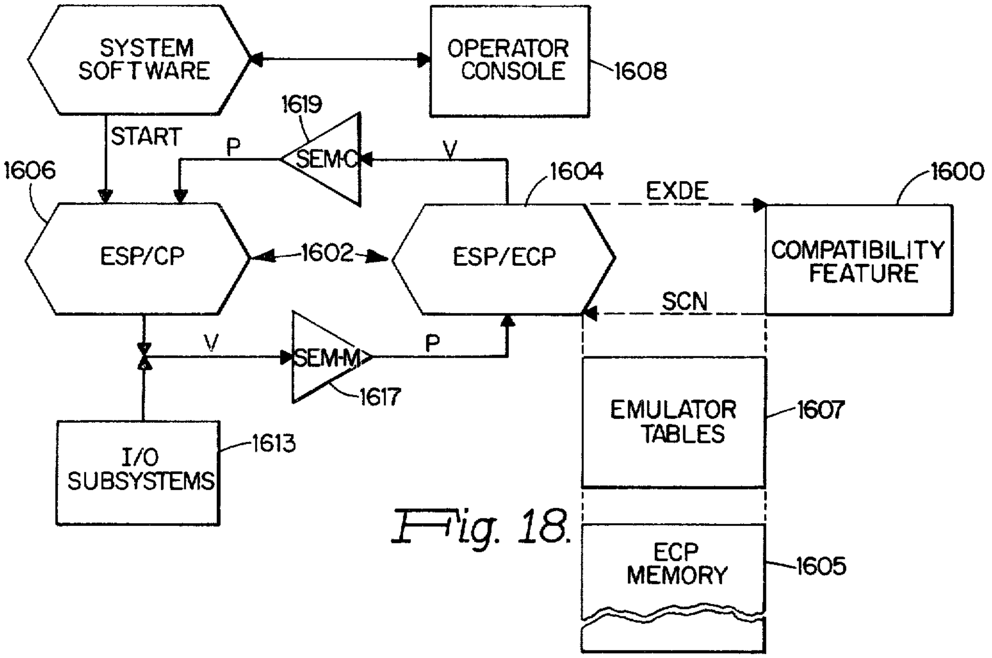
FIG. 18 is a general block diagram illustrating the general operation of the system of the present invention.

FIG. 18 indicates two of these three main functional components, the interfaces between them and the synchronization semaphores associated with them. More specifically, the CF 1600 is the firmware portion of the emulator responsible for the main line of emulation, and basically has a master-slave relationship to the ECP Process (ESP/ECP), i.e., the CF calls ESP/ECP for those services it does not perform.

The basic CF responsibilities are as follows. First, as generally indicated hereinbefore, the CF emulates most ECP instructions. A second responsibility of the CF is that it detects the native events which represent ECP type interrupts. This function is implemented through one of the synchronization semaphores. Another responsibility of the CF is that it processes ECP interrupts and performs a swap of a word indicating the status of the associated computer program, the current word thereby indicating the status of the emulated processor. This word will be hereinafter defined and will be hereinafter referred to as the Program Status Word (PSW). Further, although not of interest here, the CF performs all required memory protect key checking in conjunction with native facilities.

The ESP 1602 comprises two processes, ESP/CP 1606 and ESP/ECP 1604, wherein CP is the communication process and ECP is the process used in emulating the target (emulated) central processor. The switching between processes is accomplished as a result of events associated with the operator console 1608 and I/O subsystems 1613. The functions of ESP 1602 include an emulator control function used for setting up data to be communicated to the CF and accomplishing initial transfer of control. Another function of ESP 1602 is the auxiliary services, which generally are those functions that the CF does not perform. This covers a range of functions which ESP/ECP identifies via an entry code sent by the CF. These services include I/O instruction simulation, the translation of a native event to an ECP interrupt, emulation of the ECP wait state, memory protect support simulation, ECP "error" handling, simulating the ESP/ECP initial program load (IPL) and simulating the ECP timer. Of the above functions, the emulation of the ECP wait state is of primary interest here.

The memory 1605 of the ECP target system is represented by one large CPU memory segment for which a descriptor is maintained at all times. Since the basic unit of memory in both systems, i.e., the CPU and the ECP, is an eight bit byte, each byte in the CPU memory represents a byte in ECP memory. The CPU address of a byte of ECP memory is computed using the ECP address and the segment descriptor of the ECP memory. The ECP current program status word (CPSW) is represented by a double word in emulator memory. It is distributed to firmware registers when the CF is activated. When ESP/ECP process receives control, the CPSW in main storage is set to its current value by the firmware. The ECP register sets are maintained in the equivalent CPU registers when the CF is active. These and other features of the emulated central processor (ECP) are, for example, further discussed in the book entitled, "Computer Organization and the System/370," by Harry Katzan, Jr., Van Nostrand Reinhold Company, 1971, as well as the article entitled, "The Structure of SYSTEM/360, Part I — Outline of the Logical Structure," by G. A. Blaauw and F. P. Brooks, Jr., IBM Systems Journal, Vol. 3, No. 2, 1964.

Communication between firmware and software compontents of the emulator is effected via a set of tables 1607 in emulator memory initialized by the software and maintained by software and firmware. These tables are presently described.

Figure 19:
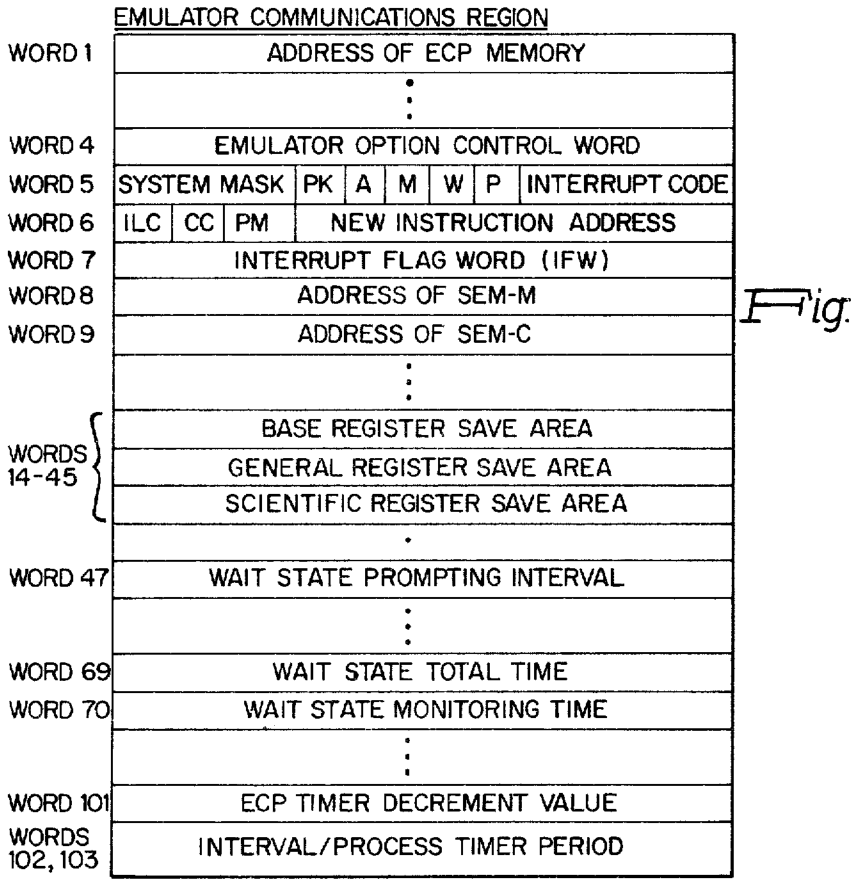
FIG. 19 is a table illustrating the emulator communications region of the present invention.

In addition to system I/O tables which are not of interest here, the tables 1607 include the Emulator Communications Region (ECR) which consists of an array of words as shown in FIG. 19. A base register of the ESP/ECP contains the segmented address of this area. In addition to providing specified locations for information passed between the CF and ESP/ECP, this array provides space for the CF to store the contents of all ECP registers when it calls ESP. The use of certain areas in the array is detailed below.

Word 1 — The segmented address of the total ECP memory.

Word 4 — The Emulator Option Control Word (EOCW) which indicates generation and initialization options. In addition to other functions, it indicates whether the ECP timer option is present.

Words 5, 6 — The current ECP PSW. (As hereinafter described. Also see above referenced book and article for further description.)

Word 7 — Interrupt Flag Word (IFW) — A set of flags which indicate pending ECP interrupts and their source. A detailed description is shown with respect to FIG. 20.

Word 8 — The segmented address of the semaphore descriptor for SEM-M.

Word 9 — The segmented address of the semaphore descriptor for SEM-C.

Words 14–45 — The Saving Area where the contents of the base, general and scientific registers are stored by the CP when it calls ESP/ECP.

Word 47 — Wait State Prompting Interval.

Word 69 — Wait State Total Time.

Word 70 — Wait State Monitoring Time.

Word 100 — ECP Timer Decrement Value.

Word 101 — ECP Timer Decrement Period.

Words 102, 103 — Interval Timer/Process Timer Period.

Figure 20:
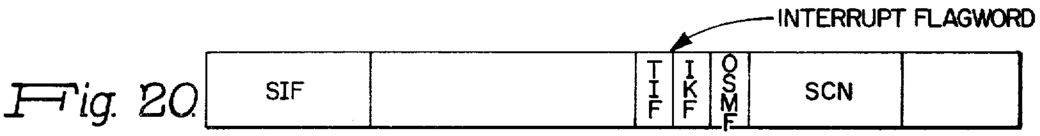
FIG. 20 illustrates the interrupt flag word format used in conjunction with the table shown in FIG. 19.

Word 7 of FIG. 19 is shown more specifically in FIG. 20 to include flags as follows. SIF are the System Interrupt Flags and are set by ESP/ECP to indicate a pending interrupt for input/output channels and an external interrupt. TIF is the Timer Interrupt Flag which is set by ESP/ECP when the ECP timer goes negative. IKF is the Interrupt Key Flag and is set by ESP/ECP when an Interrupt command is sent through the Operator's console. OSMF is the One Step Mode Flag and is set by ESP/ECP when it calls CF to execute in one step mode. SCN is the Service Class Number for use when a call is made for ESP/ECP.

The transfer of control between the main architectural components of the emulator may be viewed in terms of the level of control involved, which are the process level, the procedure level, or the instruction level. The ESP/ECP and ESP/CP calls involve process level control. Referring to FIG. 18, transfers of control between processes are accomplished by a process doing a V or P operation on one of the two semaphores, i.e., a master semaphore and a communications semaphore, respectively SEM-M 1617 and SEM-C 1619. The higher priority process (ESP/CP) changes state either from wait to ready or from ready to wait; in either case, the waiting process becomes the ready or running process. All ESP calls to the CF are within the same process, as they are generated from ESP/ECP 1604. A procedure level call occurs when ESP/ECP transfers control to the CF in order to resume ECP instruction level emulation. The call is accomplished via the EXDE instruction. The operand field of the EXDE instruction indicates to the CF that this call requires a change of the DEXT byte in the PCB, placing the process in ECP mode, that is, emulation mode or non-native mode. Subsequently, the CF performs ECP instruction emulation until the services of ESP/ECP are required. This type of transfer of control is employed every time the ESP returns to the CF after providing a service, and when the CF is initially called from ESP/ECP. In each instance, the CF loads the ECP register values from the ECR before resuming instruction emulation. The Decor Extension Argument (DEA) of the EXDE instruction indicates the function to be performed by the CF.

The transfer of control from the CF to ESP/ECP is provided whenever the CF requires the assistance of ESP/ECP to accomplish an ECP service. The transfer is accomplished by the CF setting the DEXT byte in the active PCB to ZERO and putting the address of the ESP/ECP entry point into the instruction counter. Before this is done, the CF saves the contents of the ECP registers in the ECR, updates the PSW, and places the Service Class Number (SCN), i.e., the entry code indicating the type of service required, into the ECR.

In further detail, the compatibility feature (CF) 1600 consists of additions to native mode firmware which perform the following functions: ECP instruction execution, ECP interrupt simulation, native firmware (NF)/CF firmware interfacing, and CF/ESP interfacing. The emulator executes ECP instructions such that the results are substantially identical to those specified for the ECP. The ECP interrupt mechanism is simulated by the CF 1600 and the ESP 1602. CF is responsible for the ECP interrupt scan and PSW swaps occurring when the interrupt is allowed. ESP/ECP is responsible for translating native I/O interrupt events into I/O or external interrupts.

CF and ESP coordinate the simulation of ECP I/O and external interrupts via the Interrupt Flag Word (IFW). ESP sets interrupt conditions in the IFW and CF scans this word and then determines from the CPSW if the interrupt is allowed. If allowed, the appropriate indicator in IFW is cleared; otherwise, the condition remains pending. All programming exception interruptions are handled entirely by the CF. The CF 1600 initially transfers control to the ESP 1602 for example when either simulation of an ECP instruction is required, a non-emulatable instruction is recognized, a native interrupt for the emulator is detected; or the ECP wait state is detected. ESP passes control to the CF under the following conditions, ECP initiation by IPL, completion of instruction simulation, or completion of ECP interrupt simulation. The Execute Decor Extension instruction (EXDE) is used by ESP/ECP to activate the CF.

As indicated hereinbefore, the Emulator Software Package (ESP) appears to the native system as two physical processes comprising one native process group. The ESP/CP process is the process which controls (or allows the operator to control) the entire emulation session. This process contains the first execution entry point and is responsible for activating the other process; similarly, the termination of the session is controlled by this process. The ESP/CP is active only when the ECP is not running because it has not yet been activated or operator communication is in progress. The ESP/ECP process is a logical extension to the compatibility feature. Native procedures and the CF execute under this process, the mode being determined by the value of the DEXT byte, i.e., a DEXT byte value of "0" indicating native mode processing, and a DEXT byte value of for example "3" indicating CF processing of ECP instructions. Nearly all of the functions of ESP/ECP are activated by the CF either for ECP instruction simulation or native event detection. In addition to servicing CF requests, this process is responsible for initiating native-to-ECP mode changes and maintaining the ESP/CP interface. Physical procedures comprising this process include for example CF activation, ECP memory protect simulation, ECP wait state simulation, ECP I/O execution simulation (including PCP), and ECP interrupt simulation. The ECP wait state simulation is of primary interest and shall be discussed in detail hereinafter.

Some of the emulator support functions shall now be described in more detail. One function is the CF request handling support function during which ESP/ECP is entered from the CF when auxiliary service is required. To effect the transfer of control, the CF stores an appropriate SCN in the ECR, changes the DEXT byte to ZERO, and enters ESP/ECP native software at a fixed entry point. The SCNs may be grouped as follows: I/O execution required, memory protect service required, asynchronous event detected, and exceptional ECP condition detected. The latter two SCN groups are of primary interest and shall be presently discussed.

In the asynchronous event detected request condition, the CF determines that a native event has been directed to ESP/ECP by testing the SEM-M semaphore count in order to determine if there are messages included therein. When the count is greater than ZERO, the CF stores the appropriate SCN in the ECR and transfers control to the ESP/ECP. Analyzing the SCN, ESP/ECP acquires the message on SEM-M and transfers control to the appropriate routine for service of the following event types. The first type is the I/O event, which indicates that an attention or termination event notification has been posted on SEM-M. Control is then transferred for service and mapping into an ECP interrupt. The second event type is a process interrupt exception. A third type of event is inter-process communication. This occurs when ESP/CP has posted a meassage on SEM-M in order to notify the CF of a simulated ECP interrupt. This technique is used to coordinate the following events: ECP console termination, ECP console attention, ECP interrupt key, and ECP elapsed timer.

The other type of emulator support function of interest here is that initiated in response to the class of ECP Exceptional Conditions. One condition of this type occurs when the CF has encountered a nonemulatable ECP instruction. The operator is notified and may elect to bypass the instruction or terminate the session. Included in the ECP exceptions is the ECP Wait State, which is indicated when the CF has detected the wait state bit set in the PSW. Wait state simulation is then performed.

Before discussing ECP wait state simulation, ECP timer simulation shall be presently discussed. An interval timer is available as an option on the ECP. This time is represented as a full word at a fixed location in main storage. When the presence of this timer in the target system is indicated by the Emulator Option Control Word, it is emulated directly in ECP storage. The ECP timer simulation requires that such fixed location, i.e., the ECP timer, be decremented by a certain value at a given frequency while the ECP is running. The process timer associated with the ESP/ECP simulates ECP elapsed time. When the process timer elapses, a flag is set thereby designating that processing may be commenced by a routine in ESP/ECP. This routine posts a message on SEM-C which causes ESP/CP to assume control. The ECP timer is decremented in ECP memory by a predetermined value and the result is checked to determine if the sign changed from positive to negative. This sign change causes a message to be posted on SEM-M simulating an ECP timer interrupt. In any case, the means by which the process timer had been set, causes the ESP/CP to queue on SEM-C thereby placing itself in the native wait state. ESP/ECP then regains control and exits from such routine. To account for ECP elapsed time while in the ECP wait state, the interval timer is used as shall be described hereinafter.

Since the frequency of exceptions caused by process timer run-out affects emulator performance, the user has the ability to determine the time interval used in the process timer by specifying a value. The process timer interval must be specified and the decrement used is directly proportional to the interval specified.

In ECP wait state simulation, since there is no equivalent CPU 104 machine state to correspond to the ECP wait state, it is difficult for the operator to determine when such emulator has encountered a wait state situation. In addition, if the ESP/ECP were to simply sit in an execution loop to simulate a wait state situation, another ready process could not become active. For these reasons, the emulator monitors the ECP wait state to optimize host system performance and the operator's awareness of ECP activity.

When a wait state is detected as a result of a PSW swap, a test is made for pending allowable interrupts. If no interrupts are allowable as indicated by the PSW system mask, then a so called "hard wait state" is entered thereby preventing wait state simulation. If no interrupts are pending, wait state simulation is initiated; otherwise control is returned to the CF. ESP/ECP monitors the wait state using the interval timer and notifies the operator periodically (Word 47 of ECR) how long (Word 69 of ECR) the wait state has been in effect. The operator then has the option of interrupting the ECP target program if he suspects a condition which prevents the ECP from leaving the wait state.

Wait state simulation thus functions as follows. ESP/ECP issues a signal which causes the interval timer to be set to a predetermined value and to post a message on SEM-M when the interval timer runs out. ESP/ECP then queues on SEM-M and resumes execution when a message is posted on SEM-M. Since any ECP interrupt which causes exit from the wait state is signalled via SEM-M, this action suspends ESP/ECP "in the wait state" while allowing another process to execute, and automatically notifies ESP/ECP when exit from the wait state is possible.

Any of three types of actions causes a message to be posted on SEM-M and ESP/ECP to be activated: a native event corresponding to an ECP interrupt; the simulated ECP timer changing sign; and the interval timer running out. If an interrupt corresponding to any of these conditions is allowed, control is returned to the CF for the PSW swap.

Since the ECP timer is active while the ECP is in the wait state, the ECP timer must be updated to reflect the time that ESP/ECP spends queued on SEM-M. This is done by setting the interval timer using the same value used for the ESP/ECP process timer as described hereinbefore. When the interval timer runs out, the ECP timer is updated and tested as in ESP/CP. When the ECP timer changes sign, the potential interrupt is processed as in ESP/CP. If no allowable interrupt is detected, the interval timer is continually reset. The total wait state time is accumulated and a message is sent to the operator each time a prompting interval elapses.

Figure 21:
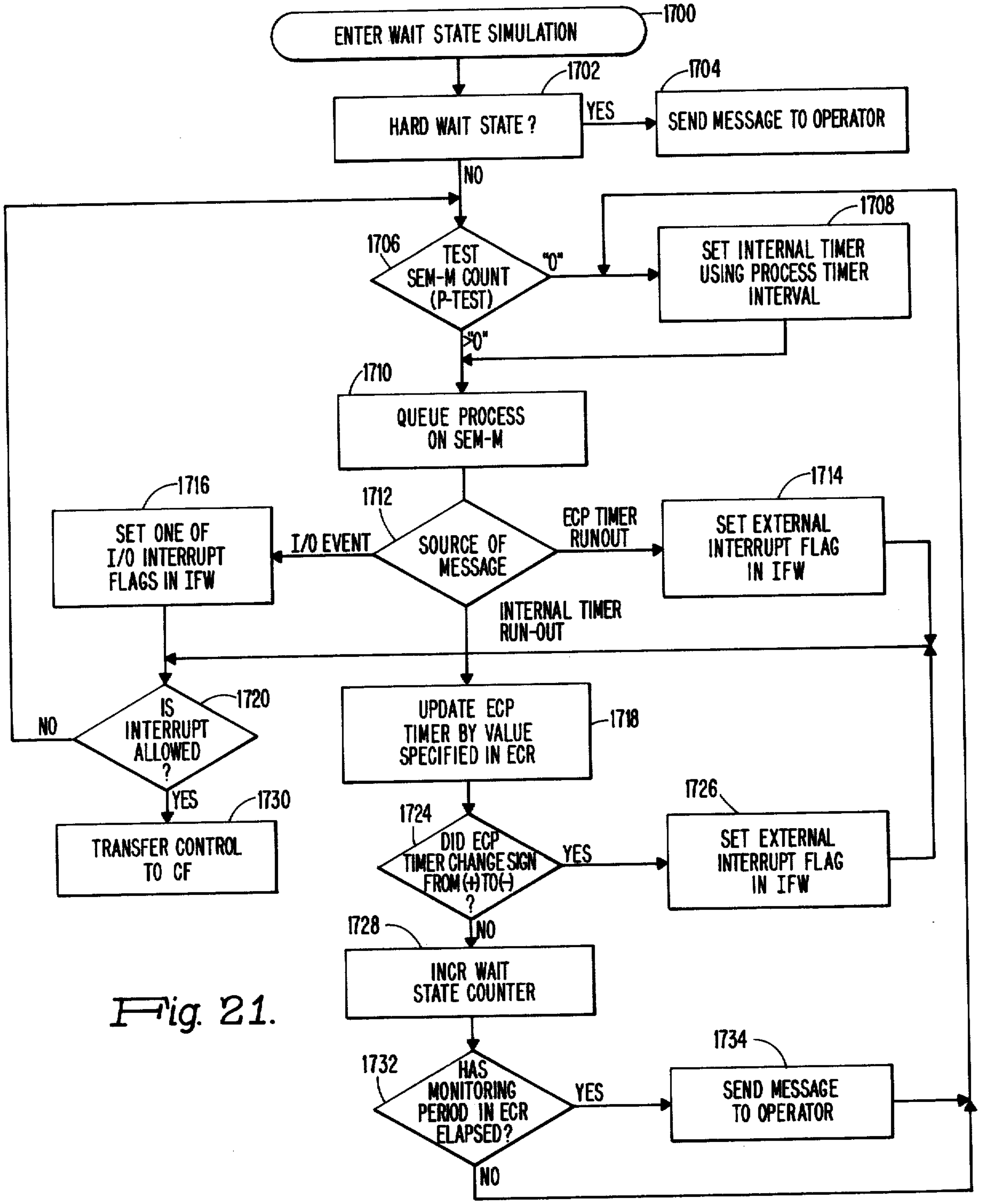
FIG. 21 is a flow diagram illustrating the general operation of the system of the present invention.

Now referring to FIG. 21, there is shown a flow diagram of the wait state simulation as envisioned by the present invention. Wait state simulation is entered when the PSW bit 14 (the W bit of the PSW in Word 5 of the ECR) is set to a binary ONE thereby indicating a wait state condition. Thus, after entering the wait state simulation of the present invention as indicated by block 1700, block 1702 is entered wherein a determination is made as to whether this is a "hard" wait state. A "hard" wait state is one wherein such condition, that is the wait state, cannot be exited in the ECP. This condition is indicated by the system mask in the PSW by binary ZEROs in each of its bit locations thereby indicating that no interrupts will be allowed. This condition may be present for example under emergency situations or error conditions. Thus, if the hard wait state exists, a message is sent to the operator indicating such condition so that the operator may take any corrective action. This is indicated by block 1704. If block 1702 does not indicate a hard wait state condition, block 1706 is entered and a test of the SEM-M count is made by means of a P test. The SEM-M count indicates whether or not there are any messages in SEM-M, thereby indicating that with a count greater than zero, there are messages on SEM-M and with a count of zero that there are no messages on SEM-M. If there are no messages on SEM-M as indicated by a zero in response to the P test, then block 1708 is entered and the interval timer is set by using the process timer interval as specified in the ECR (Words 102 and 103). The ESP is then queued on SEM-M awaiting receipt of a message on SEM-M, including the indication that the interval timer has run out. In addition, if there is a message on SEM-M as indicated by a count greater than zero, then block 1710 is entered so that the process is queued on SEM-M.

After queuing the process on SEM-M as indicated by block 1710, and upon receipt of a message o ı SEM-M, block 1712 is entered in order to interrogate the source of the message. The source of the message may include the indication of an I/O event, an ECP timer run out, or an interval timer run out.

If the source of the message is an I/O event, then one of the I/O interrupt flags corresponding to the I/O channel where an event occurred, will be indicated in the interrupt flag word as indicated in block 1716. If the ECP timer has run out, then the external interrupt flag will be set in the interrupt flag word as indicated in block 1714. If the interval timer has run out, then the ECP timer will be updated as indicated in block 1718 by the value specified in the ECR. Continuing from block 1718, a check is then made as to whether or not the ECP timer has changed sign from positive to negative. This is indicated by block 1724. If it has, then the external interrupt flag in the interrupt flag word is set as indicated by block 1726. After each of the events, that is, the setting of a flag in the IFW, as indicated in block 1714, 1716 and 1726, process flow is then continued at block 1720 wherein a determination is made as to whether or not an interrupt may be allowed. If the interrupt is not allowed, then the routine indicated above is again continued at the input of block 1706. That is, a test is made as to whether or not there is a message in SEM-M.

If there is an interrupt allowed as indicated by block 1720, then transfer of control is made through the compatibility feature as indicated by block 1730. The next thing the compatibility feature does is to execute a PSW swap and if the wait state bit, that is PSW bit 14, is a binary ONE, wait state simulation is again entered. If the wait state bit is a binary ZERO, the execution process in the ECP continues with the instructions indicated. Continuing in the process flow wherein the interval timer run out has been indicated, if the ECP timer did not change sign as indicated in block 1724, then the wait state counter is incremented as indicated by block 1728. If the monitoring period, (i.e., the wait state prompting interval (Word 47 in ECR), has elapsed, as indicated by block 1732, then a message is sent to the operator (block 1734) telling the operator the length of time that the system has been in the wait state. If the monitoring period in the ECR has not elapsed, then process flow is continued from block 1732, as it was from block 1734, at the input of block 1708. That is, the interval timer is set using the process timer interval and the process is queued on SEM-M. The process indicated in FIG. 21 for wait state simulation becomes more apparent in conjunction with FIG. 22 which illustrates hardware, firmware, and software features of the present operating system, particularly the ESP 1602 and the CF 1600.

Figure 22A:
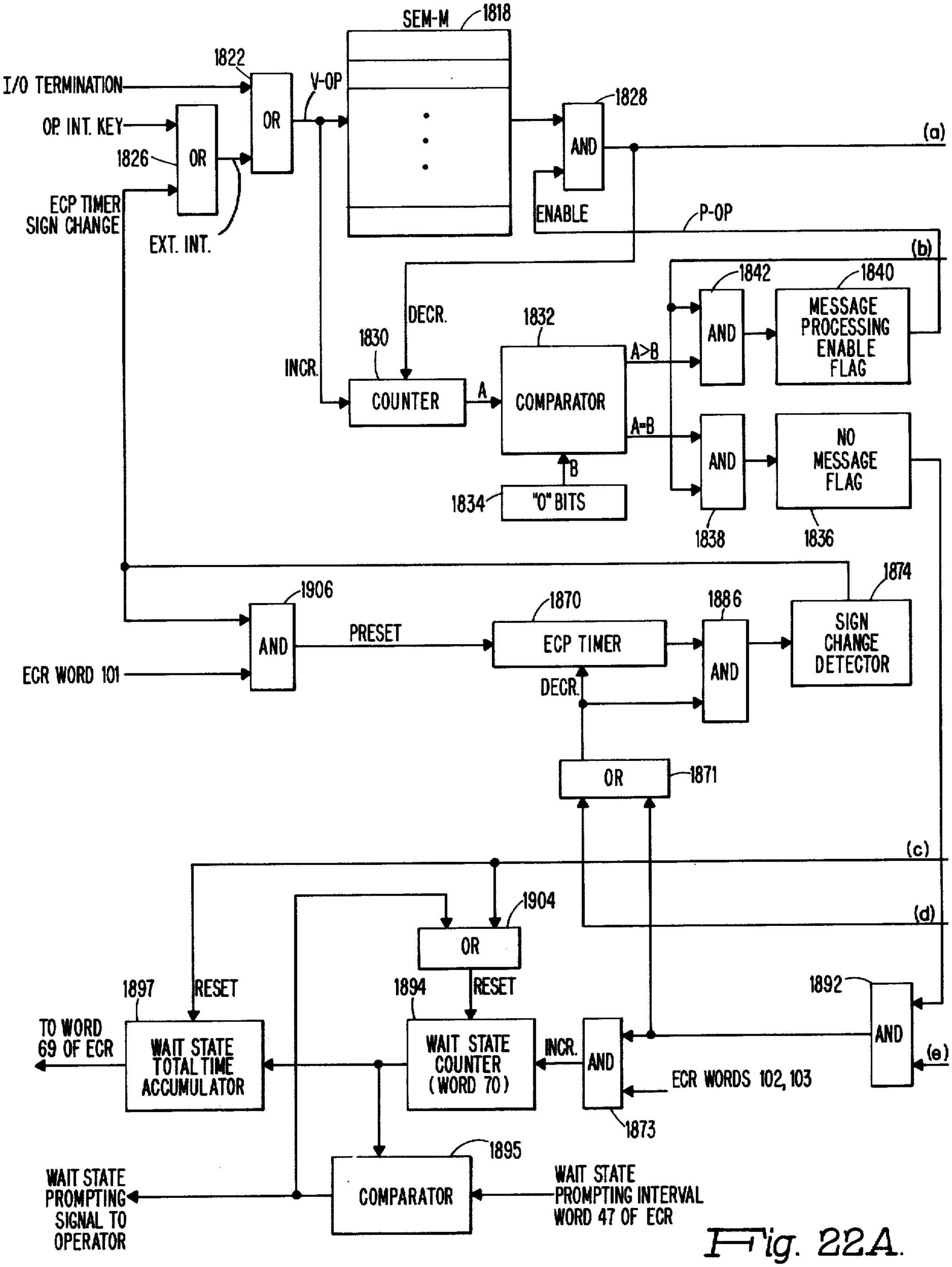
FIG. 22 (i.e., FIGS. 22*a* and 22*b*) is a detailed block diagram functionally illustrating the hardware, firmware and software used to implement the emulation of the wait state simulation in conjunction with the emulator and central processor in the system of the present invention.
Figure 22B:
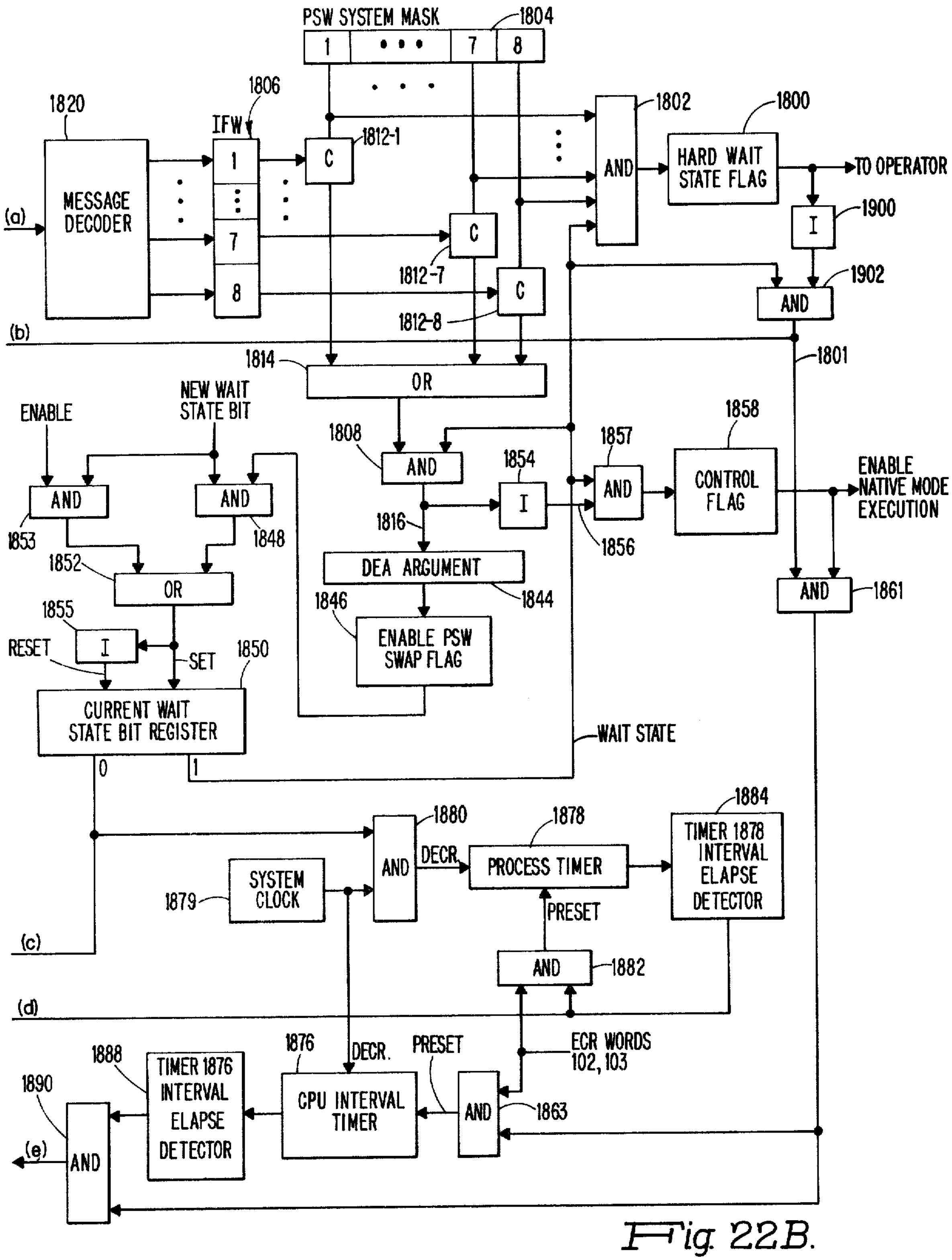

Now referring to FIG. 22, the functions provided by the hardware, firmware, and software of both the CF and the ESP are indicated. The hard wait state flag 1800 is set when AND function 1802 is fully enabled. AND function 1802 is fully enabled when the PSW system mask 1804 indicates all binary ZEROs in each of its system mask bits 1 through 8 and when the CPSW wait state bit 1850 is a binary ONE. Thus, the indication of the hard wait state by the hard wait state flag 1800 indicates that wait state simulation cannot be entered and accordingly the operator is informed as indicated in FIG. 22 and in FIG. 21 by block 1704. If the hard wait state flag has not been set, then AND function 1902 is partially enabled via inverter function 1900. As shall be seen, AND function 1902 is fully set if the wait state bit of the PSW is a binary ONE.

The interrupt flag word (IFW) 1806, includes 8 bits. The first seven bits correspond to the input/output events on seven corresponding channels for ECP operation and the eighth bit corresponds to an external interrupt which shall be described hereinafter. The setting of any one bit in IFW 1806 to the binary ONE state and setting of a like numbered bit in the PSW system mask 1804 to a binary ONE state will indicate by means of AND function 1808 that there is an allowable interrupt pending during the wait state. Thus if any of the bits in IFW 1806 compares with any of the like numbered bits in mask 1804, then the corresponding comparator 1812 will be set to indicate an equal comparison thereby partially enabling, via OR function 1814, the other input of AND function 1808. The indication of an allowable interrupt pending will be fully enabled via AND function 1808 to line 1816 if the wait state bit 1850, that is CPSW bit number 14 is a binary ONE, thereby indicating that the ECP is in the wait state.

In order to set one of the bits in IFW 1806 to a binary ONE, an interrupt must have occurred. The setting of such bits in IFW 1806 occurs via the translation or decoding of a message in the SEM-M semaphore 1818 by means of message decoder 1820. The placing of a message on SEM-M 1818 occurs in response to an interrupt condition, including an I/O interrupt and an external interrupt. An I/O interrupt occurs when there is a CPU I/O termination from either one of seven input/output channels associated with the ECP. This condition is indicated and thereby stored as a message in SEM-M 1818 via OR function 1822 whose output indicates the V-op signal which is normally provided at the termination of the I/O event or the external interrupt. The external interrupts are also provided via OR function 1822 as a message on SEM-M 1818 by means of an additional OR function 1826 which receives at its inputs a signal in response to the operation of the operator's interrupt key, or the ECP timer sign change. A message indicative of the interval timer runout as well as other interrupts may also be posted on SEM-M. Thus, any one of these events places a message on SEM-M 1818 which messages are decoded by means of message decoder 1820 when AND function 1828 is enabled by a P-op signal.

In order to keep track of the number of messages on SEM-M 1818, a counter 1830 is included which has an increment and decrement input. The increment input is coupled with the output of OR function 1822 and allows the incrementing of counter 1830 each time a message is posted on SEM-M. Similarly, counter 1830 is decremented each time a message is taken from SEM-M via AND function 1828. The semaphore SEM-M is a first in, first out memory stack, and since such arrangement is well known in the art, it need not be further discussed here. Thus, counter 1830 is provided in order to indicate whether there is a message on SEM-M 1818 and utilizes comparator 1832 and zero bits 1834 in order to provide such function. If the inputs A and B of comparator 1832 are equal, then an A equals B comparison signal will be generated thereby setting the no-message flag 1836 via AND function 1838. If the A input is greater than the B input, thereby indicating that there are messages on SEM-M 1818, then the message processing enable flag 1840 is set by means of AND function 1842. AND functions 1838 and 1842 are fully enabled by the signal on line 1801 which is produced when AND function 1902 is fully enabled and which indicates that there is a normal wait state which is not a hard wait state. If there are messages on SEM-M and flag 1840 is set, this enables a P-operation thereby allowing the message to be taken from SEM-M 1818.

If an allowable interrupt is pending while the CPSW indicates wait state, as indicated by a signal on line 1816, then the DEA argument 1844 is set to a binary ONE state thereby enabling a PSW swap as indicated by flag 1846. This enables AND function 1848 to allow a new PSW bit to be placed in the current PSW wait state bit register 1850 via OR function 1852. In a similar manner, a new wait state bit may be enabled via AND function 1853 by other means not shown such as upon initialization in register 1850 via OR function 1852. The new wait state indication is placed in register 1850 via the setting or resetting of register 1850, which may simply be a flip-flop. If the new bit is a binary ONE, thereby indicating wait state, the register 1850 is set. Register 1850 is reset via inverter function 1855 if the new wait state bit is a binary ZERO, thus indicating that the ECP is not in the wait state. If there are no allowable interrupts pending as indicated by means of inverter function 1854 on line 1856, and if AND function 1857 is also enabled by indication of the wait state, then a control flag 1858 is set thereby enabling along with the signal on line 1801, AND function 1861.

The setting of control flag 1858 enables native mode execution thereby not requiring the system to sit still in the wait state and lose valuable processing time until a pending allowable interrupt is posted on SEM-M. The enabling of AND function 1861, as shall presently be seen, provides, in response thereto, the operator with an indication of the period of time the ECP has been in the wait state, also thereby prompting the operator as to such status of the system so that he may take corrective action as desired.

As indicated hereinbefore, the ECP timer in the emulated processor is decremented by a specified value at a specified rate. In the emulator, the ECP timer 1870 is also decremented and a change in sign of timer 1870 is detected by means of sign change detector 1874. This change in sign is then received at one input of OR function 1826 as an external interrupt for posting on SEM-M. In further background, included in the native system are two timers, the CPU interval timer 1872 and the process timer 1878 which runs only when such process is in the active state. The CPU interval timer 1876 on the other hand runs at all times regardless of the state of any process in the system. Although the ECP timer is continually running in its actual native system, when the ECP timer 1870 is emulated as here, it is decremented when the interval timer runs out thereby also simulating its native operation. It should again be noted that the ECP timer, if not as option in the emulated system, is thus not included for simulation.

Commonly, when the ECP instructions are being processed, the ECP timer 1870 is decremented and the process timer 1878 is also decremented. The process timer 1878 is decremented in response to the enabling of AND function 1880. AND function 1880 is enabled by the system clock 1879 which provides pulses at a uniform rate and a signal from register 1850 thereby indicating that the ECP is not in the wait state, i.e., a binary ZERO in register 1850. The system clock 1879 is also used to decrement CPU interval timer 1876. Further, process timer 1878 is preset via AND function 1882 by means of the period specified in words 102 and 103 of the ECR. CPU interval timer 1876 is also set by the same period by means of AND function 1863. Timer 1878 may be preset under initial conditions or as shown when detector 1884 indicates that the timer 1878 interval has elapsed. In addition when the interval has elapsed as detected by detector 1884, AND function 1886 is enabled via OR function 1871 thereby enabling the sign change detector 1874 to function.

However, when the ECP goes into the wait state, process timer 1878 cannot be decremented since AND function 1880 is disabled and some means must be found to indicate the amount of time the ECP has been in the wait state. This is accomplished by means of the CPU interval timer 1876 which is preset via AND functions 1861 and 1863 by means of ECR words 102 and 103. Associated with interval timer 1876 is an interval elapse detector 1888 similar to detector 1884. The elapse in time of such interval as indicated by detector 1888 together with the enabling of AND function 1861, fully enables AND function 1890. Based on the fact that there was no message in SEM-M as indicated by flag 1836, AND function 1892 is then fully enabled and the ECP timer, if specified as an option, is decremented. The ECP timer 1870 is preset by the ECP timer decrement value included in word 101 of the ECR when AND function 1906 is enabled in response to a change in sign as detected by detector 1874. In addition, the wait state counter 1894 is incremented by the value included in words 102 and 103 of the ECR via AND function 1873 to indicate the length of time the ECP has been in the wait state. Counter 1894 generates the value of the wait state monitoring time included in word 70 of the ECR. The wait state counter 1894 is reset via OR function 1904 either when the wait state bit in register 1850, becomes a binary ZERO or when comparator 1895 generates a prompting signal to the operator. The wait state indication is sent to the operator at specified intervals. That is, the wait state counter 1894 output is compared via comparator 1895 with a prompting interval value (word 47 of the ECR) so that it generates a message or prompting signal to the operator at specified intervals. This would indicate to the operator for example, every 30 seconds that the ECP is in the wait state so that the operator may if he deems necessary, take appropriate action. The total wait state time is accumulated by accumulator 1897 and maintained in the ECR, word 69. Accumulator 1897 is reset when the wait state bit in register 1850 becomes a binary ZERO.

In summary of the manner in which the operator is informed of the wait state condition, interval timer 1876 is constantly being decremented by the system clock 1879 from its preset value. The interval timer runout in conjunction with the normal wait state condition enables AND function 1890 which further enables AND function 1892 if there are no messages in SEM-M 1818. In response to the enabling of function 1892, the wait state counter 1894 (word 70 of the ECR) is incremented and its value is constantly compared with the wait state prompting interval (word 47 of the ECR). If there is a comparison, the operator receives a prompting signal. The wait state counter is also utilized to update the wait state total time accumulator 1879 (word 69 of the ECR) thereby giving the operator the total period of the present wait state. Both the counter 1894 and accumulator 1897 are reset when the wait state is exited. By way of specific example, the wait state prompting interval (word 47 of ECR) may be 30 seconds and the interval timer period (words 102 and 103) may be 2 seconds. In such a case, interval timer 1876 runs out every 2 seconds thereby increasing the value in counter 1894 (word 70) by 2 seconds every 2 seconds as well as the value in accumulator 1897 (word 69 of ECR). Thus after ten interval timer runouts, counter 1894 has a value of 20 seconds. When the value of counter 1895 is 30 seconds, this compares to word 47 of the ECR and the operator is prompted. At the same time, counter 1894 is reset and the process continues, i.e., the operator is prompted every 30 seconds and the wait state total time is maintained, until the wait state exists as indicated by wait state bit register 1850.

Thus, it has been seen that the present system has the ability for promptly indicating to the operator a hard wait state condition and further upon encountering a normal wait state condition, it has been seen that the system can promptly check for pending, allowable interrupts and in response thereto perform a PSW swap so as to continue processing in the emulation mode. It has also been seen that in response to a normal wait state condition and the lack of pending allowable interrupts, the system minimizes wasted system time by allowing processing to continue in the native mode until an emulator specific pending allowable interrupt is posted on a semaphore in response to which the emulation mode again begins to execute. It has further been seen that by the use of a combination of timers, counters, accumulators, etc., means have been provided for indicating to the operator, the length of time that the ECP wait state has existed, thereby eliminating any false assurances on the part of the operator that his system continues to function in the emulation mode and further giving the operator an opportunity to intervene if conditions warrant.

GLOSSARY OF TERMS

| | |
|---|---|
| Absolute Address | — the physical address of a hardware byte in main memory store. |
| Address Development | — a hardware function which operates on a number of address elements to compute an absolute address which is used to refer to a location in main storage. |
| Addressing | — locating an object by any of a number of virtual, logical, and physical means. |
| Address Space | — the set of logical, segmented addresses corresponding to a process that the CPU is permitted to transform into absolute addresses during execution of that process. |
| Address Space Word | — one of two words in a process control block which point to the segment table word array. The segment table word array defines the segment tables associated with the process. |
| Address Syllable | — a logical address recognized by CPU hardware, normally an operand of an instruction. |

-Continued

GLOSSARY OF TERMS

| | |
|---|---|
| Analyzer/Translator | — that part of the static linker that first passes the control language stream to the linker; then, if the control language is error-free, the analyzer/translator converts it to tables and other structures for the static linker to use. |
| Asynchronous Processing | — concurrent activation of more than one process. |
| Auxiliary Memory | — is comprised of 64 flip-flops for storing miscellaneous states of the system and is located in ALU. |
| Base Register | — the primary element in segment addressing, referenced by number in every address syllable. |
| Boundary Address Register | — a visible hardware register that defines the lowest memory address accessible to firmware/software. |
| Call | — see procedure call -Inward Call-Outward Call. |
| Central Process Unit | — a part of a computer that includes circuits controlling the interpretation and execution of instructions. |
| Channel | — a means of communicating between the processor subsytem and a peripheral subsystem. There are two types of channels, physical and logical. A physical channel is the hardware connection between the input/output control unit IOC and the peripheral control unit PCU. A logical channel is a software communications path between main memory and a single peripheral device. |
| Channel Command Entry | — an instruction in a channel program. |
| Channel Command Word | — an element of a channel command entry. Two channel command words constitute a channel command entry. |
| Channel Program | — a sequence of instructions that cause a specific input/output i/o operation to be performed by a peripheral device. |
| Complementary Code | — a code in some instructions which together with the operation code defines the function of the instruction. |
| Compilation Unit | — the single object-code module that results from compiling or assembling one procedure in any high level language processor. The CU is not executable unit it is linked. |
| Concurrency | — apparent simultaneity. |
| Condition Field | — a 4-bit field in a branch instruction. Each bit of the field corresponds to a setting of the condition code in the status register bits 0 and 1. |
| Contest Indicator | — a hardware structure located in auxiliary memory and indicates a new entry was placed in the ready queue, and there may be possible content for priority. |
| Data Address Space | — the set of logical record addresses accessible by a process through data management; consists of four elements; logical fields, logical records, data base pages, and files. |
| Data Descriptor | — an information structure which is used in indirect addressing and as a description in data manipulation. |
| Decor | — the functional characteristics or architecture of a computer system. |
| Decor Extension Mode | — a mode of operation permitting the operating of the system in emulation mode. |
| Descriptor | — a 32-or64-bit field used in developing the address of any data field. It is one of many pointers in the addressing scheme of the invention. |
| Descriptor Block | — a data block containing any number and variety of descriptor declarations except semaphore descriptors. No other data is allowed. |
| Device Adapter | — electronics which adapts a specific device to a peripheral controller. |
| Device Adapter Interface | — the interface between a device adapter and its associated peripheral controller(s). |
| Device Control | — a software facility which handles device specific characteristics. |
| Dispatcher | — the firmware responsible for dispatching processes in the CPU. |
| Dispatching | — a field within the instruction format or a data descriptor which provides relative position information within a segment. |
| Displacement Addressing | — a form of direct addressing in which the operand defines a location relative either to the base of the immediate segment or to the current location counter. |
| Dynamic Addressing | — addressing which results in resolution, during execution, of references defined within the process group. |
| Editor | — that part of the static linker that format and outputs any or all of the information that results from linking a particular procedure. |
| Effective Address | — a logical, as opposed to physical, address consisting of a segment table number, a segment table entry, and a segment relative address. These elements show the way to a particular segment segment descriptor, which eventually points to the segment being referenced. |
| Emulation Mode | — operation of a computer so as to initiate another computer, and appear to operate in the other computer's environment. |
| Exception | — an exception occurs when the hardware detects the existence of some condition that has been specified as requiring special handling. |
| Event | — anything observed in a system by a process which may be of interest to some other process. |
| Firmware | — that part of a hardware unit implementation which utilizes a form of micro-programmed control. |
| G, D Name | — the name used by the hardware to refer to a semaphore. G, the G-segment name is the number of the entry in the G-table containing the segment descriptor; D is the relative address in the segment. |
| G-Segment | — a segment containing semaphores which may be addressed using the G, D name form and associated mapping facility (the G-table). |
| G-Table | — a table used for storage mapping (locating a G-segment) when the G, D name form is used. |
| Gating | — a facility for controlling entry to procedures in a (gated) segment through the use of procedure descriptors. |
| General Register | — a 32-bit register available to executing processes which generally holds binary or bit string data. Certain general registers can be used for indexing (GR8 through GR15). |
| Index | — a data structure which is maintained and operated upon by the system. The structure is visible to the user only in terms of a key which he presents for the purpose of making available or positioning to a specific record occurrence. |
| Indexing | — modification of an address by a signed arithmetic value by adding something to something. |
| Index Register | — a general register used for indexing (GR8 through GR15). |
| Indirection | — a method of addressing whereby an address is used to obtain another address, rather than the actual data. |
| Indirection to Base | — the form of indirection whereby a data descriptor containing a base register number and a displacement is found at the address referenced. |
| Indirection to Segment | — the form of indirection whereby a data descriptor containing a segment address is found at the address referenced. |
| Indirect Segment Descriptor | — a type of segment descriptor which contains information for addressing another segment descriptor, rather than a segment. |
| Instruction | — the unit of execution of a central processor visible to a programmer. |
| Instruction Counter | — a register associated with an executing process which contains the segmented address of the next instruction of the procedure being executed. |
| Interleave | — sequential accessing of memory modules to reduce memory access time. |
| Interrupt | — the discontinuance of a process in the system due to an event occurrence. |

-Continued

GLOSSARY OF TERMS

| | |
|---|---|
| Interrupt Process | — a process which is activated in response to an interrupt. |
| Inward Call | — when one procedure execution in one ring number calls another procedure to execute in a lower ring number. |
| I/O Controller | — a unit which provides the basic control for a specific I/O subsystem. |
| I/O Processor | — potentially asynchronous system processes which deal primarily with the movement of data between peripheral storage or I/O devices and main storage. |
| J.P. Tables | — a collection of logical addresses for locating a process control block. |
| Job | — a unit of work for the system. |
| Job Control Language | — a language for describing a job and its component parts. |
| Job Step | — the major subdivision of a job leading to the execution of a program defined by a JCL statement. |
| Job Step Table | — a system table used to map the first part of a process name, i.e., to locate the process group table. |
| Linked Module | — the output of the static linker. It is a consolidated group of compilation units (CU) whose cross-references were resolved by the static linker. |
| Linking | — see static linking. |
| Logical Channel | — see channel. |
| Logical Processor | — the collection of hardware resources and control information necessary for the execution of a process. |
| Main Storage | — all addressable storage from which instructions can be executed or from which data can be loaded directly into registers. |
| Magnetic Tape Controller | — the elements of the peripheral subsystem related to magnetic tape devices. |
| Mass Storage Controller | — the elements of the peripheral subsystem related to mass storage devices. |
| Memory Management | — operating system facilities for the allocation, relocation, and disallocation of physical memory. |
| Message | — information transmitted from a source or to a destination—neither being a file. |
| Microinstruction | — same as microinstruction word, and control store word. |
| Micro-program | — a set of machine codes used to implement the control functions of a processor. |
| Multiplex | — to share a hard resource, such as memory, usually by time division. |
| Multi-programming | — the concurrent execution of two or more programs by a single computer. |
| Native Mode | — operation of a computer in its native environment. |
| Offset | — in address development, the number of bytes after the beginning of the segment at which an addressed part of the segment starts. |
| Operating System | — a system of basic software designed to support the efficient operation of user software. |
| Outward Call | — when one procedure executing in one ring number call another procedure to execute in a higher ring number. |
| Peripheral Control Unit | — a stand-alone micro-programmed processor which executes channel programs to perform I/O operations. |
| Peripheral Subsystem Interface | — a standard interface used for transfer and control between free-standing peripheral control units and I/O control units. |
| Physical Channel | — see channel. |
| Physical Data Structure | — a complete definition of the organization of data as it is physically recorded on media. |
| Physical I/O | — that part of the operating system which initiates and controls the transfer of data between memory and peripheral or terminal devices. |
| Physical Storage | — hardware used for the storage of data. It is composed of various types of recording media and the recording/reading hardware. |
| P-operation | — a machine instruction involving a semaphore which causes a process to enter the wait state or to receive a message. |

-Continued

GLOSSARY OF TERMS

| | |
|---|---|
| Privileged Instruction | — an instruction which must be executed in ring O. |
| Procedure | — a named software function or algorithm which is executable by a processor without concurrency: a Fortran subroutine, a Cobol program, a PL/1 internal procedure. |
| Procedure Call | — a mechanism for creating a stack frame within a stack segment. |
| Procedure Descriptor | — a word containing the location and entry point of a procedure. |
| Procedure Segment | — the type of segment whose contents represents a procedure, procedures, or part of a procedure. |
| Process | — the ordered execution of instructions without concurrency by a processor, either central or i/o. |
| Process Address Space | — the memory addresses which may be referenced or to which control may be transferred during a particular process. |
| Process Control Block | — a data structure (hardware defined and recognizable) that contains information needed to specify the state of a process at any given time. |
| Process Group | — a related set of processes, usually those necessary for the performance of a single job-step. |
| Process Group Builder | — that part of the static linker whose actions yield the linked module. |
| Process Group Loader | — an operating system facility that makes final resolutions in a linked module to create an executable process group then it loads the process group into memory and starts its execution. |
| Process Group Table | — see P Table. |
| Process Link | — an entry in a ready process or waiting process queue. |
| Process State | — the dynamic condition of a CPU process e.g., running, ready, waiting, or suspended. |
| Process Switch | — the hardware function that disassociates one process from the central processor and associates another. |
| Process Synchronization | — the functions that act to coordinate the asynchronous activity among processes. These functions generally involve semaphores and the P and V operations. |
| Processor | — a unit capable of receiving data, manipulating it, supplying results, and controlling its sequence of operations in response to stored programs: short for central processor, generic for central processor, peripheral processor, or hardware/software processor. |
| Program | — the specification of the procedural and associated information necessary to solve a problem, i.e. the ordered collection of instructions which is executed by the computer and operates on data to perform a user's job or some phase of that job. |
| Program Execution | — the activity of a process in conformance to program specification. |
| Protection | — the function, enforced by hardware and software, of preventing processes from interferring with each other or sharing each other's address space in an unauthorized manner. |
| P-Table | — a hardware defined data structure containing entries, each pointing to the origin of a process control block. The P-table entries point to the total set of PCB's comprising a process group at any given time. Also called process group table. |
| Q/PR/RDY | — queue of processes ready i.e. a ready-queue. |
| Queue | — an ordered list of entities awaiting information, process or availability. |
| Ready State | — a process state in which no processor is associated but all necessary resources, except a processor, are available for changing to the running state. |
| Relative Address | — the incremental/decremental location of some object relative to another. |

-Continued

GLOSSARY OF TERMS

| | |
|---|---|
| Relocation | — movement of a segment from one location in main storage to another including the adjustment of all required references to its previous location. |
| Return | — the function and operations necessary to resume the action of a procedure at a point immediately following the point where it entered some other procedure. |
| Ring | — a protection attribute of a segment that restricts the read, write, and execute access of process to that segment. A level of privilege of a process for read, write or execute. |
| Rolling-in | — performing the operation necessary to give control of a processor to a new process. |
| Rolling-out | — performing the operations necessary to take away control of a processor by a process. |
| Running State | — the dynamic condition of a process (connected to a CPU) that is executing. |
| Scratch Pad Memory | — 256 locations in ALU for storing CPU control information-also known as a local store unit. |
| Scheduling | — determining the sequence of operations. |
| Scientific Registers | — a 64-bit register used in the manipulation of binary floating point numbers. There are four scientific registers in the invention when the system has the scientific option. |
| Segment | — a contiguous main memory space treated as a unit. |
| Segmentation | — the use of a division of main memory into logical groupings called segments rather than into a single linear store. |
| Segment Base | — the current origin of the segment. This is one of the fields in a segment descriptor word. |
| Segment Descriptor | — entry in a segment table defining the characteristics of a segment or pointing to a segment descriptor. |
| Segmented Address | — see effective address. |
| Segment Number | — the identification of a particular segment consisting of a segment table number (selecting one of the segment tables of the process) and a segment table entry of that chosen table. |
| Segment Relative Address | — during address development, the final value to be added to the segment base to obtain the absolute address. |
| Segment Table | — a table containing segment descriptors used to establish the addressability of a process to its segments. The collection of segment tables of a process defines the address space for that process. |
| Segment Table Entry | — an item in a segment table. Each segment table entry is a segment descriptor. |
| Segment Table Word | — an entry in a segment table word array pointing to the segment tables of a process. The array is pointed to by one of two address space words in the process control block. |
| Semaphore | — data structures used to control communication between processes. |
| Semaphore Block | — a data block containing only semaphore descriptor declarations. |
| Stack | — a mechanism that accepts, stores, and allows retrieval of data on a last-in-first-out basis. Comprised of a number of contiguous portions called stack frames. |
| Stack Active Area | — the portion of the current stack frame that holds a pointer to the saving area, the caller's instruction counter, parameter space and local variables—in short, the data of the current frame most likely to be useful to execution of the called procedure. |
| Stack Base Words | — a group of three words in a process control block which contain the segmented address of the stack segments for rings 0, 1, and 2 associated with the process. |
| Stack Frame | — a contiguous part of the stack segment holding the data stored for a single procedure call. |
| Stack Operations | — the push-down and pop-up operations of storing and retrieving information to/from the stack. In practice, manipulation of the pointers used to reference the information stored in the stack. |
| Stack Overflow | — the action of attempting to store more information into the stack then the available space can hold. This is detected by hardware. |
| Stack Register | — see T register. |
| Stack Segment | — the segment of a process that contains its stack. |
| Static Linking | — an intermediate step between compiling a source procedure and executing the object form of that procedure; linking resolves the external references made to and from that procedure. |
| Status Register | — an 8-bit register which specifies the status of the procedure currently being executed. |
| Swapping | — releasing the main memory space occupied by a segment by writing the segment out to secondary storage. The actual write to secondary storage may be suppressed if the segment has not been modified since the last time it was read in. |
| Synchronization | — having a fixed relationship in time; synchronized execution of two or more processes. |
| System Base | — a fixed area in main memory which acts as a root for all information structures. |
| Task | — the smallest unit of user-defined work consisting only of a single stream of non-concurrent instructions. |
| T Register | — a software visible hardware register which contains the segmented address of the top of the procedure stack. |
| Unit Record Controller | — the elements of the peripheral subsystem related to unit record devices such as card equipment, paper tape equipment, and line printers. |
| User Process Group | — the internal representation of any job step, as opposed to a system process group which exists independently of any job. |
| Vacant Indicator | — a hardware structure that indicates that the process which had control of the CP has suspended itself i.e. no CJP in the CPU. Located in Auxiliary Register, of the ALU. |
| Virtual Memory | — an addressing concept that allows a programmer to code without regard to physical memory size; virtual memory manager automatically manages the exchange of segments between main memory and secondary storage. |
| V-Operation | — a machine instruction intended for interprocess signaling the completion of an event. A V-OP operates on a designated semaphore. |

ABBREVIATIONS

| | |
|---|---|
| ACU | — address control unit |
| ALU | — arithmetic and logic unit |
| AS | — address syllable |
| ASW | — address space word |
| BAR | — boundary address register |
| BCD | — binary coded decimal |
| BR | — base register |
| CCE | — channel command entry |
| CCU | — channel control unit |
| CMRN | — the callers maximum ring number |
| CCW | — channel command word |
| CET | — current state entry time |
| CIA | — control store interface adapter |
| CJP | — currently executing process |
| CPU | — central process unit |
| CU | — compilation unit |
| CSU | — control store unit |
| D | — displacement |
| DMU | — data management unit |
| DA | — device adapter |
| EAR | — effective address ring |
| EXW | — exception word |
| GR | — general register |

-Continued

ABBREVIATIONS

| | |
|---|---|
| GTW | — G-table word |
| IC | — instruction counter |
| IFU | — instruction fetch unit |
| I/O | — input/output |
| IOC | — input/output controller |
| IPQW | — internal process queue word |
| IR | — index register |
| ITBB | — indirect to base register |
| ITS | — indirect to segment |
| J | — job |
| JCL | — job control language |
| JTW | — J-table word |
| LCT | — logical channel table |
| LIFO | — lost-in-first-out |
| LSU | — local store memory or scratch pad memory |
| MBZ | — must be zero |
| MOS | — metal oxide semiconductor |
| MAXR | — the maximum ring number at which a procedure may execute MAXR is found in the segment descriptor of $SEG_{EP}$. |
| MSC | — mass storage controller |
| MTC | — magnetic tape controller |
| NFS | — non-functional status |
| NPRN | — new process ring number |
| NJP | — new process replacing the currently executing process |
| PCB | — process control block |
| PCT | — physical channel table |
| PCU | — peripheral control unit |
| PL/I | — programming language/one |
| PMW | — process main word |
| Q/PR/RDY | — queue of processes ready |
| RD | — read ring |
| RHU | — reserved for hardware use |
| RPW | — running process word |
| RSU | — reserved for software use |
| RTA | — ready time accounting |
| RTO | — residual time out |
| SBW | — stack base word |
| SEG | — segment number |
| SKW | — stack word |
| $SEG_{EP}$ | — the segment which contains the entry point as found in the procedure descriptor |
| $SEG_{PD}$ | — the segment which contains the procedure descriptor |
| SR | — scientific register |
| SRA | — segment relative address |
| STE | — segment table entry |
| STN | — segment table number |
| STR | — status register |
| STW | — segment table word |
| STWA | — segment table word array |
| T | — T-register (stack register) |
| URC | — unit record controller |
| WR | — write ring |
| WTA | — waiting time accounting |

Having described the invention, what is claimed as new and novel and for which it is desired to secure Letters Patent is:

1. A data processing system comprising:

A. a central processing unit for executing instructions in a native mode;

B. an emulation unit, coupled with said central processing unit, for executing instructions in a non-native mode, in order to emulate the operation of another central processing unit;

C. first means for indicating whether said central processing unit emulated by means of said emulation unit is in a wait state wherein no further emulation unit processing may continue;

D. second means for indicating whether there is a pending interrupt;

E. third means for indicating whether said pending interrupt is allowable;

F. means for enabling further processing in said native mode of said central processing unit while said emulated processing unit is in the wait state, and G. means responsive to said second and third means for indicating for again continuing execution in said non-native mode if said interrupt is pending and allowable.

2. A system as in claim 1 further comprising:

A. fourth means for indicating the period of time of said wait state condition; said B. means, responsive to said fourth means for indicating, for informing the operator of said central processing unit of said wait state condition at predetermined intervals.

3. A system as in claim 1 wherein said second means for indicating comprises:

A. an interrupt flag word including a plurality of locations; and

B. means for processing said interrupts in order to indicate at least one pending interrupt in one location of said interrupt flag word.

4. A system as in claim 3 wherein said means for processing comprises:

A. means for receiving a plurality of first interrupts indicating input or output events;

B. means for receiving a second interrupt;

C. semaphore means for storing messages including the origin of said first and second interrupts;

D. means for decoding said messages; and

E. fifth means for indicating an interrupt of said first and second types in said interrupt flag word if said first and/or second interrupts include messages which indicate that said interrupts are associated with and/or result from the processing in said emulation unit.

5. A system as in claim 4 further comprising:

A. means for generating said second interrupt in response to an operator's request or in response to the timeout of a predetermined interval of time; and wherein B. said locations in said interrupt flag word are each capable of storing bits of information, each bit in a first binary state indicating a pending interrupt, wherein a plurality of said bits of information are indicative of said plurality of first interrupts, and wherein at least one of said bits of information are indicative of said second interrupt.

6. A system as in claim 4 wherein said third means for indicating comprises:

A. a system mask including a plurality of locations corresponding to the number of locations in said interrupt flag word;

B. means for comparing like numbered locations in said system mask and said interrupt flag word; and C. means for generating a pending interrupt allowable signal if said like numbered locations include similar binary states and if said fifth means for indicating indicates an interrupt of said first and/or second type.

7. A system as in claim 6 further comprising:

A. a hard wait state flag for indicating that said emulated central processing unit is not presently emulatable; and B. means for setting said hard wait state flag if each of the locations in said system mask indicate a second binary state.

8. A system as in claim 6 wherein a first binary state in said like numbered locations of said interrupt flag word and said system mask indicate a pending allowable interrupt and wherein a second binary state in either one of said like numbered locations indicates that there is no pending allowable interrupt.

9. A system as in claim 6 further comprising:

A. a counter for indicating whether there are any messages in said semaphore means;

B. means for incrementing said counter each time a message is removed from said semaphore means, whereby a zero count indicated by said counter indicates that there are no messages in said semaphore means.

10. A system as in claim 6 further comprising:

A. a program status word associated with a first program and including 1. said system mask; and
2. said first means for indicating, said first means for indicating including a wait state bit for indicating said wait state when said wait state bit is in a first binary state; and B. means responsive to the first binary state in said wait state bit and the indication of a pending allowable interrupt for executing another program.

11. A data processing system comprising:

A. a central processing unit for executing instructions in a native mode;

B. an emulation unit, coupled with said central processing unit, for executing instructions in a non-native mode, in order to emulate the operation of another central processing unit;

C. first means for indicating whether said central processing unit emulated by means of said emulation unit is in a wait state wherein no further emulation unit processing may continue, and D. means for informing the operator of said central processing unit of said wait state condition at predetermined intervals, said means for informing comprising 1. an interval timer,
2. a wait state counter,
3. means for changing the value of said timer at a predetermined rate,
4. means for generating a first signal each time said timer value changes by a first value,
5. means, responsive to said first signal, for changing the value of said counter by a second value,
6. means for comparing the value of said counter with a third value, and
7. means, responsive to said means for comparing, for providing a wait state prompting signal to said operator each time said value of said counter is equal to or greater than said third value.

12. A system as in claim 11 wherein said first value is equal to said second value.

13. A system as in claim 11 wherein said means for informing further comprises:

A. an accumulator for maintaining the total time of said wait state;

B. means, responsive to said counter, for changing the value of said accumulator in proportion to the change in value of said counter each time said counter value is changed by said second value;

C. means for resetting the value in said counter each time said prompting signal is provided.

14. A system as in claim 13 wherein said means for informing further comprises means for resetting the values in both said counter and said accumulator each time said emulation unit exits from said wait state.

15. A data processing system comprising:

A. a central processing unit for executing instructions in a native mode;

B. an emulation unit, coupled with said central processing unit, for executing instructions of a process in a non-native mode, in order to emulate the operation of another central processing unit;

C. first means for indicating whether said emulation unit emulating said another central processing unit indicates that said emulation unit, i.e., said another unit as emulated, is in a wait state wherein no further emulation unit processing may continue;

D. means for enabling further processing in said native mode of said central processing unit while said emulation unit is in the wait state;

E. second means for indicating whether there is a pending interrupt;

F. third means for indicating whether processing of said pending interrupt is allowable; and G. means responsive to said second and third means for indicating for again continuing execution in said non-native mode if said interrupt is pending and allowable.

16. A system as in claim 15 further comprising means for informing the operator of said central processing unit of said wait state condition at predetermined intervals.

17. A data processing system comprising:

A. a central processing unit for executing instructions in a native mode;

B. an emulation unit, coupled with said central processing unit, for executing instructions of a process in a non-native mode, in order to emulate the operation of another central processing unit;

C. first means for indicating whether said emulation unit emulating said another central processing unit indicates that said emulation unit, i.e., said another unit as emulated, is in a wait state wherein no further emulation unit processing may continue;

D. means for enabling further processing in said native mode of said central processing unit while said emulation unit is in the wait state;

E. a hard wait state flag for indicating that said emulated central processing unit is not presently emulatable;

F. means for indicating if interrupts are allowable; and

G. means for setting said hard wait state flag if no interrupts are allowable.

* * * * *